United States Patent [19]

Oshima et al.

[11] Patent Number: 5,062,696

[45] Date of Patent: Nov. 5, 1991

[54] CAMERA APPARATUS

[75] Inventors: Mitsuaki Oshima, Moriguchi; Masataka Izaki, Yawata; Jirou Kajino, Neyagawa; Yoshiaki Igarashi, Ikoma; Hiroshi Mitani, Daito, all of Japan

[73] Assignee: Matsushita Electric Industrial Co., Ltd., Osaka, Japan

[21] Appl. No.: 312,057

[22] Filed: Feb. 17, 1989

Related U.S. Application Data

[62] Division of Ser. No. 886,424, Jul. 17, 1986, Pat. No. 4,856,882, which is a division of Ser. No. 688,154, Dec. 31, 1984, Pat. No. 4,623,930.

[30] Foreign Application Priority Data

Dec. 29, 1983 [JP] Japan ................................. 58-251306

[51] Int. Cl.⁵ ..................... G02B 27/64; G03B 15/00
[52] U.S. Cl. .................................... 359/554; 358/222; 354/430
[58] Field of Search ............... 350/500, 244; 358/222, 358/78, 148, 154, 158, 109; 354/430

[56] References Cited

U.S. PATENT DOCUMENTS

| 3,762,795 | 10/1973 | Bezu | 350/500 |
| 3,944,324 | 3/1976 | Tajima et al. | 350/500 |
| 4,303,945 | 12/1981 | Fawcett et al. | 358/109 |
| 4,316,649 | 2/1982 | Alvarez et al. | 350/500 |

FOREIGN PATENT DOCUMENTS 59-86014  5/1984  Japan.

Primary Examiner—Bruce Y. Arnold
Assistant Examiner—James Phan
Attorney, Agent, or Firm—Wenderoth, Lind & Ponack

[57] ABSTRACT

A camera apparatus comprising focusing means for optically focusing a beam of light from an object, an imaging element for converting an optical image produced by the focusing means into electrical or physicochemical information and issuing or recording the information as an image, detectors for detecting fluctuations of the apparatus to issue a fluctuation detecting signal, controllers responsive to the fluctuation detecting signal for issuing an image fluctuation control signal, and suppressors responsive to the image fluctuation control signal for suppressing fluctuations of the image due to the fluctuations of the apparatus.

4 Claims, 69 Drawing Sheets

FIG. 5(a).
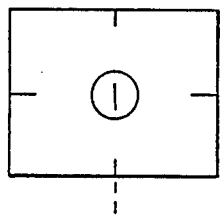
FIG. 5(a').
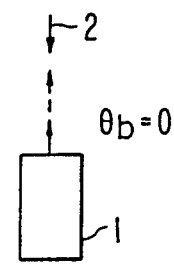
FIG. 5(b).
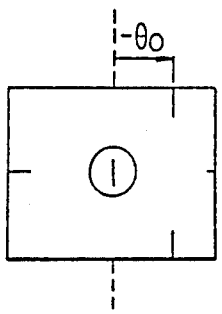
FIG. 5(b').
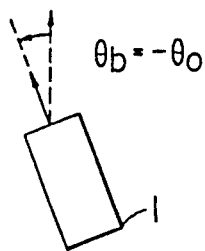
FIG. 5(c).
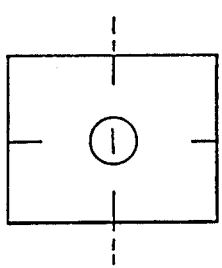
FIG. 5(c').
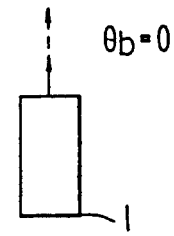
FIG. 5(d).
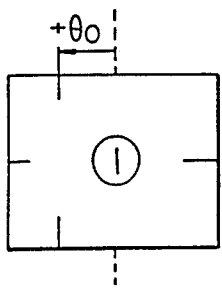
FIG. 5(d').
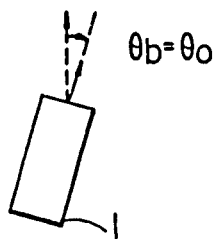
FIG. 5(e).
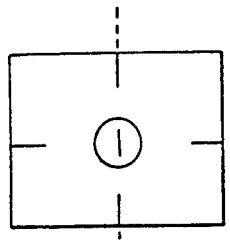
FIG. 5(e').
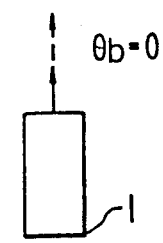

t=0 t=t₀ t=2t₀ t=3t₀

$\theta_b = +\theta_0$ $\theta_b = 0$
t=2t₀

$\theta_b = +\theta_0$
t=3t₀

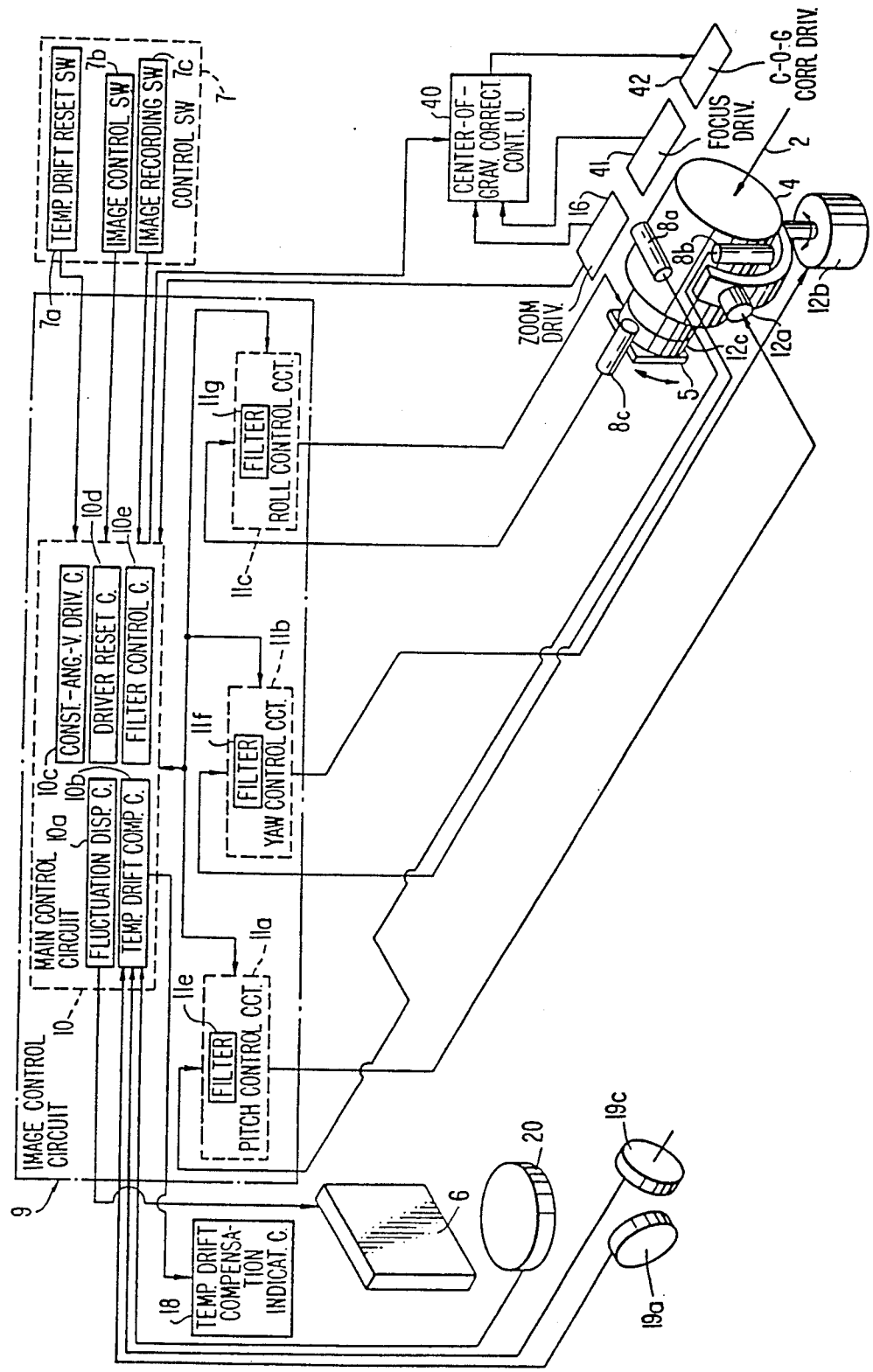

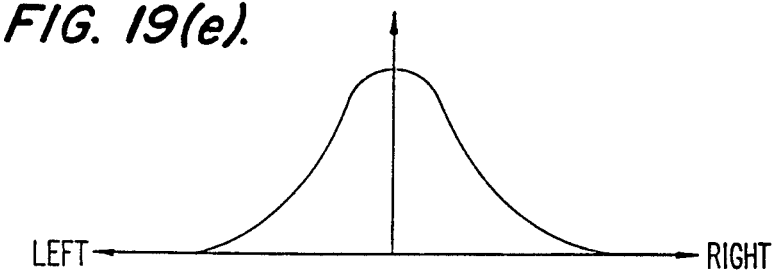
FIG. 19(e).
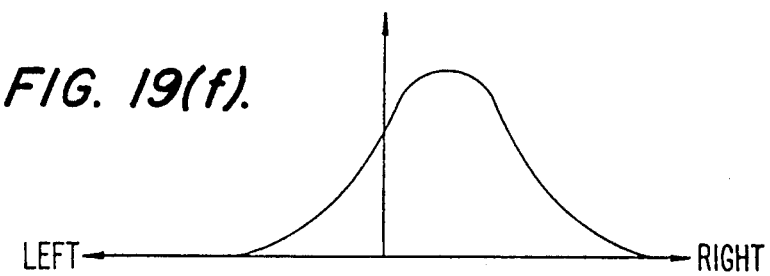
FIG. 19(f).
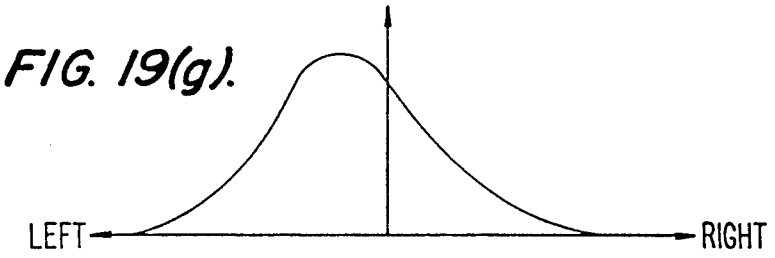
FIG. 19(g).
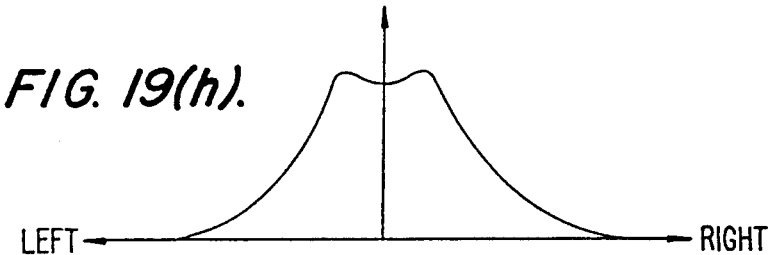
FIG. 19(h).
FIG. 19(i).
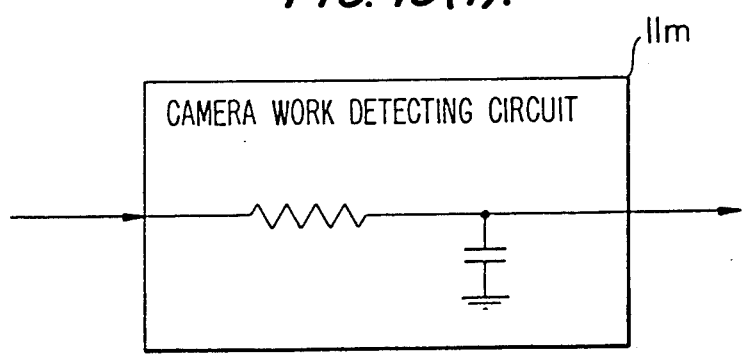

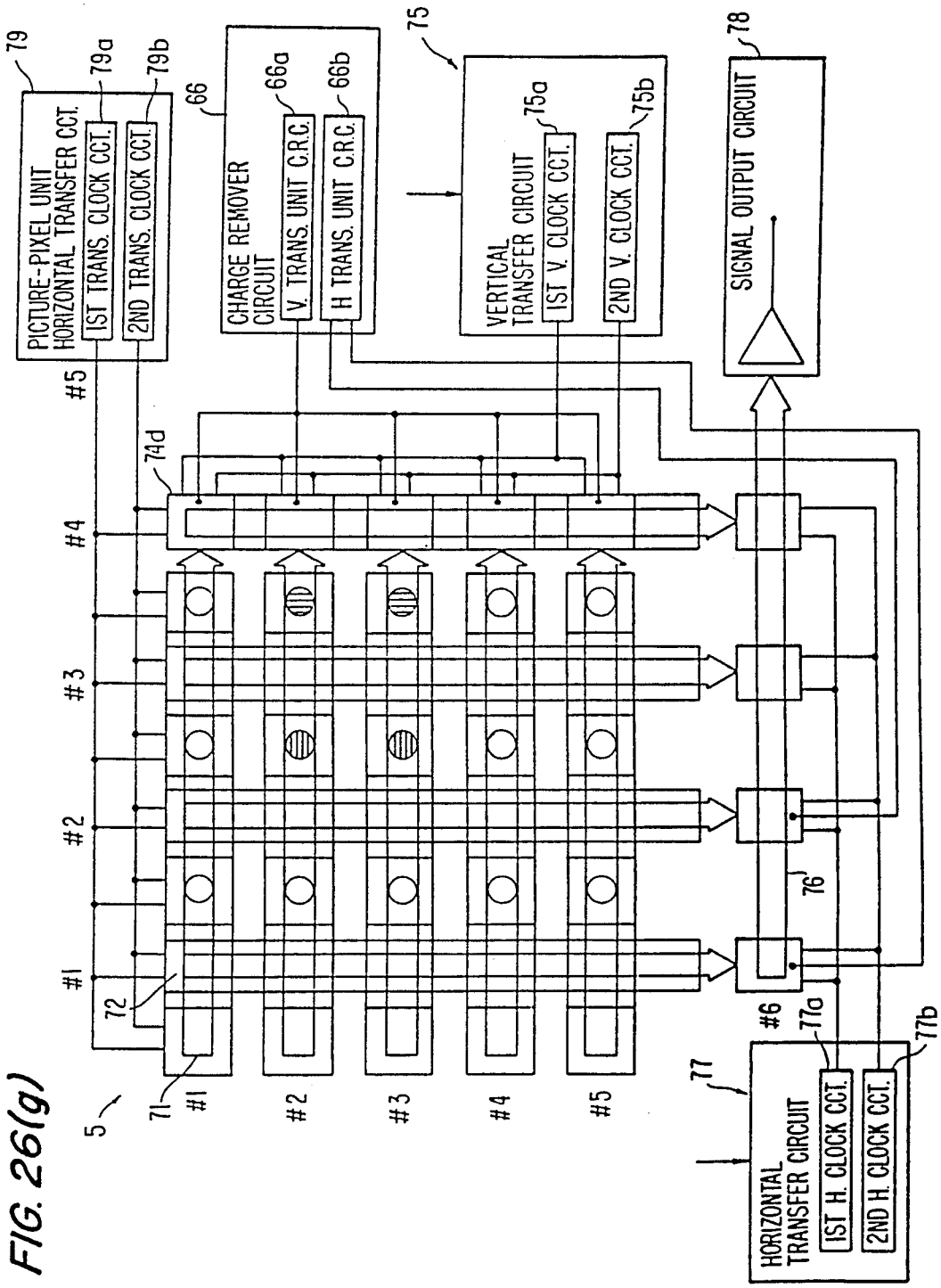

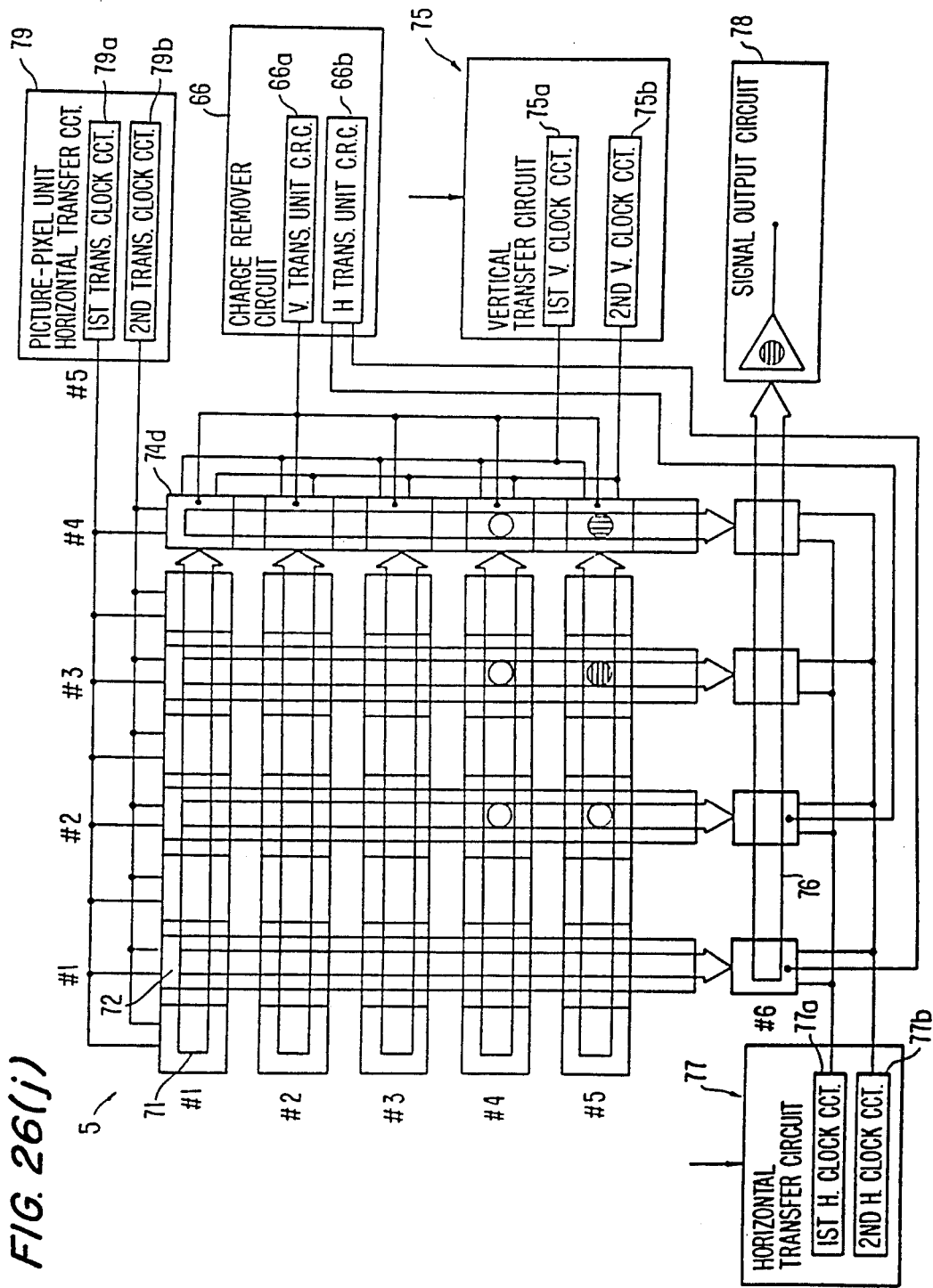

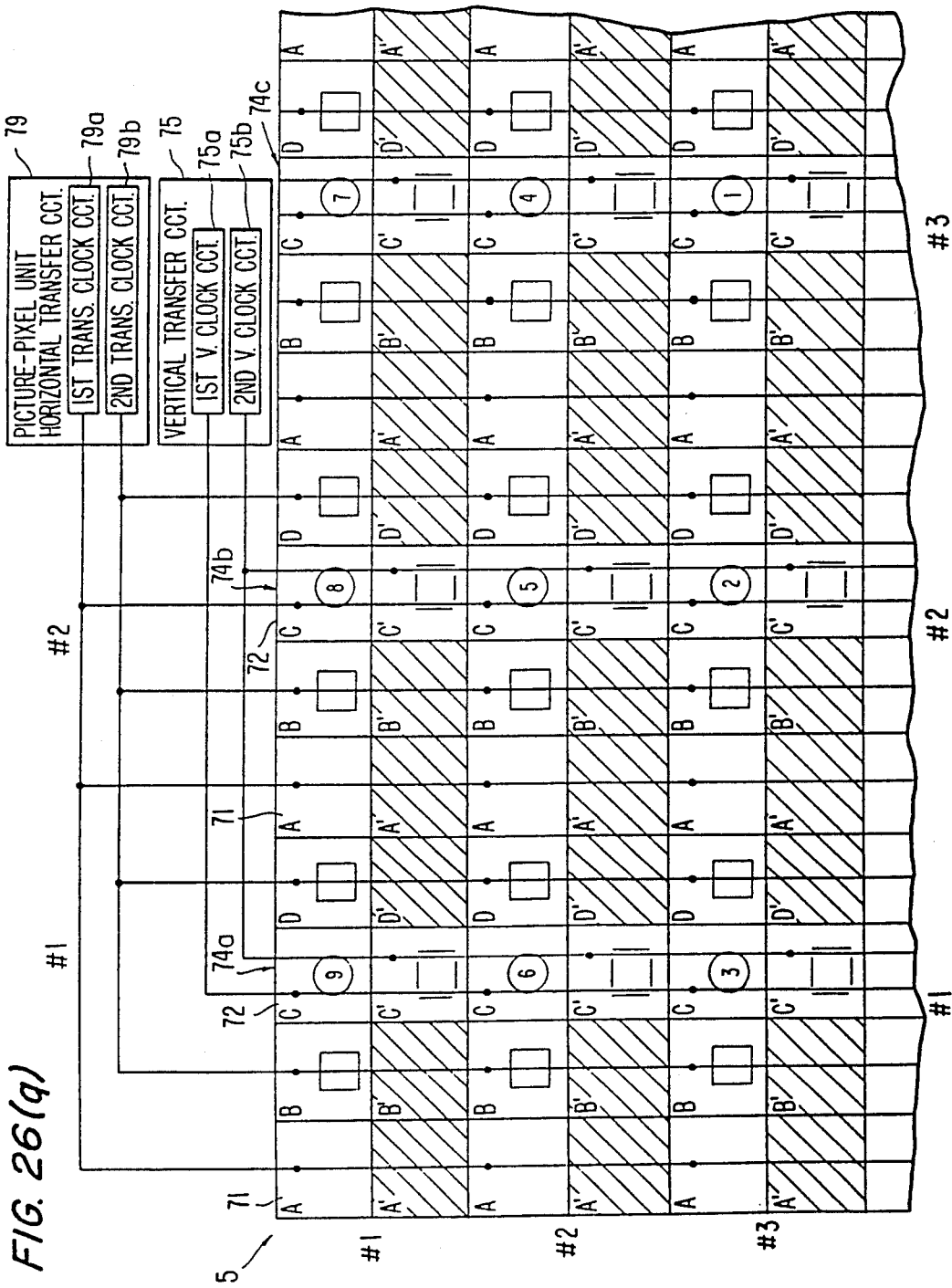

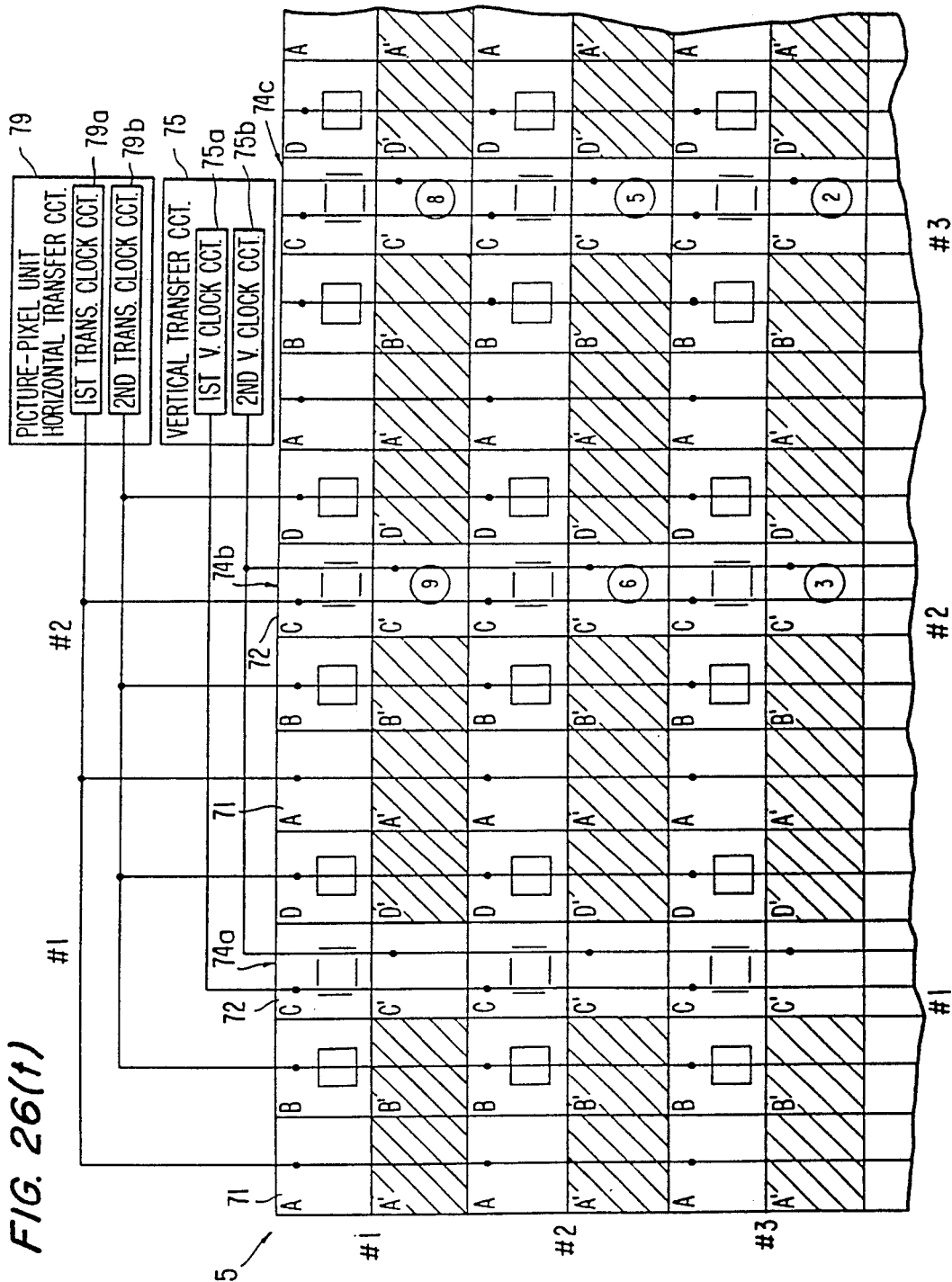

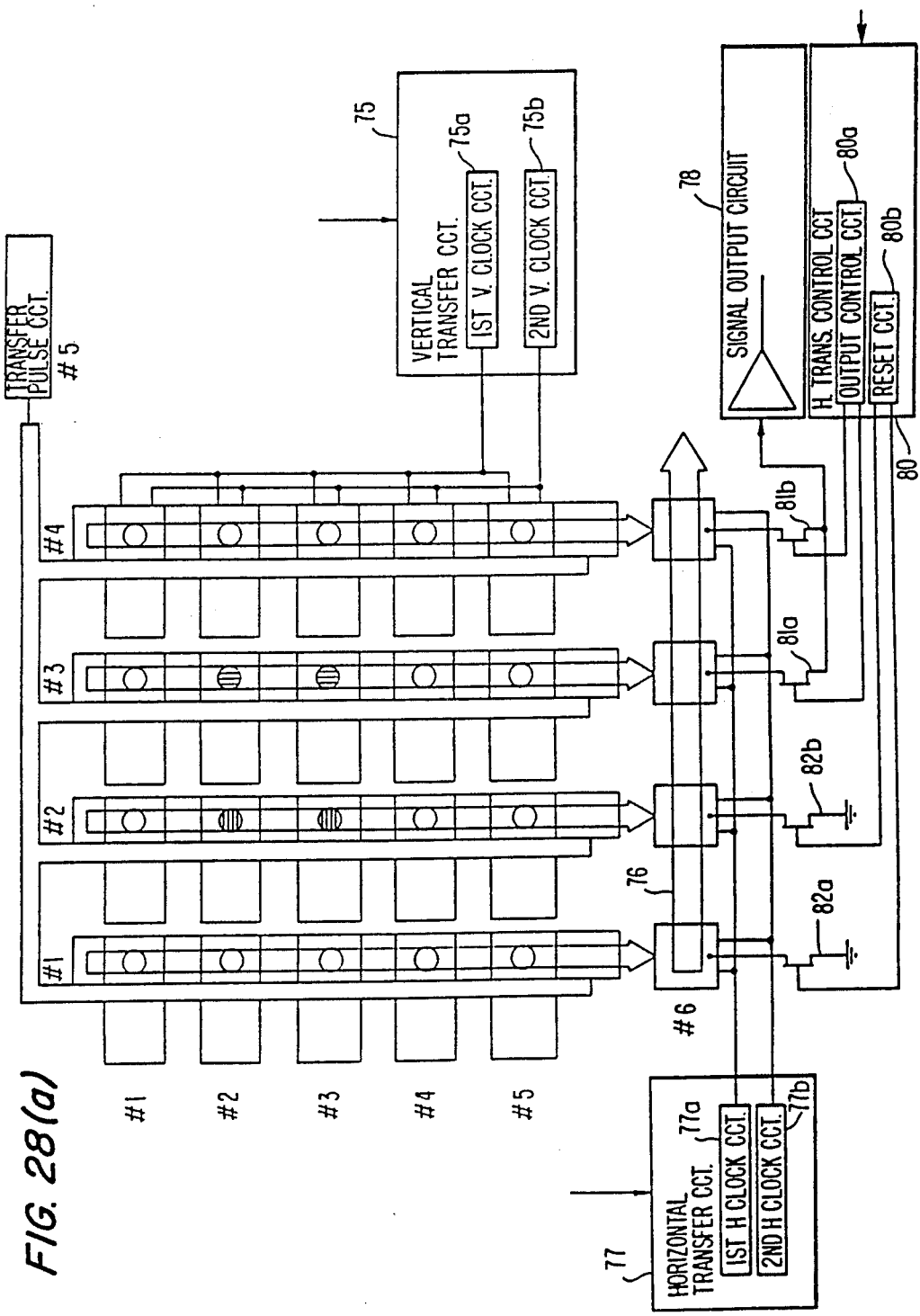

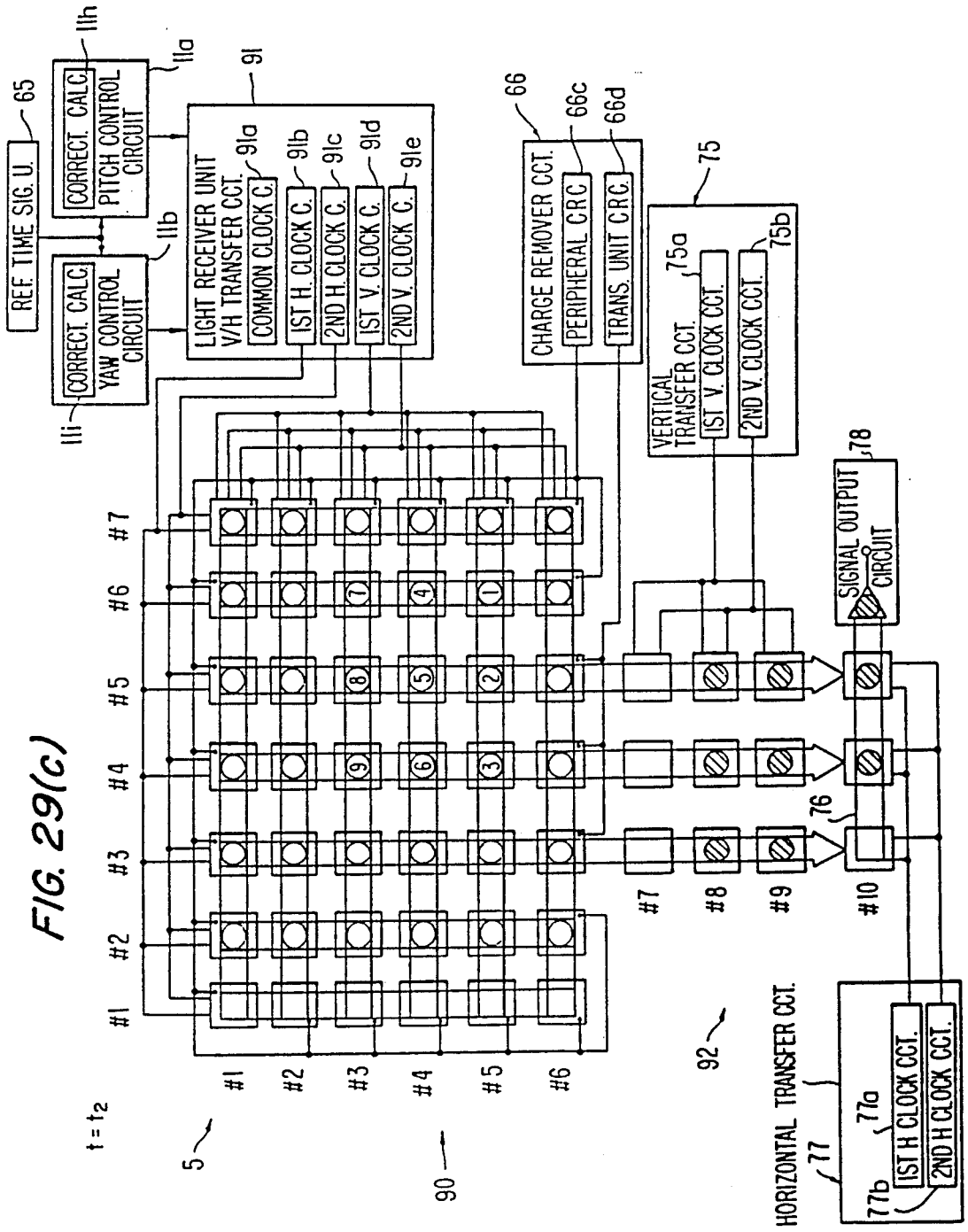

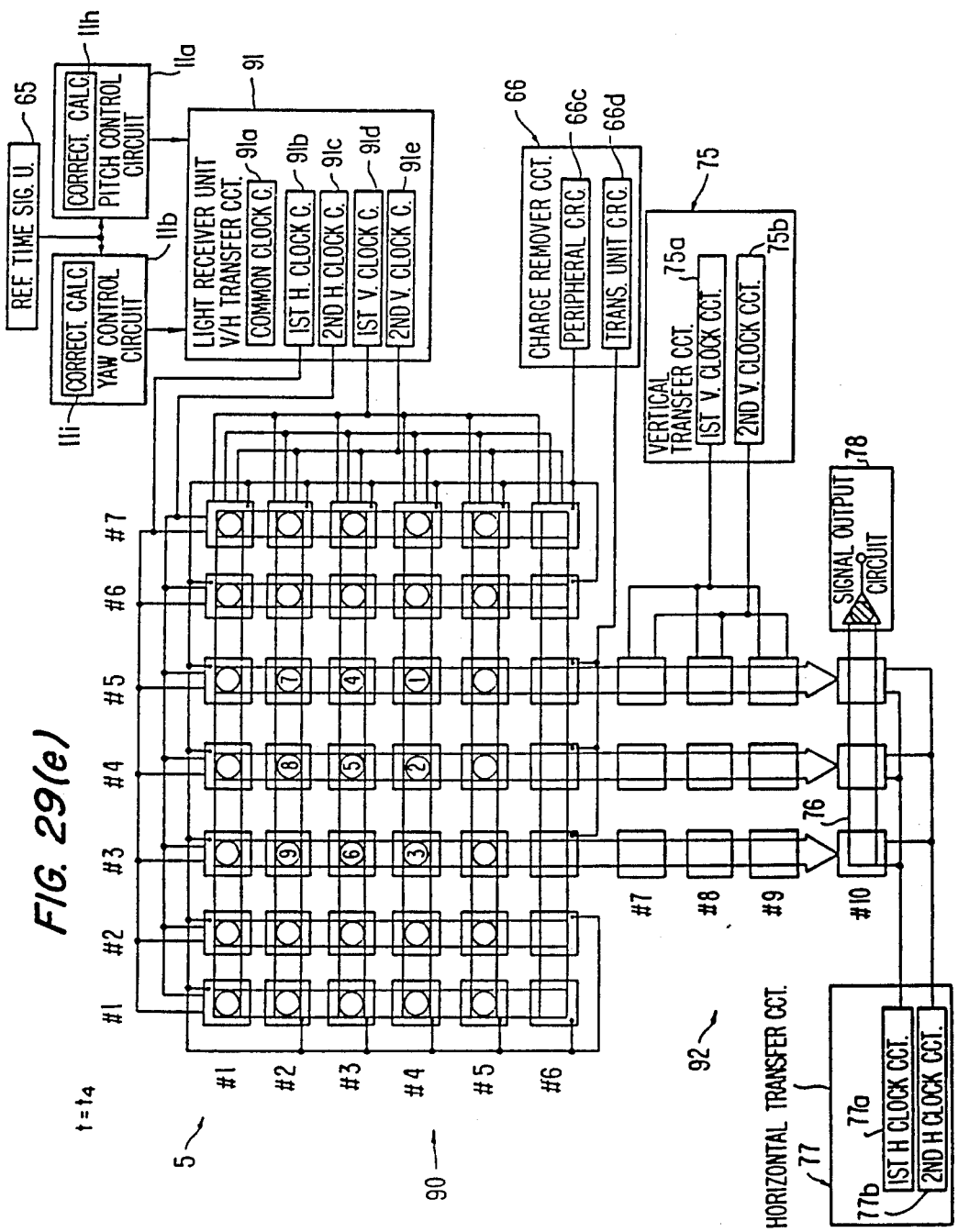

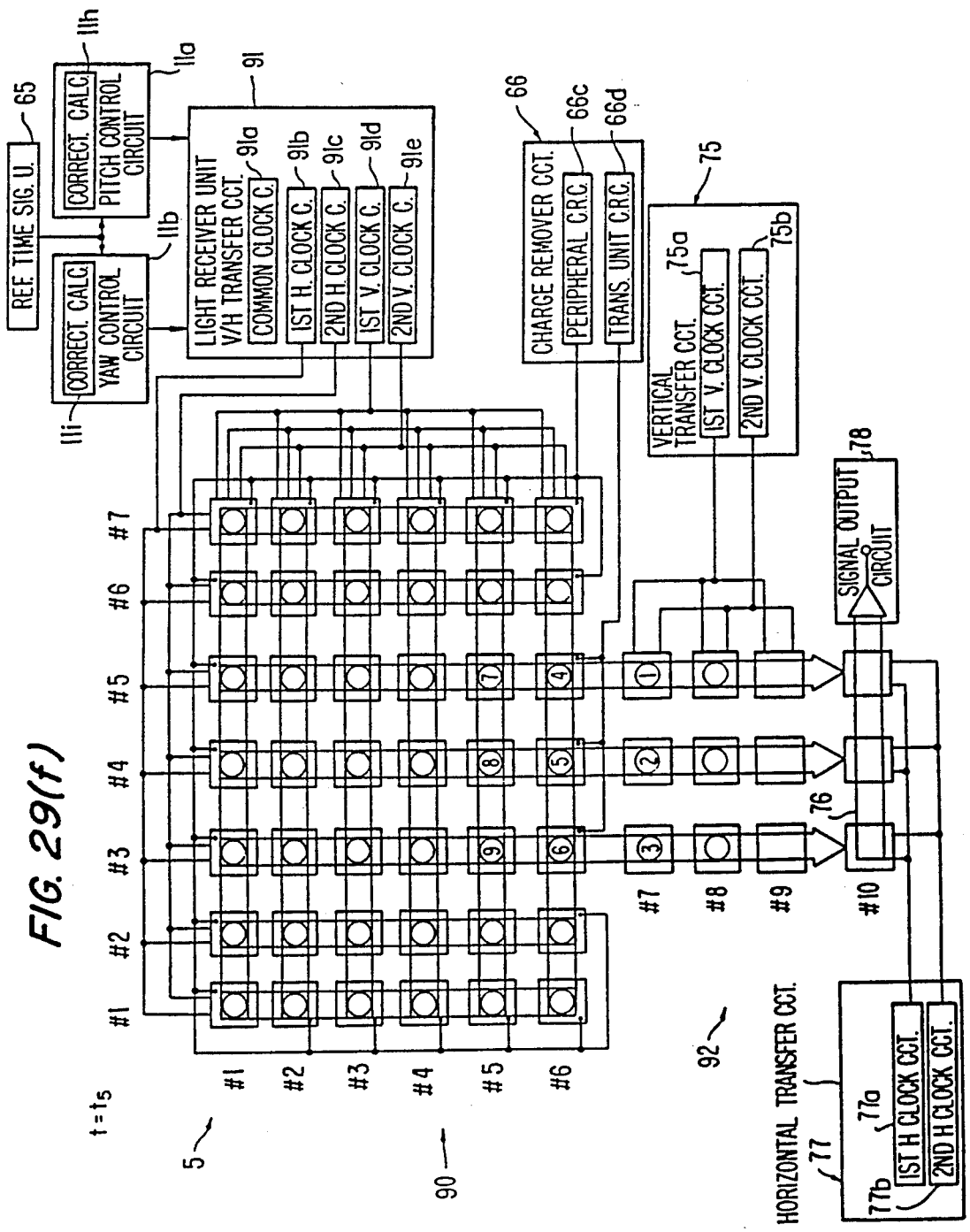

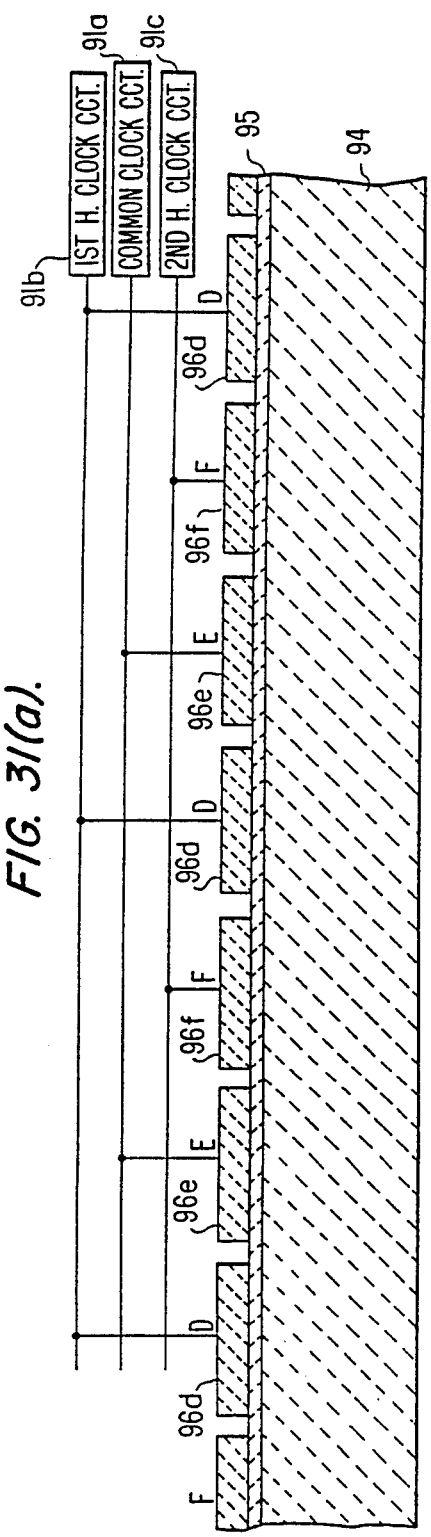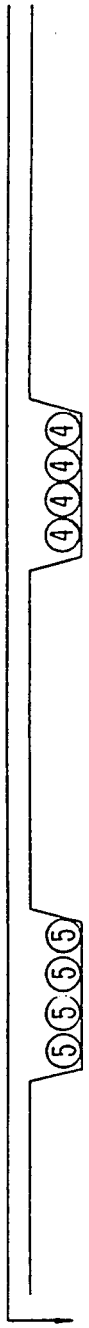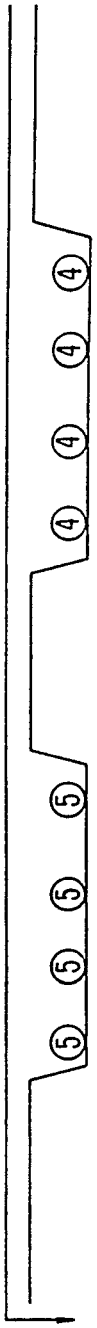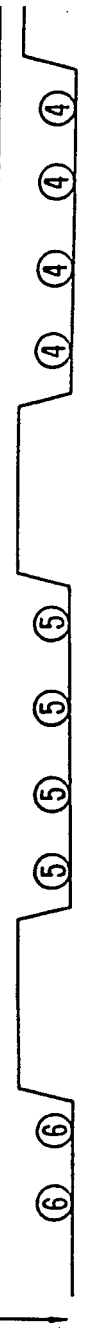

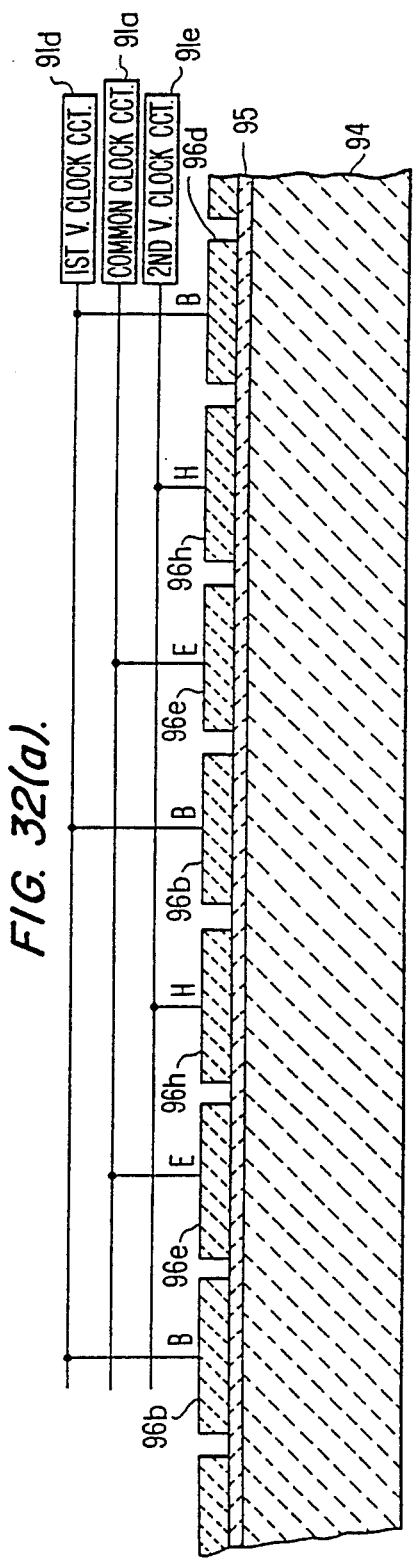
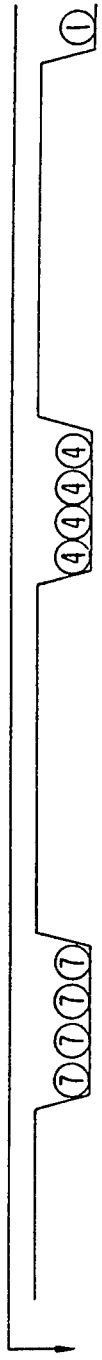
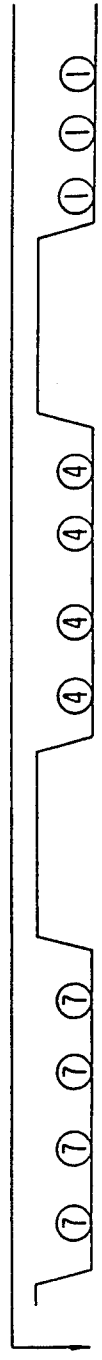
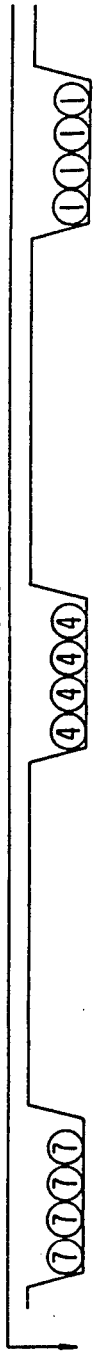
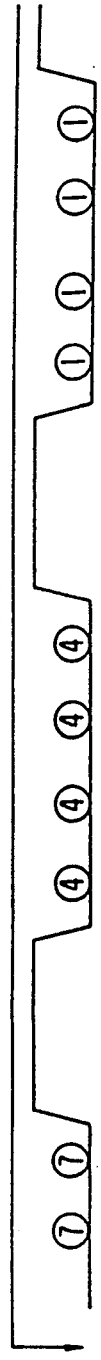
FIG. 32(a).
FIG. 32(b).
FIG. 32(c).
FIG. 32(d).
FIG. 32(e).

CAMERA APPARATUS

This application is a division of application Ser. No. 06/886,424, filed July 17, 1986, now U.S. Pat. No. 4,856,882, which is a division of Ser. No. 06/688,154, filed Dec. 31, 1984 now U.S. Pat. No. 4,623,930.

BACKGROUND OF THE INVENTION

1. Field of the Invention:

The present invention relates to a camera apparatus, or image pickup device, such for example as a video camera used in combination with a video recording apparatus such for example as a video tape recorder.

2. Description of the Prior Art:

Recent years have seen widespread use of a growing number of video tape recorders in the home, and more and more video cameras are used year after year. The commercialization of home-use VTRs with integral cameras, having a weight of less than 2 kg, and lightweight handy video cameras weighing less than 1 kg, accelerates more the popularity of video cameras among people. It is expected that future video cameras will be combined with electronic cameras and will spread like still cameras available today.

Still cameras and video cameras have spread for widely different reasons. The still camera is required to produce separate still images which are beautiful and easy for people to see, while the video camera is required to make a succession of images beautiful and easy to see. Since the user of the video camera is required to have a technique to take successive images, known as "camera work", it is believed that difficulty in mastering the camera work is one of the obstacles to more widespread use of video cameras.

Now, the video camera will be analyzed from the standpoint of the level of video camera users in taking video images. In the past, video cameras have been used primarily among well-disciplined users having a high level of image taking technique, such as professional cameramen working for broadcasting stations and amateur cameramen who have acquired a high-level shooting technique. However, with the spread of video cameras among the public, video cameras are being used by more and more amateurs who have no talent and are given few opportunities to get disciplined, such as housewives and middle and aged people who have a low shooting technique level. To meet such a trend, the manufacturers have made an effort to advance a technical development for improving the ease with which video cameras are handled, other than the attempt to improve basic functions of the video camera. The final goal of such a development is to automatize the present complex camera operating procedure for allowing general people who are not skilled enough in image taking technique to produce images which approximate those taken by professional cameramen.

Various technologies for automatizing camera control processes have been developed to approach the final goal. Automatization has progressed to the point where there is automatic diaphragming, automatic focusing, and automatic white balance, and now the user can take pictures simply by depressing a picture taking button with almost no adjustment. However, almost all general users will be disappointed when they see the big difference between images taken by them with most advanced automatic video cameras and those taken by professional cameramen. This means that the final goal as described above has not yet been reached by the control process automatization. The greatest reason for the difference is that the automatization technology developed thus far for video cameras has just followed the automatization technology for still cameras, and has been effective only in making each taken image beautiful. Although successive images taken by the video cameras are required to be beautiful and easy to see, as described above, the conventional video camera manufactured with the automatization technology has only had a shoulder pad, an optimum center of gravity, and the like to meet such a requirement.

There are several reasons for the difference between successive images taken by professional and amateur cameramen. The first reason is that while the professional cameraman uses tripods when taking almost all scenes, the general video camera user takes pictures without using a tripod while carrying the camera by hand. The images taken by the layman are therefore liable to be unstable and cannot be seen well. Since the tendency is that the more video cameras spread, the smaller the ratio of tripods used, successive video images taken will become more unstable. The second reason is that images taken by home-use video cameras as they are carried by hand are more unstable than those taken by hand-held video cameras for professional use as the home-use video cameras are much lighter. Video images successively taken by the home-use video cameras get more and more unstable inasmuch as they become lighter each year. According to the third reason, the professional and amateur cameramen have different levels in the camera work. The professional cameraman has more than a few years of experience in almost all image taking modes, although the general consumers are substantially not disciplined in taking video images except for certain video camera fans. The unskilled layman has various problems in taking successive video images. They include failures in various picture taking modes, such as blurs occurring in the mode of taking still images, too fast a panning speed in the panning mode, variations in the panning speed, fluctuations of the camera in the panning mode, unstable images due to forces applied to move a zoom switch in the zooming mode, and fluctuating images taken in the dollying mode, or the mode of moving the camera with the aid of the dolly. As the video cameras become more popular among the unskilled general public, there are more users of a low image taking technique.

As described above, the requirement for technologies for producing successive images easy to see will be increased, rather than reduced, and will be of great importance.

Semiconductor technology has made much progress in the industry. CCD imaging panels of the size 4.4 mm × 5.7 mm have now been fabricated on a trial basis. Efforts have been made at a high rate toward a higher-packing density and a lower cost. It is expected that successive video images will be corrected solely electronically by using an imaging panel having abundant pixels and controlling the process of reading the pixels. Therefore, an important technical aim to achieve in the industry will be the development of a handy home-use video camera which allows a novice to take successive video images as stable as those taken by the hand-held video camera manipulated by a professional cameraman in various picture taking modes such as dollying, panning, tilting, and zooming, even without using a tripod.

The prior art directed to accomplish the foregoing aim will be reviewed. At least at present, there is no video camera realized as a product or commercialized which has functions to meet the above-mentioned requirement.

Video cameras used in combination with conventional video tape recorders comprise in combination a focusing means such as a lens and an image pickup means such as a CCD imager, which are fixed with accuracy and assembled together. Those video cameras are ineffective in suppressing ordinary image fluctuations caused by hand-induced blurs when a telephoto lens is used, and also ineffective in suppressing image fluctuations due to unsmooth camera rotation when the video camera is rotated at varying speed in the panning mode.

The prior art which appears most likely to achieve a video camera of simple construction and low cost is disclosed in Japanese Laid-Open Utility Model Publication No. 53-8938 for "Optical axis stabilizer device". The claimed invention is concerned with an optical axis stabilizer device comprising an even number of reflecting mirrors disposed in confronting relation on an optical path for successively reflecting an incident ray of light, at least one inertial load disposed on the optical axis and supported for angular movement, and means for reducing the angle of angular movement of the inertial load to ½ and transmitting the reduced angle to any of the reflecting mirrors. The disclosed arrangement aims to suppress image fluctuations through the inertial load which is low in cost and simple in construction.

However, the above prior-art arrangement has suffered the following problems:

The first problem is that since the image fluctuations are suppressed only by the inertial load, errors will be accumulated and reach the limit of a suppressing range in a short time when the image fluctuations continue for some time, with the result that the device will not function sufficiently as a product. Therefore, the prior invention has little advantage when carried out. For cancelling the image fluctuations, there should be an optimum ratio between the moment of inertia of the rotational shaft of each reflecting mirror and the moment of inertia of the inertial load, and if such an optimum ratio were not met, the device would not work. However, the disclosed invention is silent as to the optimum ratio, and hence is merely an invention showing an idea only and would not work well if reduced to practice.

The second problem is as follows: If the optimum ratio were found and the device worked, the device would be effective to somewhat suppress image fluctuations in the telephoto mode in which images are taken only in one direction, and would be effectively used in a still camera mode of taking images at a fixed point. However, when used in taking images in varying directions as a video camera, the image-taking direction would not be changed if the direction of the camera body were changed at the time of carrying the camera by hand. When the direction of the camera body is changed, the limit of the fluctuation suppressing range would be reached, and then the image would start to move. At this time, not only the image would be disturbed largely, but also the device would no longer be effective in suppressing image fluctuations thereafter. In addition, the direction of the camera body and the picture-taking direction would differ from each other, so that the device would be highly difficult to handle.

Furthermore, since the prior device fails to stabilize images in modes other than the fixed-frame picture-taking mode, the device has merit in being carried out for use as a video camera though it is of a low cost.

Some apparatus for preventing image fluctuation for optical apparatus are disclosed in U.S. Pat. Nos. 3,212,420, 3,378,326, and 3,473,861, but these are not suitable for video cameras. Japanese Published Patent 56-21133 discloses an apparatus for preventing image fluctuation usable for a video camera, but it is too heavy in weight and too poor in performance to be used as a practical video camera.

The industry has not been interested in developing video cameras with the foregoing functions for the reason that in normal picture-taking or imaging modes in broadcasting stations, it is customary to use tripods if possible, and successive video images thus taken are sufficiently beautiful and easy to see even without taking special precautionary measures. When taking images without using the tripod such as for news materials, the sophisticated technique or camera work of a professional cameraman is used to produce successive images of a desired image quality. Accordingly, no strong demand has existed in the art for image stabilizer devices. Although there are needs for such devices in fields requiring strict imaging conditions, the required characteristics are quite stringent. As the need for video cameras having an image stabilizing capability under normal imaging conditions does not originate from broadcasting stations, the industry has had no concern for such video cameras, and substantially no prior art has been developed for the technology for stabilizing video images taken under normal conditions.

The home-use video camera industry has directed attention to improving the quality of still video images, and will direct attention to improving the quality of successive video images in a few years after the present trend of development will have come to an end. Stated otherwise, no prior art has been developed for achieving low-cost video cameras, for either home use or industrial use, having an automatic ability to improve the quality of successive images which would be unstable and not easy to see that are taken by general consumers under normal hand-held conditions.

SUMMARY OF THE INVENTION

It is an object of the present invention to provide a low-cost and small-size camera apparatus capable of automatically correcting image fluctuations so that users of a low image-taking or imaging technique level including beginners can easily take successive video images which are beautiful and easy to see.

The term "image fluctuations" used herein includes hand-induced blurs caused when a stationary object is imaged in a fixed direction, and unsmooth or varying speeds of rotation at the time of rotating a video camera in panning and tilting modes.

A camera apparatus according to the present invention comprises focusing means for optically focusing a beam of light from an object, imaging means for converting an optical image produced by the focusing means into electrical or physiochemical information and issuing or recording the information as an image, means for detecting fluctuations of the camera apparatus and issuing a fluctuation detecting signal, means responsive to the fluctuation detecting signal for issuing an image fluctuation control signal, and means responsive to the image fluctuation control signal for suppressing fluctuations of the image due to the fluctuations of the apparatus. This camera apparatus can automatically control the fluctuations of images with a simple, small-size, and low-cost arrangement and through simple operation.

There has been developed no conventional camera apparatus such as a video camera having such an image fluctuation control capability, and the prior art has failed to achieve such a capability with a small-size and simple arrangement, at a low cost, and through simple operation.

The present invention has been successful in accomplishing the above capability based on the following findings that have not been discovered heretofore:

The first finding is that a frequency analysis of angular velocities of fluctuations generated when nonprofessional video camera users take images with video cameras held by hand has indicated that the fluctuations are present mainly in a frequency range of from 0.25 to 5 Hz as shown in FIGS. 1(b) and (c) (described later) of the accompanying drawings, and that controlling fluctuations ranging from 0.01 to 20 Hz including margins can remove any adverse effects on successive video images due to fluctuations produced when the images are taken by video cameras held by hand by general consumers.

The second finding will be described below. The fluctuation detecting means is required to have a certain resolution. Conventional fluctuation detecting means are quite costly for home use since most inexpensive spinning gyroscopes cost several hundred thousand yen. Although detecting means of a high resolution and high stability or less temperature drifts are very expensive, it has been found that sensors having an intermediate resolution and bad temperature drifts, such as vibrating gyroscopes which are not placed in an oven, are quite inexpensive to manufacture. The vibrating gyroscope as it is used for a home-use video camera has no rotating parts which would cause various problems. The vibrating gyroscope operates by vibrating a detector at a certain frequency, detecting, through phase separation or the like, a Coriolis force produced from the speed of vibration of the detector and the angular velocity of rotation of the overall detecting means with respect to an absolute coordinate system, and issuing the angular velocity as a detecting signal. The angular velocity is detected by a tuning fork or a vibrating beam. Experimental results about the tuning fork were reported by Mr. Ishizuka in "Characteristics of the vibrating gyroscope" in "Precision machine", January 1973, and VYRO of General Electric is famous for the vibrating beam. For further details, see United States Air Force Technical Reports No. FDR TDR-64-101, Oct. 1964 "Solidstate vibrating gyroscope technical study", Gate "Vibrating angular sensor may threaten the gyroscope" in "Electronics", June 10, 1968, and "Trends of gyro equipment" in the publication of the Japan Aeronautics and Space Society, issued June 1975. Furthermore, "Nikkei mechanical" issued Jan. 3, 1983 has reported on a tuning-fork-type vibrating gyroscope. These vibrating gyroscopes are small in size and can be manufactured at a low cost, but poor in temperature characteristics. Particularly, the type using a piezoelectric crystal is poor in temperature characteristics. Therefore, the vibrating gyroscope suffers poor temperature drifts and has found no appropriate applications, and for this reason, has not received much attention in the industry.

It has been found that dependent on the thermal design, frequencies of temperature drifts are naturally very low as with the time-dependent temperature rise curve of an ordinary heating body.

Since the above two frequency distributions are spaced from each other, they can be separated by a low-cutoff filter. Based on this fact, there has been devised a new process in which a sensor of a medium resolution and bad temperature drift is employed, and a low-pass filter is used to meet imaging modes of an ordinary amateur user for suppressing, with a control circuit, the frequency of fluctuations which tend to be produced at the time images are taken by general consumers with hand-held video cameras. There has also been devised another process in which the low-cutoff filter is bypassed or varied to have a lower cutoff frequency in imaging modes requiring image fluctuation control up to a low-frequency range close to a DC range, such as the panning and tilting modes. The process of rejecting low-frequency components suffering the temperature drift with the low-pass filter in the control system for correcting image fluctuations in order to eliminate the influence of the temperature drift, will hereinafter be referred to as a "damping mode".

By using the above process to optimize the constant of the low-cutoff filter to correct images, any crude moving images taken by the beginner can be made smooth and easy to see by the vibrating gyro sensor with no thermostat which has found no substantial use because it has bad temperature drifts though it has a certain resolution. With this system, the sensor can be manufactured far less costly. Therefore, it has been possible to produce a home-use video camera of a low cost capable of stabilizing images. Another advantage is that the overall device can be smaller in size and lighter in weight since the vibrating gyro sensor is smallest and lightest among existing gyroscopes such as a gas-rate gyroscope and a laser gyroscope.

The third finding is as follows: There has been devised a new arrangement in which various pieces of information are displayed on an image display unit in a finder or the like to convey the information to the video camera user. Furthermore, an indicia "+" is displayed on the image display unit and is moved as the user manually changes the direction of the camera body in the same manner as that in which a cursor input device for a CAD system operates, for thereby allowing various commands to be entered. To permit the beginner to handle the device easily, various automatic capabilities are added. For example, control characteristics for the damping mode and the like are changed depending on the zoom ratio, camera fluctuating conditions are displayed on the basis of a detecting signal from the fluctuation detecting means in the finder and control information from a control driver unit, and variations in the angular velocity in the panning and tilting modes are optimally controlled dependent on the zoom ratio, so that smooth successive video images will be produced without imposing any special burden on the camera user. For home-use video cameras, image correcting means include a mirror driving system, a lens driving system, an image-taking-system driving system, an image-pickup-tube electron beam deflecting system, and an imaging-panel pixel readout control system which will be of greatest importance as the semiconductor technology advances.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIGS. 4(a) and 5(a–e' and a'–e') are diagrams showing displays in a finder;

FIG. 19a is a block diagram, partly in perspective, of a camera apparatus according to a fourth embodiment;

FIGS. 19 (e–h) show the distributing condition of the angle formed by the direction of the camera body;

FIG. 19(i) shows an integration circuit;

FIGS. 28(a) through (d) are diagrams illustrative of the operation of a charge-transfer control system for the image pickup element;

FIGS. 29(b) through (g) are diagrams showing the principle of charge-transfer operation;

FIG. 31(a) is a horizontal cross-sectional view of the image pickup element;

FIGS. 31(b) through (e) are diagrams showing potentials illustrative of the principle of horizontal charge-transfer operation;

FIG. 32(a) is a vertical cross-sectional view of the image pickup element; and

FIGS. 32(b) through (e) are diagrams showing potentials illustrative of the principles of vertical charge-transfer operation.

DESCRIPTION OF THE PREFERRED EMBODIMENTS

According to a first embodiment of the present invention, any fluctuation of a video camera is detected by a fluctuation detecting means such as an angular velocity sensor or the like, and an image control circuit serving as a means for generating a signal to suppress an image fluctuation is responsive to a fluctuation detecting signal for generating an image fluctuation suppressing signal, the latter means comprising an optical axis correcting means such as a mirror for stabilizing an image.

Figure 1A:
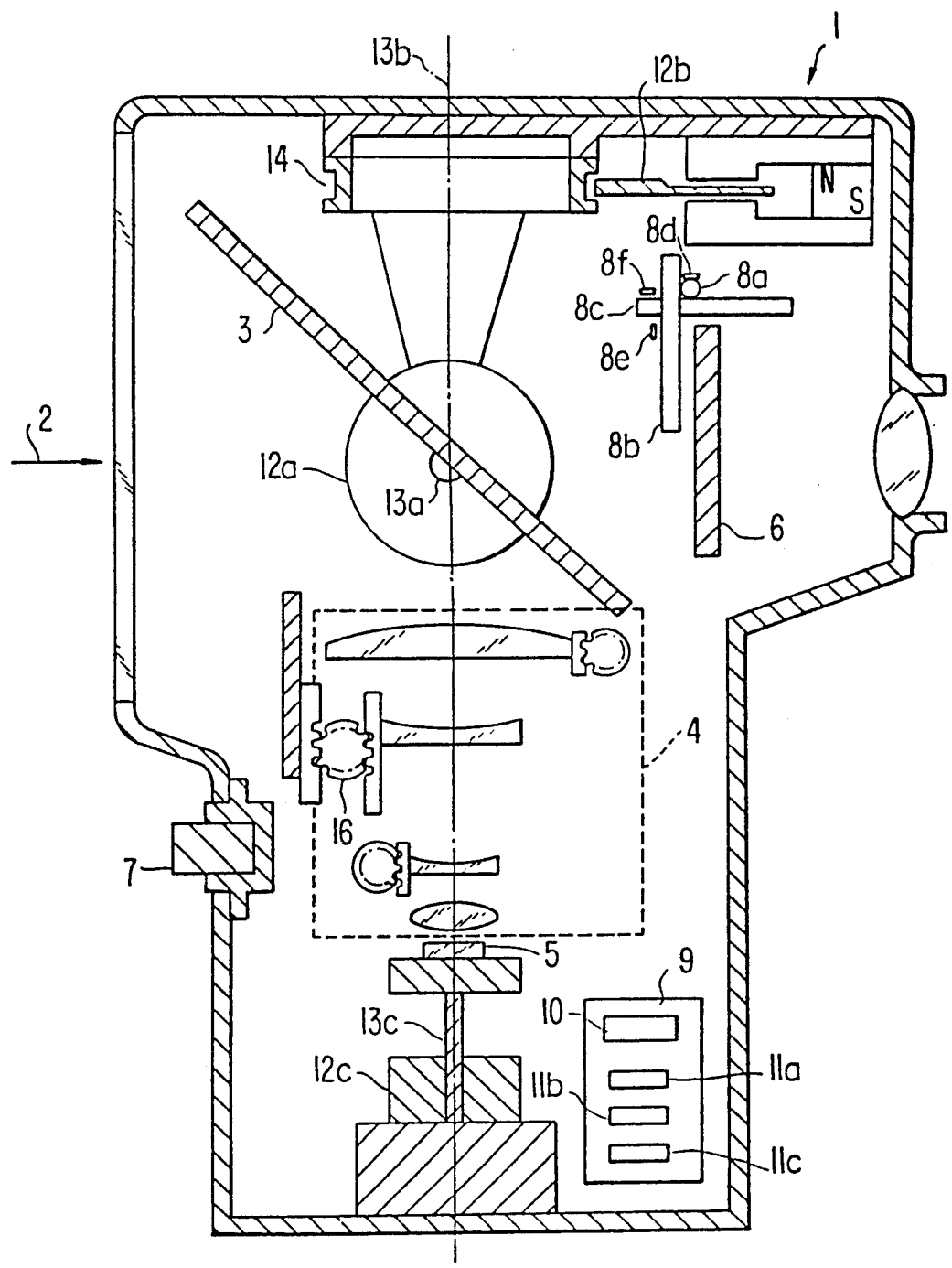
FIG. 1(a) is a cross-sectional view of a camera apparatus embodied as a video camera according to a first embodiment of the present invention.

FIG. 1(a) shows in cross section of a hand-held video camera 1 incorporating a single mirror, in which the present invention is embodied according to the first embodiment. While an image control circuit is not in operation, an incident ray of light 2 indicated by the arrow from an object is reflected by a mirror 3 and focused by a focusing means 4 comprising a plurality of lenses onto an image pickup element 5 such as a CCD imaging panel. An optical image formed on the image pickup element 5 is photoelectrically converted into an electric signal which is read and issues as a video signal. Part of the video signal is displayed on an image display unit 6 such as a liquid crystal display panel. While confirming the displayed image, the user manually controls the direction of the body of the video camera 1 to image the object. Since the image control circuit is not in operation at this time, any fluctuation of the video camera 1 affects the image. If the user is a general unskilled consumer, then the succession of images is quite awkward to see. This mode of operation is the same as that of the conventional video cameras.

Operation of image control according to the present invention will now be described. The image control circuit is normally de-energized to eliminate unwanted power consumption. When a two-step control switch 7 is depressed to a first step by the user to stabilize the image, the video camera now enters a control mode. Further depression of the control switch 7 energizes the second-step switch to enable a connected VTR to start recording video signals. At this time, pitch, yaw, and roll fluctuation detectors 8a, 8b, 8c of an angular velocity sensor or the like detect fluctuation components in the pitch, yaw, and roll directions, and detected signals are delivered to the image control circuit 9. The image control circuit 9 includes a main control circuit 10, and control circuits 11a, 11b, 11c for pitch, yaw, and roll components. Control signals for these pitch, yaw, and roll components are fed to pitch, yaw, and roll drivers 12a, 12b, 12c, respectively, which rotate a mirror rotation base 14 supporting the mirror 3 and the pitch driver 12a and an image pickup element 5.

With the above arrangement, image control can be effected through the control of imaging directions, and stable and easy-to-see successive images can be produced by controlling the components drivers in various modes in response to detection of the pitch, yaw, and roll components when the camera 1 fluctuates.

Figure 1B:
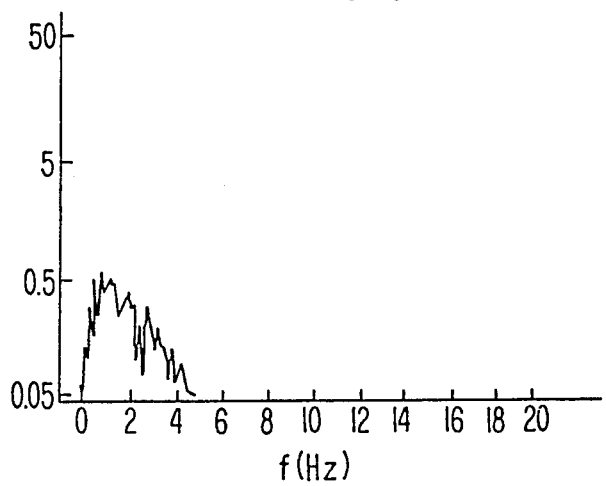
FIGS. 1(b) and (c) are diagrams showing fluctuation frequencies generated at the time of carrying the camera apparatus by hand.

FIGS. 1(b) and (c) are illustrative of frequencies of angular velocities of fluctuations as measured by a low-frequency spectrum analyzer supplied with a signal from an angular velocity sensor having a resolution of 0.01°/sec. and attached to a hand-held video camera in order to check fluctuations which the video camera suffers when it is used by a novice to take video images. FIG. 1(b) shows a fluctuation frequency distribution in the event that a fixed object is imaged by an unskilled user who remains stationary on the ground. FIG. 1(b) indicates that there are many frequency components in the range of from 0.3 to 4 Hz. In this case, slow fluctuations appear on the screen, and a study of a reproduced image shows that the image cannot be seen well due to fluctuations and that the images are apparently taken by an unskilled beginner.

Figure 1C:
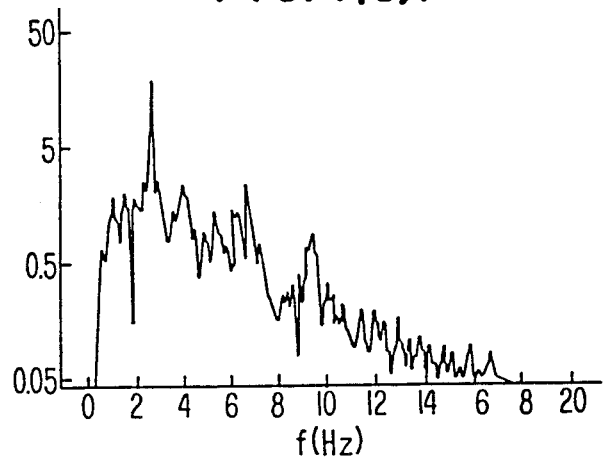
FIGS. 1(d) and (e) are views showing control switches.

FIG. 1(c) shows a fluctuation frequency distribution in case an object is imaged by the user who is running, which is a most strict condition for home-use video cameras, and there are many frequency components in the range of from 0.3 to 15 Hz. The image fluctuates violently and is not worth seeing.

Although only a portion of experimental results is shown, the result of frequency analysis in various imaging modes as indicated that any unwanted degradation of the quality of successive images taken by general consumers with hand-held video cameras can be substantially eliminated by suppressing fluctuations having frequencies in the range of from 0.03 to 12 Hz.

As described above, even if a fluctuation detector 8 has a variation error signal including a central temperature drift component of certain magnitude in its fluctuation detecting signal, it is possible to achieve thermal engineering optimization including the fluctuation detector to keep frequency components generated by the variation error signal based on a temperature drift which is dimensionally different from the absolute value of the variation error signal, within a certain frequency range. It has been experimentally confirmed that through such a setting, a low-cost hand-held video camera capable of stabilizing successive video images taken thereby while the camera is being held by hand can be achieved by cutting the temperature drift component in the frequency range with a low-cutoff filter dependent on the imaging mode. Operation of the control circuit for the above process will be described with reference to the block diagram of FIG. 2(a).

Figure 2A:
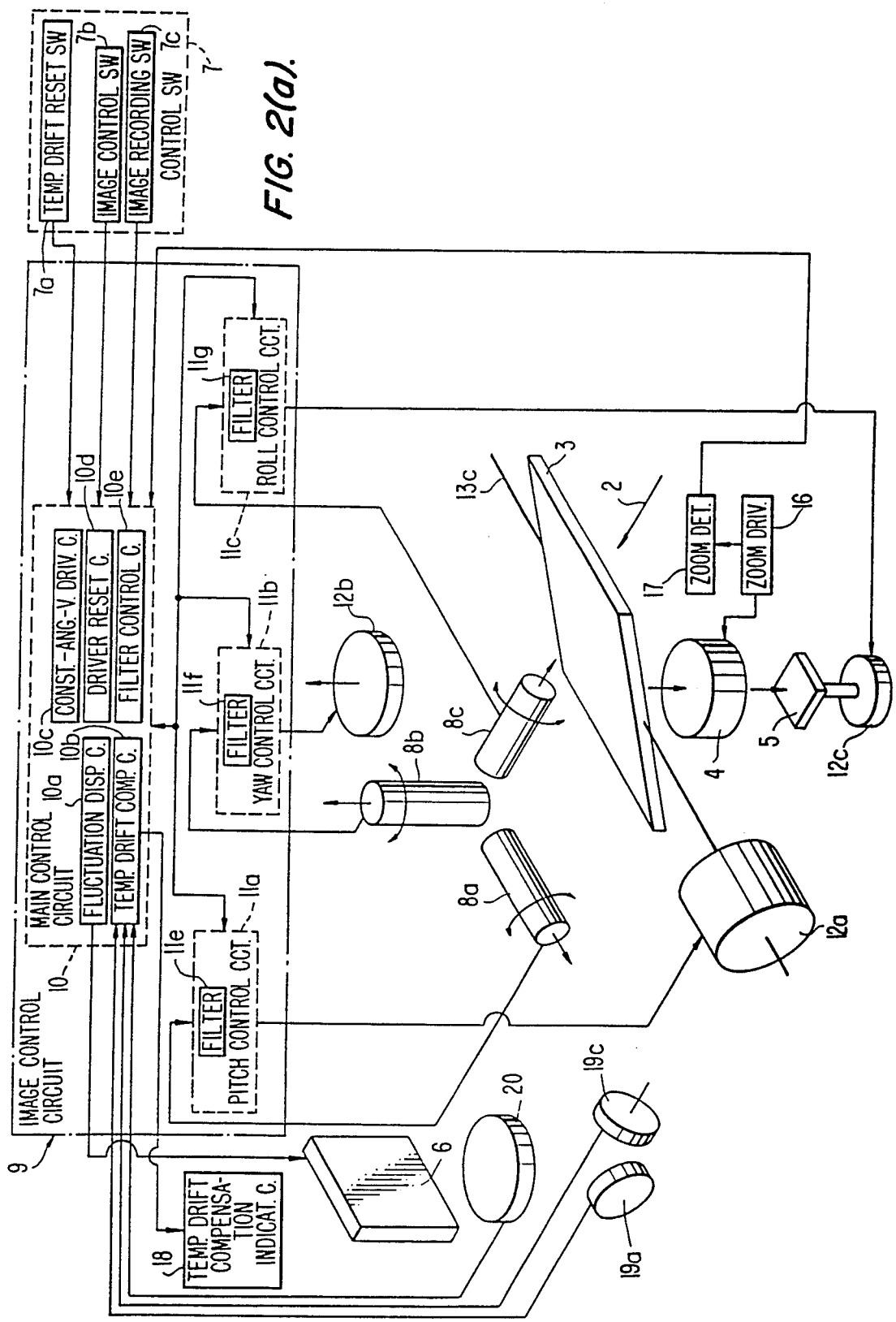
FIGS. 2(a) and (b) are block diagrams, partly in perspective, showing image control conditions.

FIG. 2(a) shows in perspective components of the video camera 1 of FIG. 1(a) which are of importance in describing operation of the invention and show in block form the control circuit and others. Added parts will be described below. The control switch 7 includes a temperature drift resetting switch 7a for compensating for a temperature drift of the fluctuation detecting means 8 before taking video images, an image control switch 7b for effecting switching between a still image taking mode, a damping mode, a passing mode, and other modes and for turning on and off an image control function, and an image recording switch 7c coacting with the image control switch 7b for starting to record image signals in the VTR. An image control circuit 9 for effecting various control modes based on commands from the control switch 7 is supplied with a signal from a zoom detector 17 connected to a zoom driver 16 for the focusing system 4 for controlling the panning mode or the like.

The image control circuit 9 includes a main control circuit 10 composed of five blocks.

The first block comprises a fluctuation display circuit 10a for displaying a fluctuation in a finder, but not in any special dedicated display unit in FIG. 2, the fluctuation angle being an angle between the direction of the camera body and an actual direction in which images are being taken, and determined from rotational angle signals from the drivers 12a, 12b, 12c. Since the fluctuation angle is displayed in the image display unit 6, the latter is shared by displayed images and displayed fluctuation angles, resulting in a reduced number of parts.

The second block is a temperature drift compensating circuit 10b. Almost all adapters for video cameras for use in broadcasting stations employ spinning gyroscopes which are of a high resolution, highly stable, do not produce a temperature drift in principle, and hence are not required to be corrected. However, the spinning gyroscope is too costly for home-use video cameras which are small in size and light in weight, say below 1 kg, has a short service life of 1000 hours, and is of a large size greater than a single dry cell of the UM-1 type. For the above reasons, the spinning gyroscope is not practically feasible in home-use video cameras. According to the present invention, there is employed a small-size vibrating gyroscope which is of a medium resolution, suffers a large temperature drift, is much less expensive than the spinning gyroscope, and weights only a few grams. To allow use of the vibrating gyroscope in the still image mode, the temperature drift compensating circuit 10b is added dependent on the design of the video camera.

The temperature drift compensating circuit 10b is used as follows: The video camera 1 is placed on the ground or any other place subjected to little vibration or fluctuation, and the temperature drift resetting switch 7a is depressed. Since the fluctuation detecting signal is zero under such condition, the detecting signal may be considered to be indicative entirely of a temperature drift. Thus, the temperature drift can be measured by measuring the angular velocity or the angle detecting signal for a fixed period of time after the resetting switch 7a has been closed. When stable compensating data for the temperature drift is obtained while monitoring a time-dependent variation of the temperature drift, the measurement of the temperature drift is completed, and the completion of the measurement is reported to the user by a buzzer sound or any display from a circuit 18 for indicating the completion of temperature drift compensation. Upon receiving such an indication, the user can start taking images in the still imaging mode or the like. Since the compensating value suffers from a temperature-dependent variation when video images are being taken for a long time, the temperature drift compensating data may be modified by information from temperature sensors 8d, 8e, 8f (FIG. 1(a)) disposed in or adjacent to the fluctuation detectors 8a, 8b, 8c. Thus, video images can be taken for a long period of time in the still imaging mode. Where the required accuracy for temperature drift compensation is low, temperature drifts can be compensated for by signals from the temperature sensors 8d, 8e, 8f without using the temperature drift resetting switch 7a, which may therefore be omitted for such a low compensation accuracy.

In the foregoing imaging mode, the video camera is fixedly positioned on the ground or other stationary base when any temperature drift is measured. Now, a process for compensating for a temperature drift will be described when the video camera is held by hand at the time of taking images on the ground. As shown in FIG. 2(a), known pendulum units 19a, 19c are arranged in the pitch and roll directions, and the angles between the pendulum members in the pendulums 19a, 19c and the camera body are first reset by the temperature drift resetting switch 7a and averaged for a fixed interval of time. If the user of the video camera stands on the same place, then the average value of the angle differences of the pendulum in the fixed interval of time is indicative of the average value of the angle between the direction of gravity and the camera body for the fixed interval of time. At the accuracy required by the video camera, the direction of gravity can be regarded as being equivalent to a uniaxial direction of the absolute coordinate system, so that it may be said that the average angle p of the pendulums for the fixed time interval has been determined for the angles between the absolute coordinate system and the camera body.

$$\overline{\theta p} = \frac{\int_0^{to} \theta p \, dt}{to} \quad (1)$$

In the same time interval, the angles formed between the camera body and the fluctuation detectors 8a, 8c are determined from the signals from the fluctuation detectors 8a, 8c, and these angles are reset and averaged in the same time interval in the same manner as described above. Then, the average angle $\overline{\theta a}$ is determined by the fluctuation detector for the angles between the camera body and the absolute coordinate axes.

$$\overline{\theta a} = \frac{\int_0^{to} \theta a \, dt}{to} \quad (2)$$

If the temperature drift is zero, and the video camera user does not move in the fixed time interval, then $\overline{\theta p} = \overline{\theta a}$. However, a temperature drive $\theta d$ is present. Assuming that a true average angle of the fluctuation detectors is expressed by $\theta r$, $$\overline{\theta a} = \frac{\int_0^{to} (\theta r + \theta d) dt}{to} \quad (3)$$

By subtracting the equation (1) from the equation (3), $$\overline{\theta a} - \overline{\theta p} = \frac{\int_0^{to} (\theta r + \theta d) dt}{to} - \frac{\int_0^{to} \theta p \, dt}{to} \quad (4)$$

Since it can be regarded that $\theta r = \theta p$, $$\overline{\theta a} - \overline{\theta p} = \frac{\int_0^{to} \theta p \, dt}{to} = \overline{\theta d} \quad (5)$$

Therefore, since the pendulums 19a, 19c detect acceleration, an error is produced. However, unless the user is moved, or if the velocity vectors of the video camera at the starting and ending of the fixed interval of time for the measurement are equal to each other, then no acceleration-induced error is produced. The temperature drifts are then determined under this condition. With the pendulums 19a, 19c used, amounts of compensation for the temperature drifts of the fluctuation detectors 8a, 8c in the pitch and roll directions are automatically determined upon actuating the temperature drift resetting switch 7a or in a fixed period of time by effecting the above cycle of measurement of the fluctuation detector temperature drifts. The temperature drifts can therefore be compensated for without fixing the video camera with respect to the ground. The foregoing temperature drift compensation is particularly advantageous in situations in which there is a demand for fixed images taken by the hand-held video camera in a supertelephoto setting. A magnetic detector 20 is provided for detecting the magnetic north pole. An angle $\theta m$ between the pointer of the magnetic detector 20 and the camera body is in poor resolution and unstable because of an error signal generated by a magnetic material such as iron. The magnetic detector 20 alone is not effective enough as a means for detecting fluctuations in the yaw direction of the video camera. However, the average value of positions of the pointer in a certain period of measurement time is indicative of the magnetic north pole, and the longer the measurement time, the stabler the angle $\theta m$.

The fluctuation detector of the invention has a medium resolution and a poor thermal stability. Although the resolution thereof meets the requirement of the video camera, the poor temperature drift causes more errors to be accumulated as the measurement time is longer. As with the pendulums, the average for a fixed time interval of angles $\theta_m$ between the magnetic detector 20 and the camera body is determined, and also the average for the same time interval of angles $\theta_b$ between the yaw fluctuation detector 8b and the camera body is determined for thereby finding an amount of compensation for the temperature drift of the fluctuation detector 8b. The effect of the temperature drift on the fluctuation detector 8b is reduced by compensating for the same with the determined amount. Since the geomagnetic field has a vector toward the magnetic north pole on the surface of the earth, it is possible under certain conditions to compensate for temperature drifts in the pitch and roll directions, other than the yaw direction. Using or combining the above temperature drift compensating processes, images can be taken in the fixed imaging mode even with the low-cost, small-size fluctuation detecting means suffering large temperature drifts, such as the vibrating gyroscope.

The third block in the main control circuit comprises a constant-angular-velocity driver circuit 10c. Although the fluctuation detector 8 can detect the absolute coordinate system, accurate panning and tilting can be performed by rotating the imaging direction at a constant angular velocity in the yaw or pitch direction with respect to the absolute coordinate system. In the panning mode, the imaging direction is rotated while the camera body is oriented in the same direction. Where the limit of the control range is approached during rotation of the imaging direction, an indication for rotating the camera body is displayed in the finder as shown in FIGS. 4 and 5 by the fluctuation display circuit 10a to prevent the panning mode from being stopped. The user then rotates the camera body in the direction of panning based on the displayed indication, for thereby continuing image control. The panning mode is controlled in two methods as described later on.

The fourth block in the main control circuit is a driver resetting circuit 10d. During image control, the direction of the camera body is not necessarily aligned with the actual imaging direction. Where image control is disabled when the above directions are not aligned with each other, the control drive systems are stopped at the time image control is disabled, and the user has to take images in a direction different from the camera body direction. This makes control operation difficult for general consumers. When image control is abruptly interrupted during imaging operation, images taken before and after the interruption are not smoothly joined in succession. The driver resetting circuit 10d operates in response to an off signal from the image control switch 7b or a control completion signal in the image control circuit 9 for gradually initializing the image control means such as the mirror 3 with a certain time constant upon completion of image control. This allows the user to take easy-to-see successive video images.

Figure 1D:
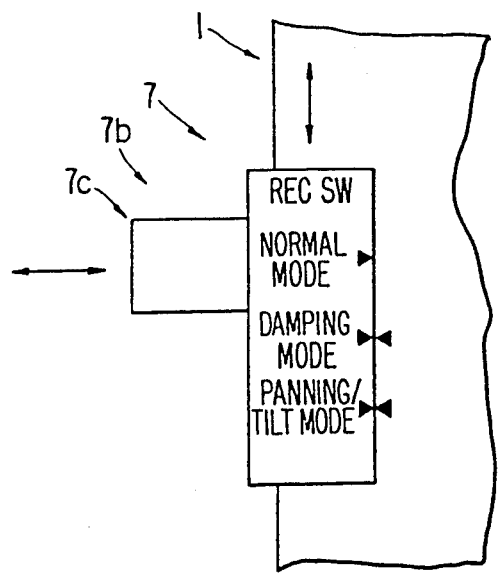

The fifth block is a filter control circuit 10e. As described above, the angular velocity sensor having a very good resolution and a high stability particularly with a good temperature drift is too expensive as is apparent from the cost of the spinning gyroscope, and cannot be used in home-use video cameras which are required to be low in cost. However, we have confirmed that sensors of a slightly poorer resolution and a considerably poor temperature drift can be manufactured much less costly. In particular the known vibrating angular velocity sensor has drawn much attention. This sensor meets the required resolution for home-use video cameras, but suffers a considerably bad temperature drift, which might be improved in the future. However, it is not known as present when the temperature drift can be corrected at a low cost. According to the present invention, attention has been drawn to the fact that zero-point offset voltage drifts of the angular velocity sensor are of low frequencies, and this low-range temperature drift frequency range and the vibrating frequency ranges shown in FIGS. 1(b) and (c) which are responsible for hand-induced blurs in the home-use video cameras are separable by filters. In view of this fact, there is provided a damping control imaging mode in which low-cutoff filters 11e, 11f, 11g are placed in the control system. By setting the image control switch 7b to the damping control imaging mode as illustrated in FIG. 1(d), or by simply depressing the image control switch 7b in the event that there is no damping control imaging mode, the filter control circuit 10e causes the filters 11e, 11f, 11g in respective pitch, yaw, and roll control circuits 11a, 11b, 11c to be inserted in the control system, or these filters are inserted in advance to cut off low frequencies to effect control only on fluctuation in a certain frequency range. Where the beginner takes images in this damping mode, fluctuations of high frequency components of fractions of 1 Hz or higher due to the hand-induced blurs as shown in FIGS. 1(a) and (b) can be controlled. Frequency components which make images difficult to see are of at least fractions of 1 Hz, and fluctuations in the range of from 3 to 10 Hz are particularly responsible for images that cannot be seen well. However, such harmful fluctuations can fully be removed by the damping mode according to the present invention. Specifically, it has been found that the temperature drift and the general hand-induced blurs can be removed to produce easy-to-see images by using filters having cutoff frequencies ranging from 0.01 Hz to 1 Hz. However, upon image control in the panning and tilting modes, the control system is required to have lower frequency characteristics. The control system is also required to have lower frequency characteristics when taking images through the fixed video camera in a telephoto setting after the temperature drift has been compensated for. To meet this requirement, the user actuates the image control switch 7b to select the panning-/tilting mode as shown in FIG. 1(d), and when the video camera enters the panning mode, the filter control circuit 10e responds and changes the settings in the filters 11e, 11f, 11g in the control circuits 11a, 11b, 11c, for meeting the above requirement. This operation will be described in greater detail later with reference to the description of the panning mode.

The arrangement of the first embodiment has been described with reference to FIGS. 1 and 2. Operation and advantages of the video camera as it is used will hereinafter be described with reference to FIGS. 3 through 9.

As mentioned earlier, there are various modes available in taking video images with the video camera. The modes include a fixed imaging mode in which a fixed object is imaged in a fixed direction, a random imaging mode, panning and tilting modes, and a dolly mode.

Operation and advantages of the fixed imaging mode will first be described in which a fixed image is imaged by a video camera placed on a tripod at a fixed imaging angle. This mode is of little importance for the present invention, but will be described because it is easy to illustrate and it is a basic mode. The control switch 7 is set to the to the fixing mode. Assuming that temperature drifts of the fluctuation detectors 8a, 8b, 8c are compensated for to a certain range by the temperature drift compensating circuit 10b in the main control circuit 10, the fluctuation detectors 8a, 8b, 8c are able to detect camera fluctuations accurately with respect to the absolute coordinate system.

Figure 3B:
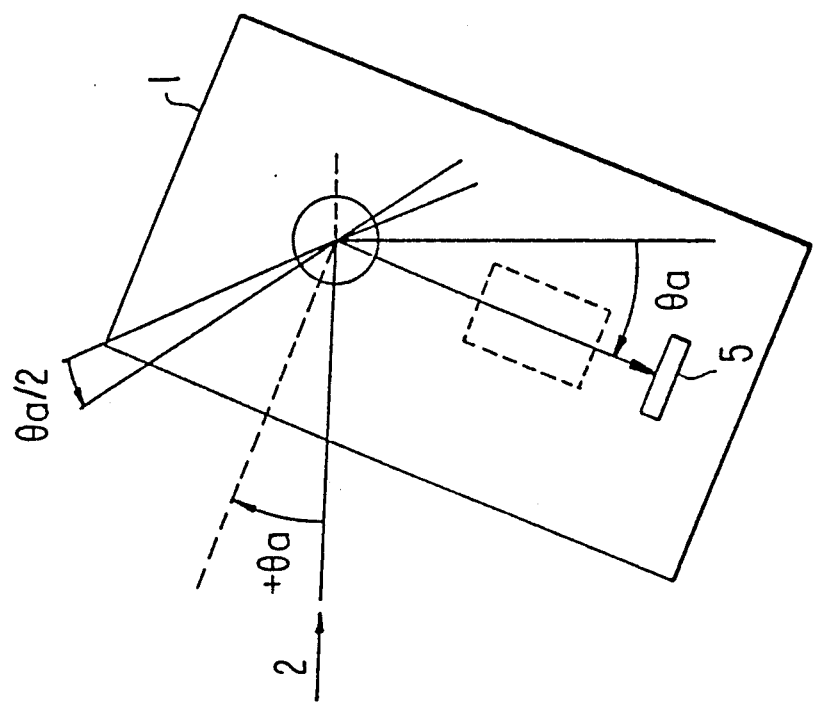
FIGS. 3(a) and (b) are diagrams showing control of fluctuations in a pitch direction.
Figure 3A:
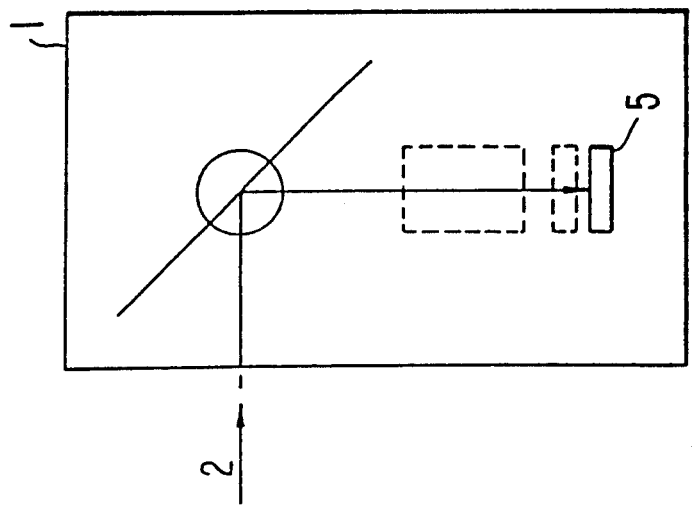
Figure 4A:
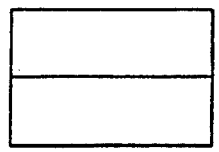
Figure 4B:
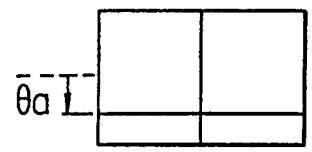
Figure 4C:
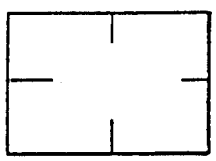
Figure 4D:
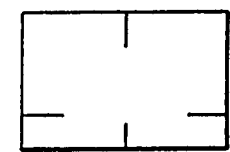
Figure 4E:
Figure 4F:
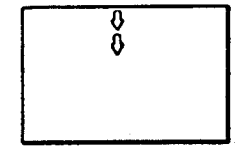
Figure 4G:
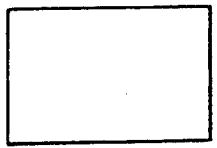
Figure 4H:
Figure 4I:
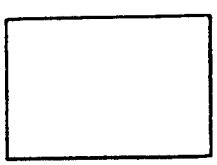
Figure 4J:
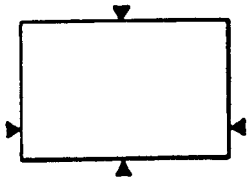

Operation with respect to a fluctuation in the pitch direction will first be described. FIG. 3(a) shows a position of the camera before it fluctuates. FIG. 3(b) shows a position in which the camera has fluctuated in the pitch direction. If the camera is tilted $+\theta a$ clockwise in the pitch direction with respect to the absolute coordinate system, then the incident light 2 is reflected by the mirror 3 when the latter is tilted $\theta a/2$ counterclockwise with respect to a relative coordinate system of the camera. The reflected light is rotated $\theta a$ clockwise with respect to the absolute coordinate system as shown in FIG. 3(b) from the position of FIG. 3(a), and focused centrally on the image pickup element 5. As long as the camera body fluctuates in the pitch direction within a control range, the incident light 2 remains focused centrally on the image pickup element 5, so that the image pickup device 1 can produce a video signal indicative of a stationary object when the video camera 1 fluctuates in the pitch direction. The above condition is effective as far as the camera body fluctuates in the pitch direction within the control range. As shown in FIGS. 4(a) through (j), the angle between the camera body direction and the actual imaging direction, that is, the fluctuation angle $\theta a$, is displayed by the fluctuation display circuit 10a in the finder. FIG. 4(a) shows a display in the finder prior to the camera's being fluctuated. FIG. 4(b) shows a finder display after the camera has been fluctuated. As illustrated, a mark is displayed dependent $\theta a$, that is, a horizontal line is lowered when the camera is directed upwardly. Therefore, the camera is maintained in the control range at all times by controlling the camera direction so that the crossing point will be positioned at the center of the finder. When the camera gets out of the control range no matter how the user tries to get the crossing point centered, then the main control circuit 10 may detect such a condition and lower the zoom ratio. The display is effected by indicating the angles of rotation of the drivers 12a, 12b, 12c through the fluctuation detecting means. In the fixed imaging mode, the angle between the actual imaging direction which is the same as the direction of the absolute coordinate system detected by the fluctuation detecting means and the direction of the camera body. When the camera is directed upwardly, the indication is lowered, and the user will turn the camera in the direction in which the indication is lowered. This mode of display is natural and can easily be understood by the user, so that the camera can easily be manipulated. Instead of the display of FIG. 4(b), displays or indications may be made as shown in FIGS. 4(d), (f), (h), (j). With these displays employed, the user can easily keep the camera body direction toward the center of the control range at all times. These indications not only make the camera easy to handle, but also can increase the control range, and serve as a pointer in the automatic panning mode or various function switches.

Fluctuations in the yaw direction will be described. It is supposed that as shown in FIG. 5(a'), the video camera 1 is held stationary with respect to one direction in the detected absolute coordinate system as shown by the dotted-line arrow for imaging an object. Since the fluctuation angle $\theta b = 0$ in the yaw direction, the crossing mark is positioned centrally in the finder as shown in FIG. 5(a). Then, when the direction of the camera body is turned $\theta o$ counterclockwise with respect to the detected absolute coordinate system as shown in FIG. 5(b'), since the clockwise rotation is defined as a positive direction, stated otherwise when the direction of the camera body is turned $-\theta o$, then the displayed mark is moved in a direction opposite to the direction in which the camera body has moved as shown in FIG. 5(b). The yaw driver 12b is naturally rotated $\theta o$ clockwise or $+\theta o$ with respect to the relative coordinate system of the camera body, so that the axis of the incident light 2 reaches the center of the image pickup element 5. With the single-mirror system, however, the image would be twisted $\theta o$. To prevent this, the main control circuit 10 adds a signal commensurate with the yaw angle $\theta_a$ for driving the roll control circuit 11c to thereby rotate the roll driver 12c through $\theta o$ for correcting any twisting of the image. For a simpler and less costly construction, the image pickup element 5 may be mechanically coupled to the yaw driver 12b for corotation through the same angle in the same direction, and all of the roll control parts which are less effective than the pitch and yaw control parts may be dispensed with. In the same manner as described above, fluctuations in a clockwise yaw direction can also be controlled for producing stable images as shown in FIG. 5(d). As with the control of the fluctuations in the pitch direction, the display is moved toward the center of the control range by directing the camera body in the direction in which the display has been moved. Accordingly, it is less frequent for the video camera to be moved out of the control range under normal imaging conditions.

Figure 1E:
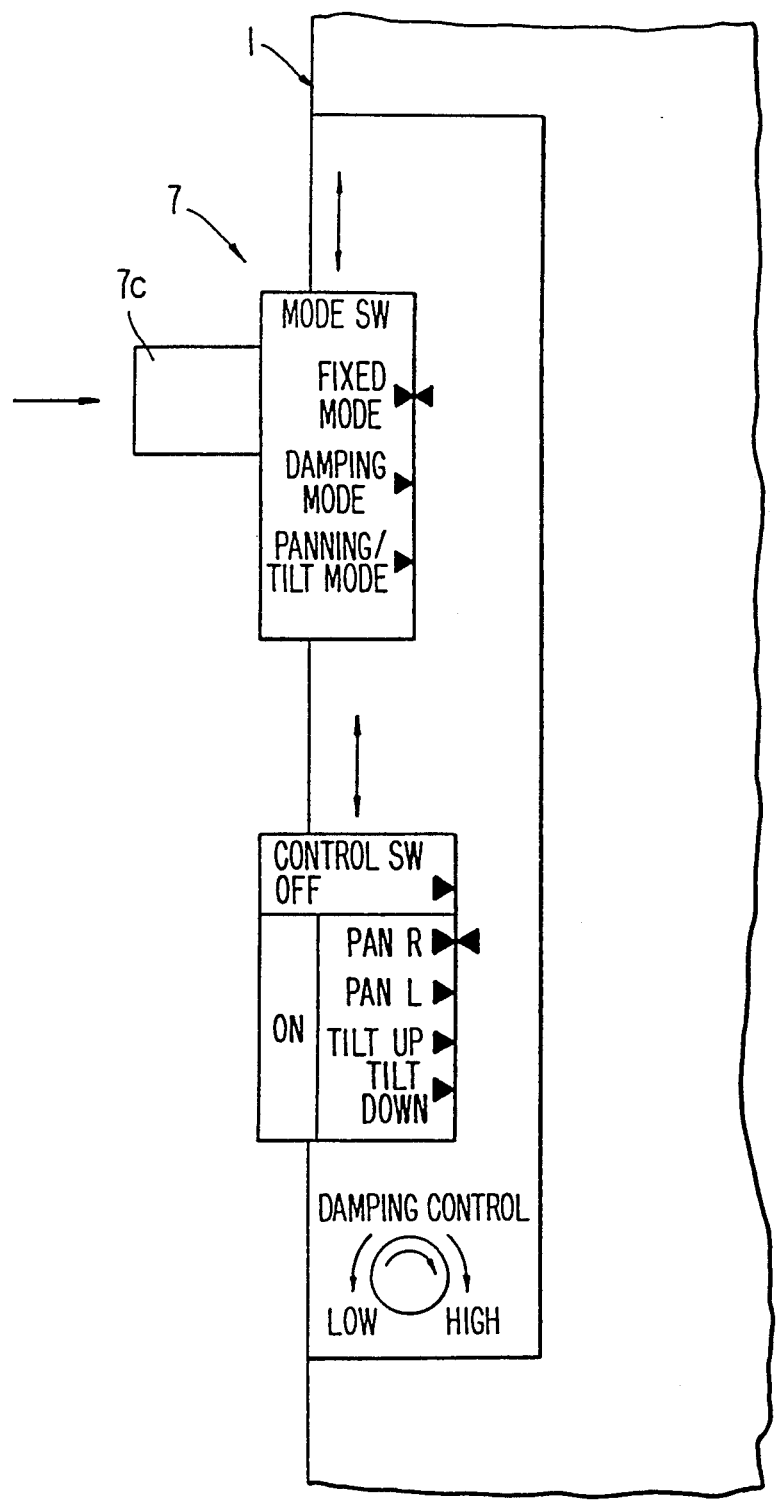

Operation of the video camera in the random imaging mode in which a randomly moving object is imaged will be described. General consumers are most likely to take images in this random imaging mode. The present invention and the conventional image pickup accessories for broadcasting use are widely different as to this random imaging mode. The cost and size factors make it difficult to incorporate the conventional image pickup accessories in home-use video cameras. Even if the conventional image pickup accessories were assembled in the home-use video cameras, such a combination would be widely different from the invention. Where a mechanical control system is used, since this system is only capable of fixing an imaging direction to one direction, the video camera has to be put out of control in the random imaging mode, resulting in a difficult operation. In the case of an electronic control system, the imaging direction is fixed in principle to the direction of a reference imaging optical axis, and the detected absolute coordinate system is biased by a control lever to change the direction of the reference imaging optical axis electronically. This system is therefore complex in arrangement, and the imaging direction cannot be altered without manipulating the control lever. Following the object while seeing the images is analogous to performing a TV game, and such a control operation requires skill and is complicated. Therefore, the electronic control system is not suitable for use in home-use video cameras not only for cost but also for controllability. According to the present invention, the damping mode is established for placing the low-cutoff filters for passing high frequencies ranging from 0.01 to 0.5 Hz into the control system, as described in detail with respect to the filter control circuit 10e. When the filters are inserted, i.e. in the damping mode, the user may only depress the two-step control switch 7 to one step without doing any additional operation for producing as smoothly successive video images with the hand-held video camera as they would be if a tripod with an oil damper were used. To meet some user's preference, a damping control knob is provided as shown in FIG. 1(e) for the user to be able to change the characteristics of the low-cutoff filters. This arrangement lets more users find the damping mode acceptable. The damping mode is of great advantage in that people having an imaging technique for taking awkward images can produce smooth successive images with a hand-held video camera, and hence successive images taken are improved and the video camera can easily be handled. Since the damping mode cuts off a temperature drift, a vibrating gyroscope can be employed which has found no substantial application in the past through it has long been known in the art, since the vibrating gyroscope suffers large temperature-dependent variations though it has a certain resolution. With the temperature compensation omitted, the vibrating gyroscope can be used without any adjustment. Thus, a video camera of a reasonable cost which is effective in stabilizing images can be achieved. In particular, by omitting the long-time fixed imaging mode and placing the filters always in the control system, a simpler, easier-to-control, and lower-cost video camera is accomplished for stabilizing video images. Even with this function only, there are strong consumer's demands for such a video camera.

Figure 2B:
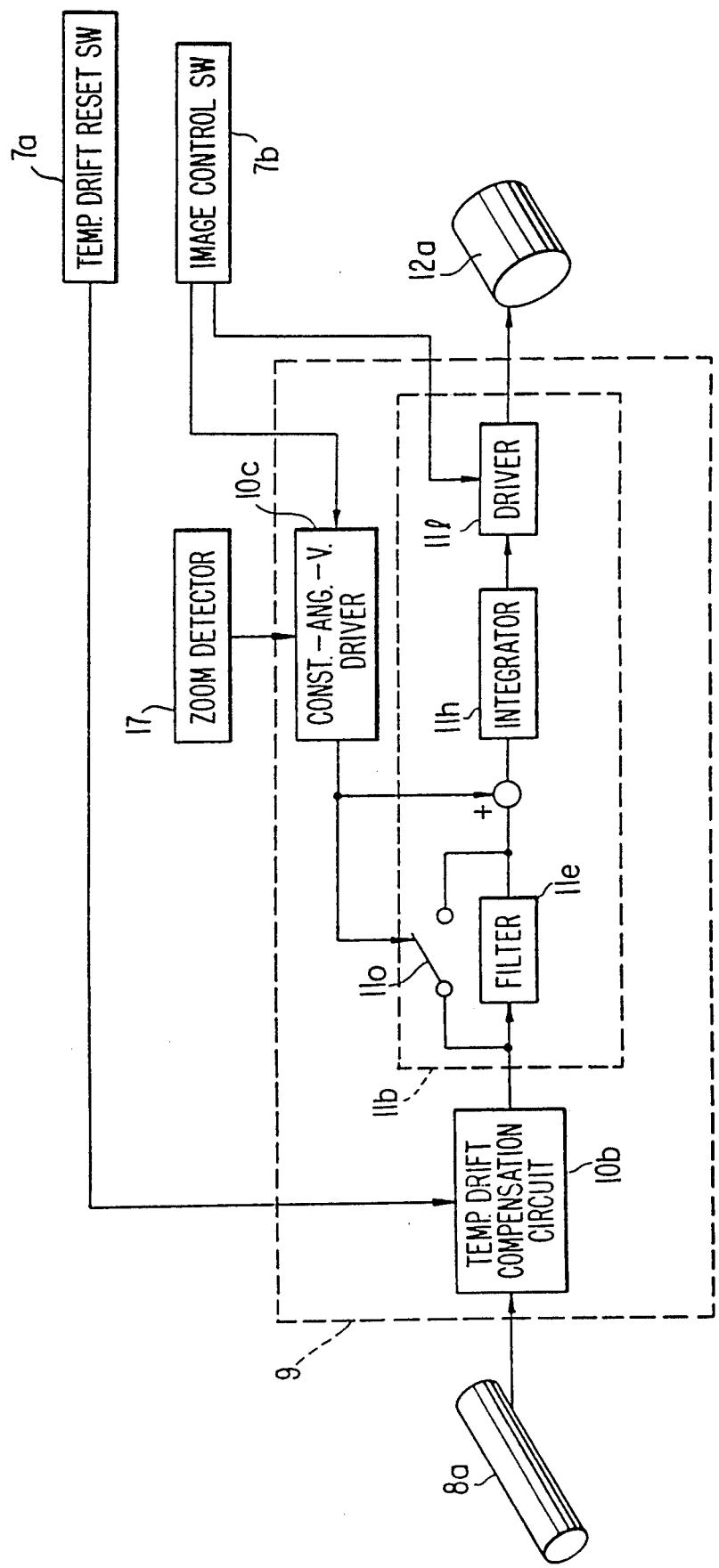
Figure 6:
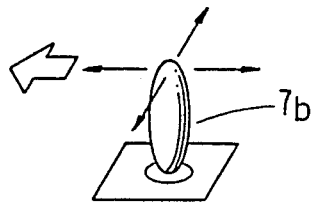
FIG. 6 is a perspective view showing directions in which the control switch is actuated.

Basic operation of the third panning and tilting modes will be described in detail, although it has been described with respect to the constant-angular-velocity driver circuit 10c. A specific arrangement as shown in FIG. 2(b) may be employed for the corresponding block in FIG. 2(a). According to the illustrated embodiment, the pitch fluctuation detector 8a comprises an angular velocity sensor such as a vibrating gyroscope for detecting the angular velocity of a fluctuation. The fluctuation detector 8a suffers from a temperature drift of an offset voltage at the zero point. Where the temperature drift is large, the control switch 7 of FIG. 1(d) is shifted to the panning/tilting mode. Now, the temperature drift compensation indicating circuit 18 issues a command meaning "Direct the camera body in a certain direction for a certain time" in letters in the image display unit 6 or in another portion of the finder or in sounds, and the user maintains the hand-held camera in a certain direction until a completion command comes. The average of fluctuation detecting signals from the fluctuation detector 8a during this time should be close to zero if there is no zero point drift. As a consequence, the zero point drift or the temperature drift at the time of taking images is determined from the average of the detecting signals during the measurement period, and the temperature drift is suppressed to a certain range by the temperature drift compensating circuit 10b. The error of the angular velocity due to the temperature drift is much smaller than a large constant angular velocity such as in a panning mode. Where a panning mode is started under this condition, and provided the camera is initially in the damping mode in which a low-pass filter 11e is connected as shown in FIG. 2(b), which has a high cutoff frequency and fails to detect a low-range fluctuation angular velocity, the panning at the constant angular velocity is regarded as being of a DC frequency, and no constant-angular-velocity control can be effected. To prevent this, the following process is carried out: By depressing the control switch 7 in the panning direction as shown in FIG. 6, or more specifically by setting the control switch 7 as shown in FIG. 1(e) to slide the mode switch to the panning/tilting mode while depressing the recording switch 7c, the constant-angular-velocity driver circuit 10c applies a constant-angular-velocity signal with a certain time constant to the yaw control circuit 11b as shown in FIG. 2(b). More specifically, the cutoff frequency of the low-cutoff filter 11e is gradually lowered until finally switch 11o is closed to bypass the filter 11e. At the same time, a constant-angular-velocity DC signal is gradually applied between the filter 11e and an integrator 11h, and converted by the integrator 11h into a gradually-rising ramp-shaped constant-angular-velocity drive signal which is applied to the yaw driver 12a. Irrespectively of the unstable camera body direction, an automatic panning mode is started at the constant angular velocity. By sliding the panning switch as shown in FIG. 1(e) to turn off the panning mode, the panning mode is gradually completed and the video camera returns to the original damping imaging mode. At this time, the filter is turned on, and its cutoff frequency is gradually increased, while the constant-angular-velocity drive signal from the constant-angular velocity driver circuit 10c is gradually decreased. The state of the panning mode is equivalent to the condition in which the detected absolute coordinate system with the yaw direction detected is rotated counterclockwise through $\theta_o$ in each unit time to. Therefore, as long as the video camera is in the control range, the video camera takes images in the panning mode at a constant angular velocity of $\theta o/to$.

Figure 7A:
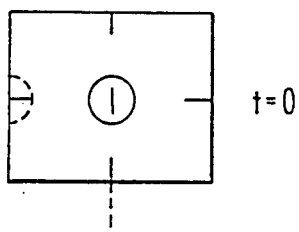
FIGS. 7(a–h) are diagrams explanatory of operation in a panning mode.
Figure 7B:
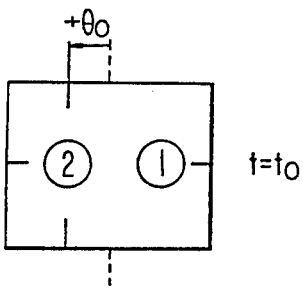
Figure 7C:
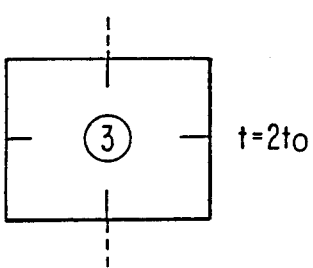
Figure 7D:
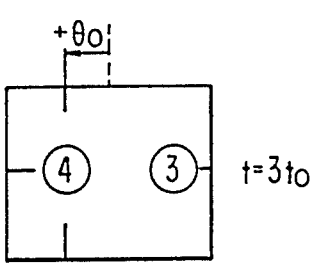
Figure 7E:
Figure 7F:
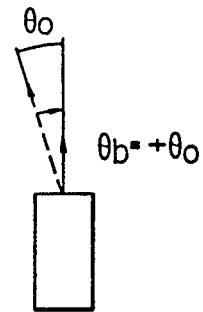
Figure 7G:
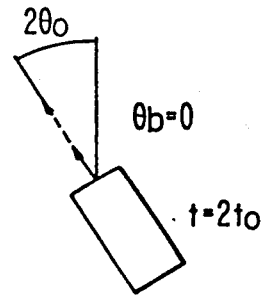
Figure 7H:
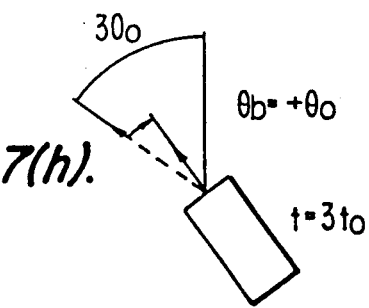

In the normal panning mode, the average angular interval through which the camera moves ranges from 90° to 180°. If this angle should be covered only by controlling the imaging optical axis without changing the direction of the camera body, the cost of the video camera would be prohibitively high as described before with reference to the conventional imaging accessories. No such control would be practically feasible with an electronic correcting system for image pickup panels which will be available in the near future. It would be too difficult for the novice to handle the camera if the camera direction were too different from the imaging direction. The fluctuation display circuit 10a in the finder, which is one of the features of the present invention, facilitates panning with a video camera having a narrow control range for an imaging direction. More specifically, by directing the video camera in a direction in which the indication moves in the finder as shown in FIG. 5, the direction of the video camera is moved toward the center of the control range, as described before. Since the same display or indication appears in the panning mode, when an automatic panning mode is started, the detected absolute coordinate system is equivalently rotated counterclockwise through $\theta o$ as shown in FIG. 7(f) during a time interval from t=0 to t=to as illustrated in FIG. 7(b). As the image is controlled naturally, the image which has rotated counterclockwise through $\theta o$ as shown in FIG. 7(b) is obtained irrespectively of the rotation of the camera body, or without rotating the camera. The angle $\theta b$ of deviation of the camera which is angularly displaced $\theta o$ clockwise with respect to the detected absolute coordinate system rotating at a constant angular velocity in FIG. 7(f) is regarded as being equal to $+\theta o$ based on the same definition as illustrated in FIG. 5(d'). Therefore, the same fluctuation display as in FIG. 5(d) appears in the finder as shown in FIG. 7(b). When the user rotates the video camera in the direction in which the fluctuation display is moved, that is, counterclockwise, the direction of the video camera is moved toward the center of the control range when t=2 to as illustrated in FIG. 7(g), followed by the movement of the detected absolute coordinate system at a constant angular velocity as shown in FIG. 7(h). When the image control switch 7b is finally turned off to finish the panning, the constant-angular-velocity signal from the constant-angular-velocity driver circuit is gradually reduced with a certain time constant as described above, whereupon the video camera returns to the original fixed imaging mode or the damping imaging mode. Optimum panning speeds for producing beautiful and easy-to-see images are different in telephoto and wide-angle settings. The constant-angular-velocity driver circuit 10c naturally has a capability for changing panning speed dependent on information about the zoom ratio from the zoom detector 17.

Another automatic panning mode will now be described.

Figure 8:
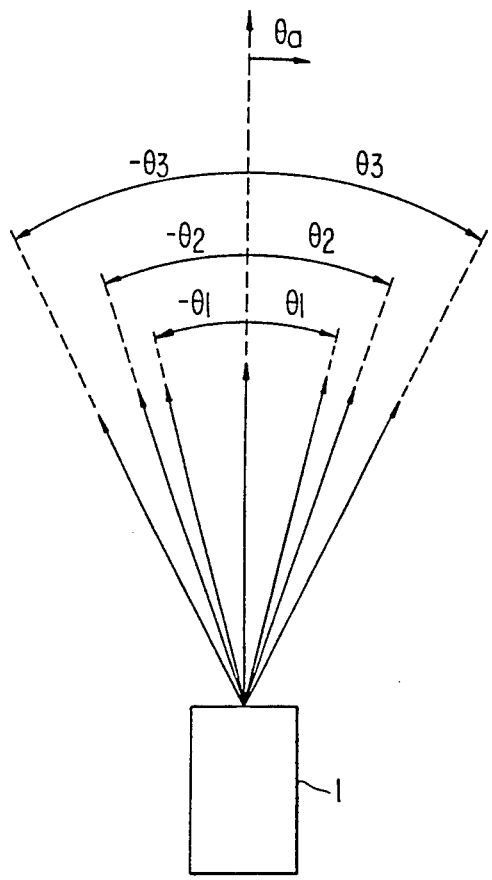
FIGS. 8, 9, and 10(a–b) are diagrams showing the relationship between a camera direction, an imaging direction, and a control signal.
Figure 9:
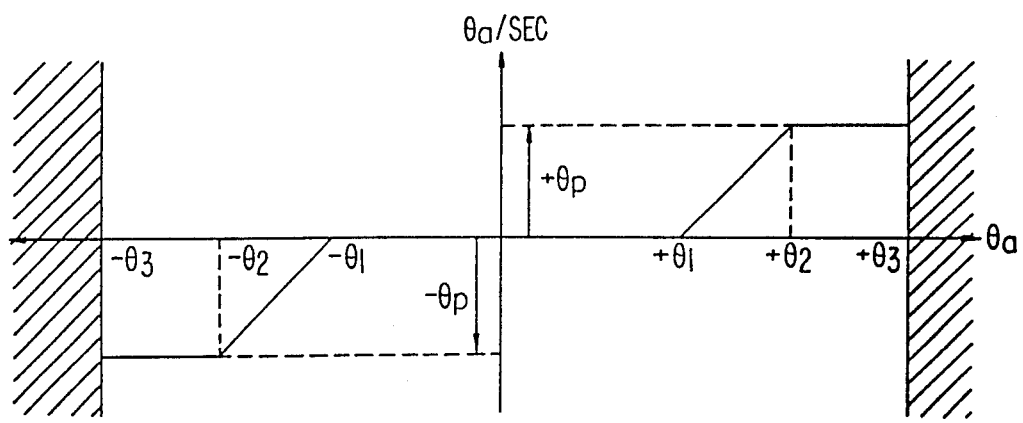
Figure 10A:
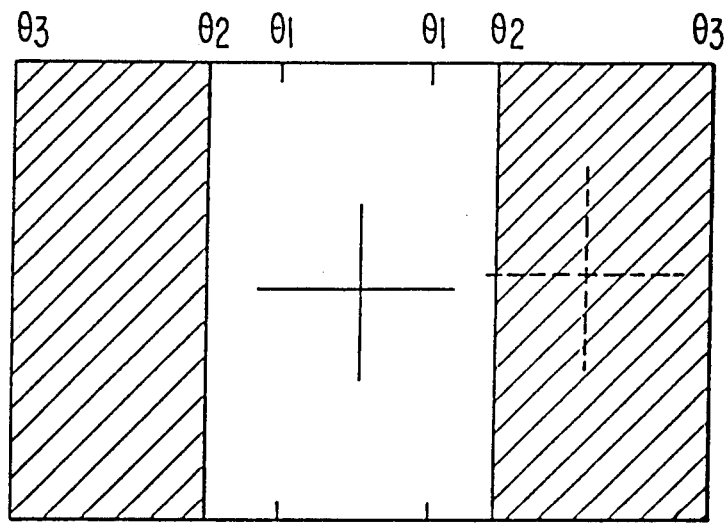
Figure 10B:
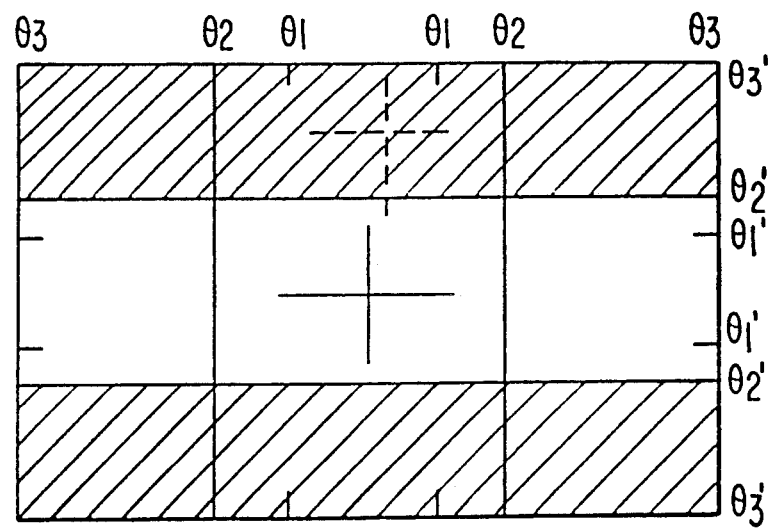
Figure 11A:
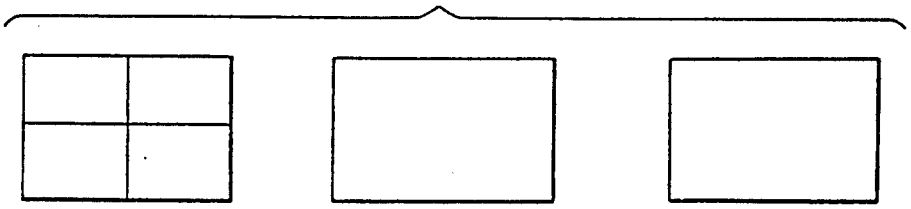
FIGS. 11(a–d) are diagrams showing displays in the finder.
Figure 11B:
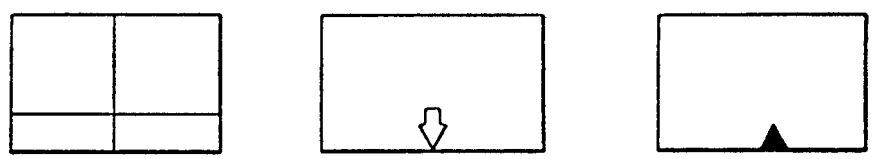
Figure 11C:
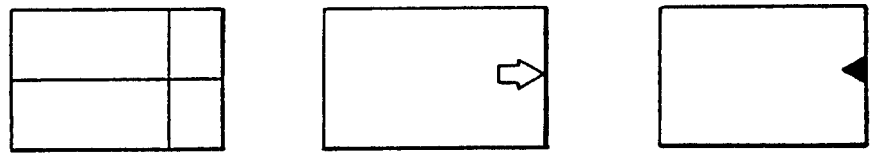
Figure 11D:
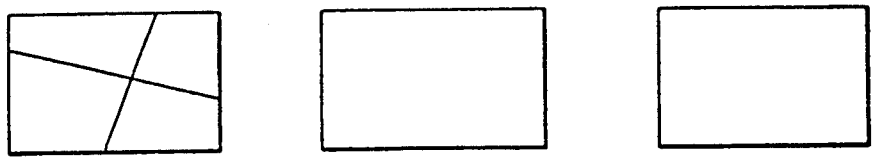

A panning switch as shown in FIG. 1(e) or FIG. 6 may be used, but the number of switches used should be as few as possible to allow the beginner to handle the video camera with ease. One method of achieving this is that though the fluctuation angle between the camera body direction and the direction of the optical axis in which images are taken is limited to a certain control range, it is possible to display the fluctuation angle $\theta b$ within the finder as shown in FIGS. 5(a) through (e) or FIGS. 4(a) and (b) through the fluctuation display circuit 10a. FIG. 8 shows the camera body direction by the solid-line arrows, and the imaging direction or the detected absolute coordinate system by the dotted-line arrow. Where the video camera 1 is fluctuated in the yaw direction, and the control range has limits $\pm\theta_3$, intermediate angles $\pm\theta_2$ and $\pm\theta_1$ are established. The constant-angular-velocity driver circuit 10c is controlled such that as shown in the graph of FIG. 9, when $|\theta_2| < |\theta a| < |\theta_3|$, the video camera is panned at a constant angular velocity, when $|\theta_1| < |\theta a| < |\theta_2|$, the angular velocity is gradually increased, and when $0 < |\theta a| < \theta_1$, the video camera operates in the fixed imaging mode or the damping mode. All of the above functions can be performed by the simple control switch 7 as shown in FIG. 1(d). No image control is effected when the switch is slid to the normal mode. When the two-step switch is depressed to one step in the damping mode, damping control is effected and further depression of the switch initiates recording of signals in the VTR. When the switch is depressed to one step in the panning/tilting mode, the panning control mode is started, and when the switch is further depressed, recording begins. In an initial imaging state, the camera is in the damping mode effected by the filter 11e of a lower frequency range or in the fixed imaging mode. By moving the camera while watching the fluctuation display in the finder, the ranges of $\theta_1$, $\theta_2$ are displayed only in the panning mode as shown in FIG. 10(a). The camera can be panned clockwise or counterclockwise by putting the crossing point in the hatched areas. Thus, by manually changing the direction of the camera, the fluctuation display can be moved to a prescribed position, whereupon a prescribed switch is turned on to enable the control circuit 9 to effect a desired operation. Accordingly, the control switch as shown in the lower portion in FIG. 1(e) becomes unnecessary. More specifically, when the camera is turned to the left as shown in FIGS. 5(b) and (b'), the display is positioned between $-\theta_2$ and $+\theta_3$ as indicated by a dotted-line cross in FIG. 10(a), whereupon the camera starts being panned counterclockwise through $-\theta_p$ at a constant angular velocity as illustrated in FIG. 9. By returning the display to the solid-line cross, the panning mode is finished. It is naturally possible to effect a tilting mode as illustrated in FIG. 10(b). In the illustrated example, the panning mode suffers from a small temperature drift of fluctuation detection. Where the temperature drift is excessively large and the camera cannot be set to a fixed imaging mode, but only to a damping mode, the above operation can be carried out as described with reference to FIG. 2(b). As mentioned above, the present invention is advantageous in that successive images taken by the general consumers in various imaging modes can be rendered beautiful and easy to see by employing low-cutoff filters.

Where the vibrating angular-velocity sensor of poor temperature drift is employed, the system including the temperature-drift low-cutoff filters according to the embodiment of the invention can reduce the influence of a variation error of the fluctuation detecting signal based on a temperature drift without impairing the image fluctuation control frequency characteristics in a frequency band which is most required by fluctuation-controlling video cameras for consumer use.

However, the system of the invention is also advantageous and necessary in hand-held video cameras in which there is no substantial variation error signal due to temperature drifts, for example. It is highly likely to be able to produce fluctuation detecting means substantially free from temperature drifts inexpensively in the near future by employing a low-cost laser gyroscope or optical fiber gyroscope which will be available with the development of optical IC technology. Certain new fluctuation detecting means presently available are already low in cost and suffer from small temperature drifts.

The system of the invention utilizing low-cutoff filters is effective where such fluctuation detecting means is substantially free from temperature drifts. With the present invention, the image fluctuation suppressing signal generating means produces an image fluctuation suppressing signal in response to a high-frequency fluctuation detecting signal for suppressing image fluctuations at high frequencies. The image fluctuation suppressing signal; generating means may be arranged such that in a controlled condition, it fails to generate any image fluctuation suppressing signal with respect to a low-frequency fluctuation detecting signal which would interfere with any change in the direction of the image pickup device body as the latter changes its direction. The image fluctuation control means such as the pitch, yaw, and roll drivers 12 may be arranged such that in the absence of an image fluctuation control signal, they will return to a substantially central portion of the image fluctuation control range with a certain time constant.

When the image pickup device is manually manipulated in this case, any unwanted high-frequency fluctuations can be suppressed in the foregoing manner by setting the camera to the damping mode in which the low-cutoff filters are effective. When a different target is to be shot, it can be followed and shot without operating on any switch with a slight delay while controlling fluctuations smoothly by changing the direction of the image pickup device. Therefore, as smooth image fluctuation suppression can be obtained with the hand-held image pickup device as would be if images were taken by an image pickup device mounted on an existing tripod head equipped with an oil damper. With fluctuation detecting means of stable temperature drifts, rather than with the fluctuation detecting means of poor temperature drifts, the present invention is also effective in suppressing image fluctuations when images are taken by a hand-held image pickup device without requiring any complex operation. The vibrating angular velocity sensor which serves as the fluctuation detecting means of a low cost and a small size according to the present invention will be described in detail. When the detector is vibrated at a fluctuation detecting frequency, as described above, it has a sine-wave speed. When the overall detector rotates about a rotational axis with respect to the absolute coordinate system under this condition, the detector is subjected to a Coriolis force which is famous as a physical phenomenon. By converting the Coriolis force into an electric signal and phase-detecting the electric signal, the angular velocity of the angular velocity sensor about the rotational axis can be determined. In case a single low-cost, small-size, and lightweight vibrating angular velocity sensor is incorporated in the small container such as the home-use video camera, no special problem occurs. Although there may be a system for detecting fluctuations only in the pitch or yaw direction, such a system would be of a low practical value as no definite effect of suppressing image fluctuations would appear on images. Therefore, at least two vibrating angular velocity sensors for pitch and yaw directions are required to be employed. Where two or three vibrating angular velocity sensors are used in a large stabilizing device, no substantial problem takes place. However, where a plurality of angular velocity sensors are assembled in a small-volume home-use video camera, the fluctuation detecting signal contains a large error signal. The reason for this large error signal will be described below. In the case where at least two mechanical vibrations are present in the vibrating angular velocity sensors, the vibrators necessarily have mutual mechanical coupling coefficients as they are accommodated in the small-size housing of the home-use video camera. Assuming that the two detected fluctuation frequencies are expressed by $f_1$ and $f_2$ and $f_1 \neq f_2$, it is difficult to avoid a beat, small or large, due to the above mechanical coupling in the video camera which is required to be small in size, and the beat frequency F is given by:

$$F = \frac{f_1 - f_2}{2} \tag{6}$$

The vibrating angular velocity sensors therefore continue suffering from mechanical vibrations which are responsible for an error signal based on the beat having the beat frequency F. Certain conditions have to be met in order to separate and remove the vibrational component from normal angular velocity signals. On the condition that a detectable maximum frequency in a frequency range that can be detected by the vibrating angular velocity sensors is fh, and a detectable minimum frequency is fl, there are three combinations of relationships as to magnitude between fh, fl and F as follows:

$$fl < F < fh \tag{1}$$

$$fh < F \tag{2}$$

$$F < fl \tag{3}$$

According to the relationship (1), the beat frequency F is detected by the fluctuation detecting means, and a beat-induced error signal is contained in the fluctuation detecting signal. There will be no effect of suppressing image fluctuations and instead images will be vibrated.

According to the relationship (2) or (3), it is theoretically possible to remove a beat-induced error signal by optimizing the filters. However, removal of the influence of a beat is unstable in the relationship (3) for the reason that the fluctuation detecting signal is required to have low-range characteristics in the range of from 0.1 to 1 Hz even in the damping mode, that is, a condition at a lowest frequency fl=0.1 Hz should be considered, and hence it is difficult to meet the condition (3):

F<fl where the sensors are employed in a video camera. Therefore, the condition (2): fh<F is one of the best methods for removing the influence of a beat. From the equations (6) and (2), the following results:

$$fh < \frac{f_2 - f_1}{2} \tag{7}$$

The above condition is the condition which is required to be met at least for removing the influence of a beat. The influence of a beat can be eliminated by selecting the difference between two or three detected fluctuation frequencies to be at least two times the detected maximum frequency. Where ideal filters are employed, they can remove the beat influence thoroughly, but a margin should actually be provided dependent on the filter characteristics and variations in the detected fluctuation frequencies. This system is advantageous in that it allows a plurality of sensors to be used easily and less expensively simply by separating the detected fluctuation frequencies of two or three sensors.

The above arrangement is based on the condition: $f_1 \neq f_2$. Where synchronous vibration is employed with $f_1 = f_2$, a good beat prevention effect can be achieved. However, since it is not easy to equalize the characteristics of since two or three vibrating angular velocity sensors, the yield of video cameras would be lowered or the cost of an adjustment process would additionally be involved, resulting in an increased cost which would not be preferable for home-use video cameras. With this arrangement, the detectable maximum frequency would not be limited as indicated by the expression (7), and fluctuations could be detected up to higher frequencies. Accordingly, the alternative proposal would be effective in video cameras for use in broadcasting stations, which are required to have high-frequency characteristics, and would make it easy to operate the video camera. In addition, the proposal would realize an image-stabilizing video camera of a purely electronic design which employs a CCD, for example, having an excessive number of pixels and controls image signal readout dependent on fluctuations, because fluctuation detection and operability are improved in a narrow control range by fluctuation display. The system for starting various modes of operation through the movement of a fluctuation indication in the finder is advantageous since it allows the beginner to operate a video camera easily as with a cursor moving input device such as for an input system for a CAD device and a personal computer. FIG. 11 shows various arrangements for the display unit.

Embodiment 2

Figure 12:
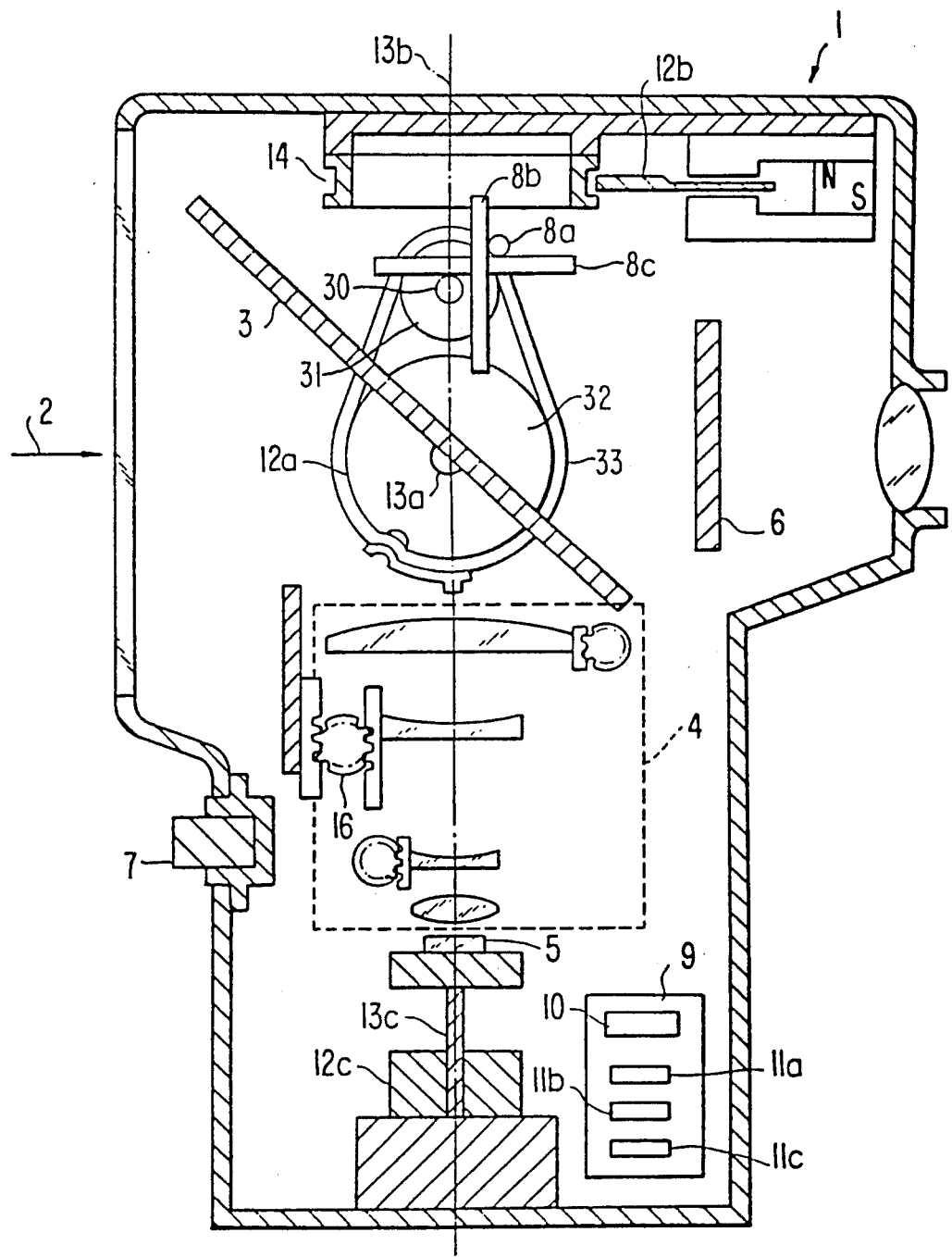
FIG. 12 is a cross-sectional view of a camera apparatus of a second embodiment of the present invention.
Figure 13:
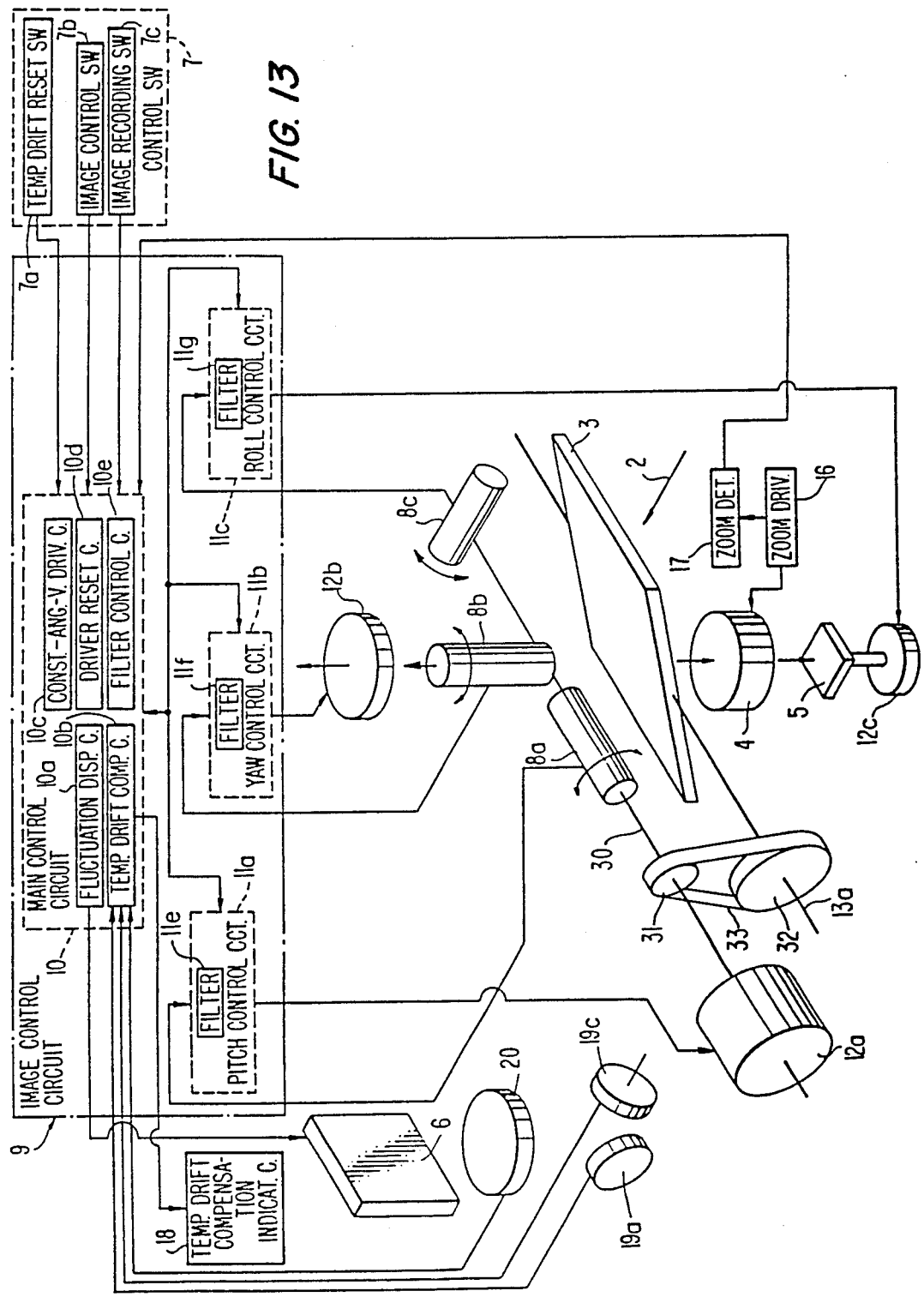
FIG. 13 is a block diagram, partly in perspective, of the image pickup device shown in FIG. 12.
Figure 14A:
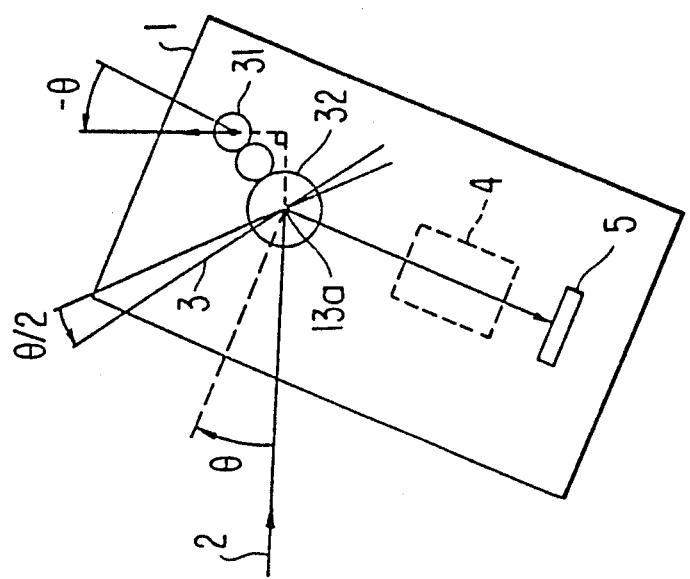
FIGS. 14(a) and (b) are diagrams showing fluctuation frequencies generated at the time of carrying the camera apparatus by hand.
Figure 14B:
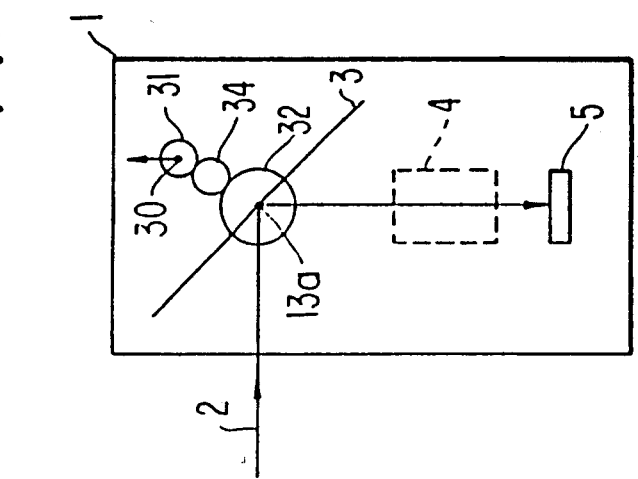
Figure 15A:
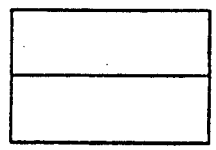
FIGS. 15(a–j) are diagrams showing finder displays.
Figure 15B:
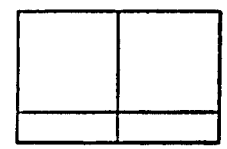
Figure 15C:
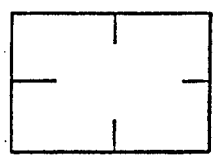
Figure 15D:
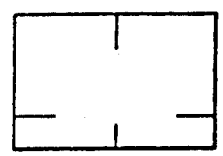
Figure 15E:
Figure 15F:
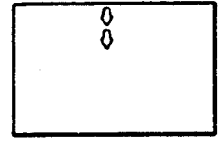
Figure 15G:
Figure 15H:
Figure 15I:
Figure 15J:
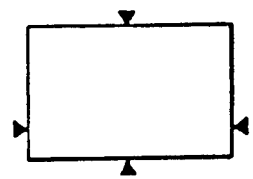

While an example of open-loop control has been illustrated in the first embodiment, pitch control and yaw control in the embodiment are effected as closed-loop control according to the second embodiment. Since the difference between the first and second embodiments is small, only the difference will be described. FIG. 12 shows in cross section a video camera which differs from the video camera of FIG. 1 in that there is added a second rotatable shaft 30 having a second pulley 31 that is operatively coupled to the first pulley 32 through a transmission belt 33 with a transmission ratio of 2:1. The fluctuation detectors 8a, 8b, 8c in pitch, yaw, and roll directions are mounted on the second rotatable shaft 30 which rotates through an angular interval that is ½ of that of the pitch rotation shaft 13a. FIG. 13 shows in block form and perspective the arrangement of FIG. 12. Although the circuit arrangements of FIGS. 13 and 2 are substantially equal, closed-loop control is effected in the pitch and yaw directions while open-loop control is carried out in all of the directions. For the pitch direction, closed-loop control is effected to perform the zero method, that is, to control the second rotatable shaft 30 so as to keep the angle of the pitch direction at zero with respect to the absolute coordinate system. FIG. 14(a) shows an arrangement in which the belt 33 is replaced with an intermediate gear 34. When the camera is tilted $+\theta$ as shown in FIG. 14(b), the second rotatable shaft 30 is tilted $-\theta$ with respect to the camera body. The pitch rotation shaft 13a operatively coupled to the second rotatable shaft 30 at the transmission ratio of 2:1 is rotated $-\theta/2$ with respect to the camera body and $-\theta/2$ with respect to the absolute coordinate system. Therefore, the same object can be imaged at all times as in the case with the arrangement of FIG. 3(b) according to the first embodiment. FIGS. 15(a) through (j) are illustrative of indications or displays in the finder, and correspond to FIGS. 4(a) through (j). In the absence of any temperature drift, the yaw fluctuation detecting means 8b tends to be angularly positioned at 0 degrees with respect to the absolute coordinate system, so that the same imaging direction as shown in FIGS. 5(a) through (e) will be maintained. Control in the roll direction remains the same as that of the first embodiment because of open-loop control employed. The second embodiment is advantageous for the following reasons: Since the pitch and yaw control is effected by a closed loop employed in the zero method, no linearity is required for the characteristics of the fluctuation detectors 8a, 8b, and less costly sensors can be used therefor. Accuracy and high linearity of the characteristics of rotation detectors for the drivers 12a, 12b are not required. Since the above components can be inexpensive, the cost of the overall device can be reduced, resulting in the achievement of home-use video cameras at an acceptable price. By employing the design in which the driver 12a having an inertia such as a motor is directly coupled to the intermediate gear 34 shown in FIG. 14(a), the inertia of the driver 12a acts in a direction to cancel out the inertia of the mirror 3 at the time of fluctuation. The inertia of the continuously rotatable shaft of the motor and the transmission ratio for cancelling the inertia of the mirror 3 will now be determined. It is assumed that the transmission ratio between the pitch rotation shaft and the continuously rotatable shaft is expressed by 1 : m, the inertia around the pitch rotation shaft by $I_1$, the inertia of the continuously rotatable shaft by $I_2$, the ratio between these inertia by n, the angular velocity of the pitch rotation shaft with the relative coordinate system on the camera body by $w_1$, the angular velocity of the continuously rotatable shaft by $w_2$, the angular velocity of the camera body in the absolute coordinate system by w, the radius of the pitch rotation shaft by $r_1$, the radius of the continuously rotatable shaft by $r_2$, and the force acting on the means for transmitting rotation to the shafts by t. Now, the following motional equations are established:

$$\frac{dw_1}{dt} = -\frac{dw}{dt} + \frac{tr_1}{I_1}$$

$$\frac{dw_2}{dt} = -\frac{dw}{dt} + \frac{tr_2}{I_2}$$

$$r_2 = mr_1$$

$$\therefore w_2 = \frac{-1}{m} w_1$$

$$I_2 = nI_1$$

By solving the above equations, the motional equation for the pitch rotation shaft is given as follows:

$$\frac{dw_1}{dt} = \frac{m(n-m)}{m^2+n} \frac{dw}{dt} \tag{8}$$

The motional equation for the continuously rotatable shaft is given as follow:

$$\frac{dw_2}{dt} = \frac{m-n}{m^2+n} \frac{dw}{dt} \tag{9}$$

Rotation of the pitch rotation shaft with the reflecting member directly connected thereto through $\theta/2$ in response to a fluctuation of the camera body through $\theta$ results in rotation of the pitch rotation shaft through $-\theta/2$ in the relative coordinate system on the camera body. Therefore, the following equation should be met:

$$\frac{dw_1}{dt} = -\frac{1}{2} \frac{dw}{dt}$$

From the equation (8), the following solution is found:

$$\frac{m(n-m)}{m^2+n} = -\frac{1}{2}$$

By modifying this equation, $$n = \frac{m^2}{2m+1} \tag{10}$$

Thus, by selecting the inertia of the motor connected to the continuously rotatable shaft in order to meet the equation (10), the reflecting member or the pitch rotation shaft keeps the angle of $\theta/2$ with respect to the absolute coordinate system solely with the inertial force when the camera body fluctuates $\theta$ with respect to the absolute coordinate system. Therefore, the power consumption of the motor is basically zero, and there is provided an image pickup device having an image control capability substantially free from power consumption even when the image pickup device is subjected to fluctuation control in which only friction is the consumed energy. This is effective in saving electric power and making the device lightweight since the device need not be larger in size when a battery which is important in reducing the weight of a portable video camera is employed for controlling image fluctuations. In particular, inasmuch as the inertia of the reflecting member is cancelled out by the inertia of the motor, the device can have a minimum arrangement with only the two inertial loads, and the number of parts is small and the weight of the device is small. This is also applicable to the first embodiment, and has a large merit in home-use video cameras required to meet low power consumption.

Embodiment 3

Figure 16:
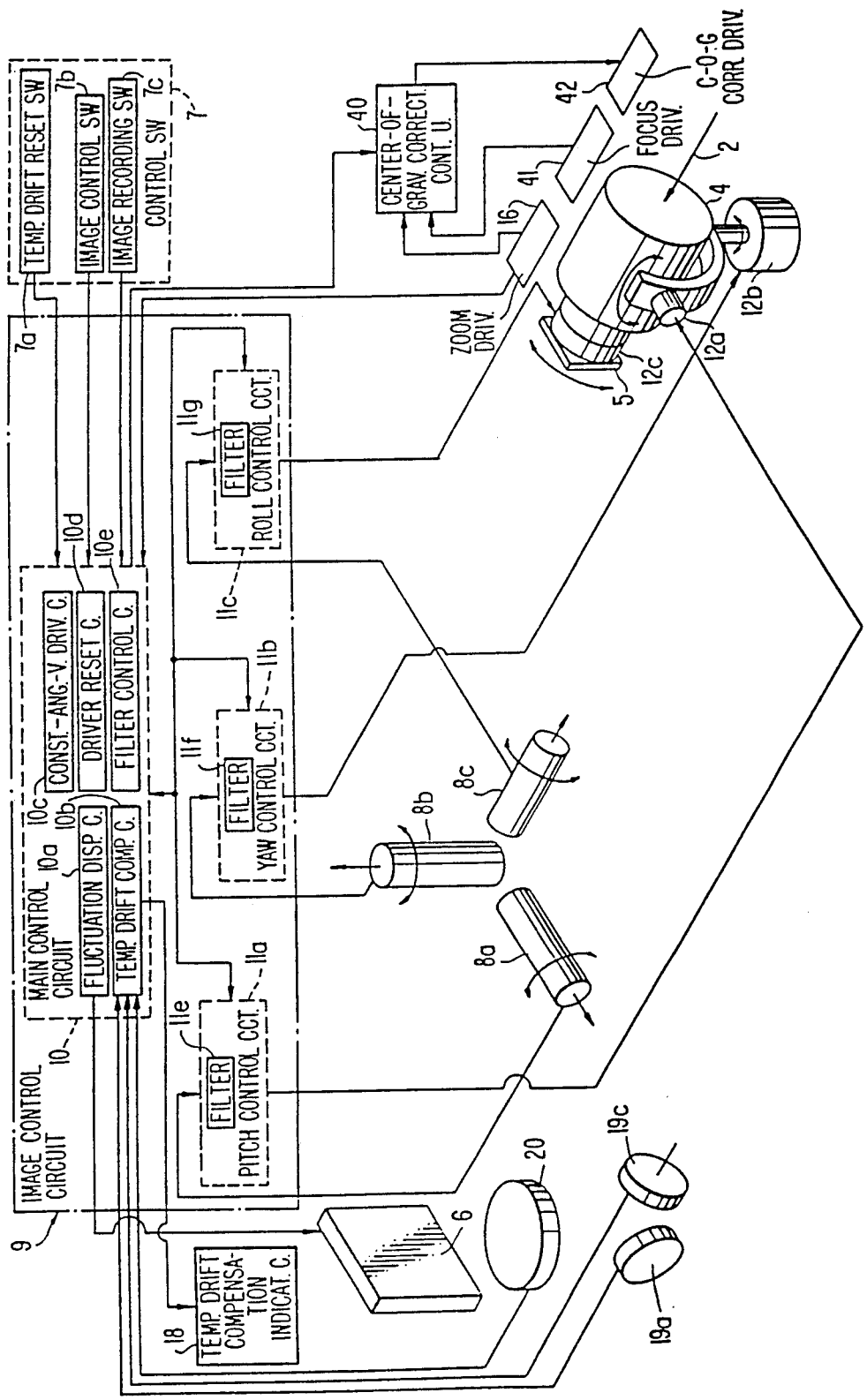
FIG. 16 is a cross-sectional view of a camera apparatus according to a third embodiment of the present invention.

According to the third embodiment, the mirror is not driven as with the first and second embodiments, but, as shown in FIG. 16, the focusing unit 4 is controlled by the drivers 12a, 12b in the pitch and yaw directions, while the imaging unit 5 is controlled by the driver 12c in the roll direction. The circuit arrangement and operation of the third embodiment are basically the same as those of the arrangement of FIG. 2. Since no mirror is used, the control circuit for the pitch driver 12a may be arranged for $\theta a$ rather than $\theta a/2$.

A newly added construction comprises a center-of-gravity correction control unit 40 for the focusing unit, the control unit 40 being operable in coaction with the image control circuit 9.

The control unit 40 is responsive to focusing information from a focus driver 41 and zooming information from a zoom driver 16 for purely mechanically or electromechanically controlling a center-of-gravity correction unit 42. Since the focusing unit 4 is kept in balance at all times, the pitch driver 12a is not required to impose a corrective force for balancing, an arrangement which contributes to lower power consumption that is important for home-use video cameras driven by small-capacity batteries.

Figure 17A:
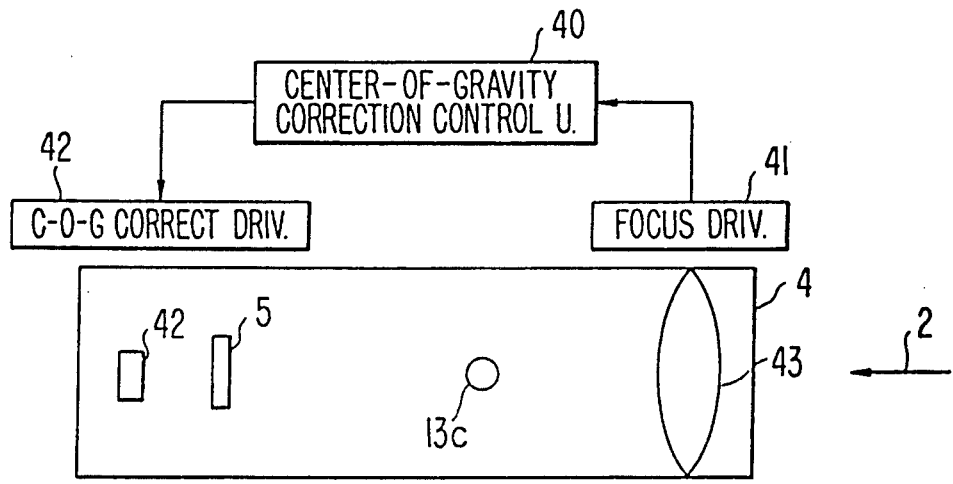
FIGS. 17(a–c) and 18(a–c) are diagrams showing the principle of correcting a center of gravity.
Figure 17B:
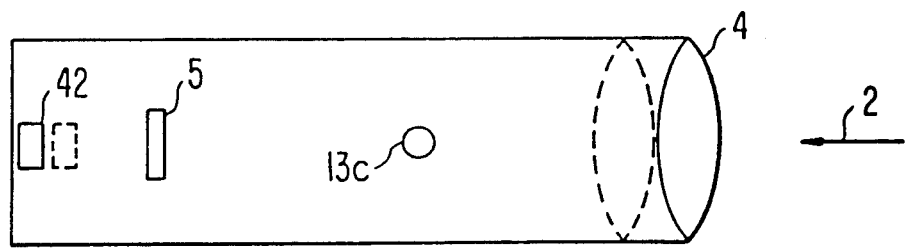

In operation, the focusing unit 4, the imaging unit 5, a balancer 42a, and a focusing lens 43 are arranged as illustrated in FIG. 17(a), and the entire arrangement is balanced with the center of gravity on the pitch rotation shaft 13c. When the focusing lens 43 having a large relative weight is moved forward as shown in FIG. 17(b), the center of gravity is moved forward with respect to the incident light 2. At this time, the center-of-gravity correction control unit 40 moves the balancer 42 rearward purely mechanically of electromechanically based on the focusing information from the focus driver 41 for keeping the entire system in balance.

Figure 17C:
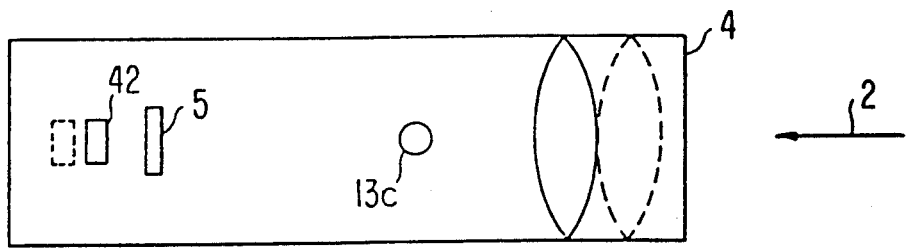

FIG. 17(c) shows an example in which the focusing lens is moved rearwardly with respect to the incident light 2. The system is brought into balance by moving the balancer 42 forward.

By arranging the balancer 42 on the central axis behind the imaging panel 5 as shown, the focusing system is balanced in the direction of rotation about the optical axis, resulting in a reduced influence due to roll fluctuations and an increased resistance to external shocks.

For a further reduction of power consumption, the center of gravity of a movable portion including the focusing means should always be positioned at the center of a biaxial gimbal as shown, and theoretically no force is required to be applied as shown, and theoretically no force is required to be applied no manner where the movable portion may be directed. To meet this requirement, the center of gravity should be placed on the central axis of the movable portion in the direction of the optical axis at all times irrespectively of focusing or zooming, and then the center of gravity of the balancer should be moved on the center of gravity as illustrated in FIG. 17. When the balancer and the optical parts are in balance, the center of gravity is positioned on the central axis and in the center of the biaxial gimbal. No drive force needs to be imposed to matter where the movable portion may be oriented. The power consumption can greatly be reduced by moving the balancer on the central axis of the movable portion as described above. In this connection, it is frequently difficult in terms of design to arrange the center of gravity of the balancer of the central axis of the balancer. With a ring-shaped balancer employed, the movable portion can be shorter for achieving a smaller-size video camera.

Figure 18A:
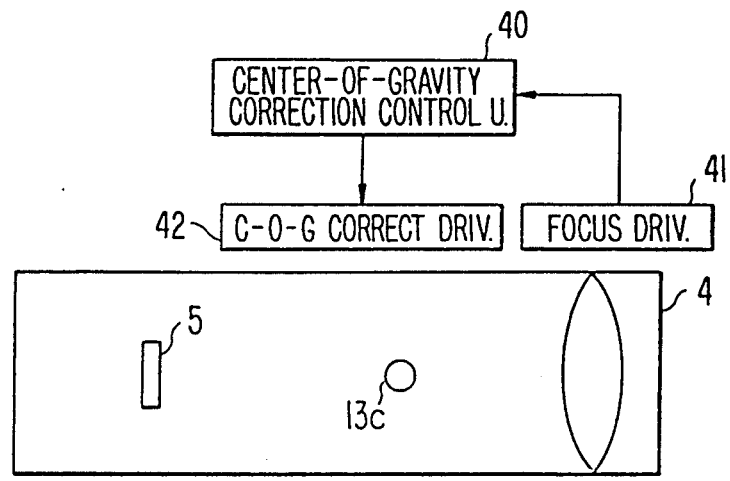
Figure 18B:
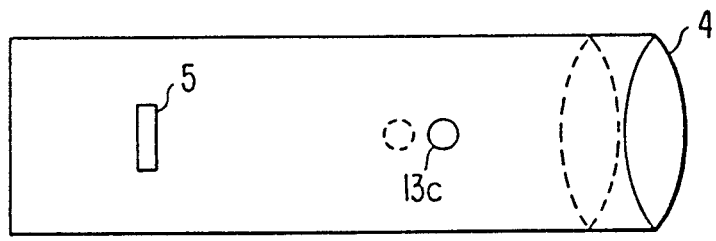
Figure 18C:
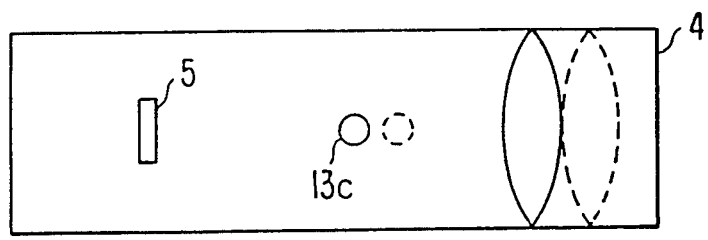

FIG. 18 is illustrative of an arrangement in which the balancer is not moved, but the center-of-gravity shaft is moved for balancing. The pitch rotation shaft 13c is moved by the center-of-gravity correction driver 42 from a balanced position of FIG. 18(a) to a front position of FIG. 18(b) or a rear position of FIG. 18(c). No further description will be given since details are self-explanatory.

Embodiment 4

As shown in FIG. 19, the pitch, yaw, and roll fluctuation detectors 8a, 8b, 8c are disposed on the focusing unit 4 and the movable portion including the same according to the fourth embodiment. While open-loop control is employed in the third embodiment, closed-loop control is used in the fourth embodiment. The other arrangement of the fourth embodiment is the same as that of the third embodiment. Operation of the fourth embodiment is exactly the same as that of the second embodiment of closed-loop control with the mirror. In the fourth embodiment, however, the pulley or gear providing the transmission ratio of 2:1 is not necessary between the driver and the fluctuation detector in the pitch direction. The fourth embodiment is advantageous in that no accuracy is required in detecting the rotational angles of the drivers 12a, 12b, 12c resulting in a lower cost, and linearity and dynamic range are not needed in the construction of the fluctuation detectors 8a, 8b, 8c also resulting in a low cost.

Figure 19B:
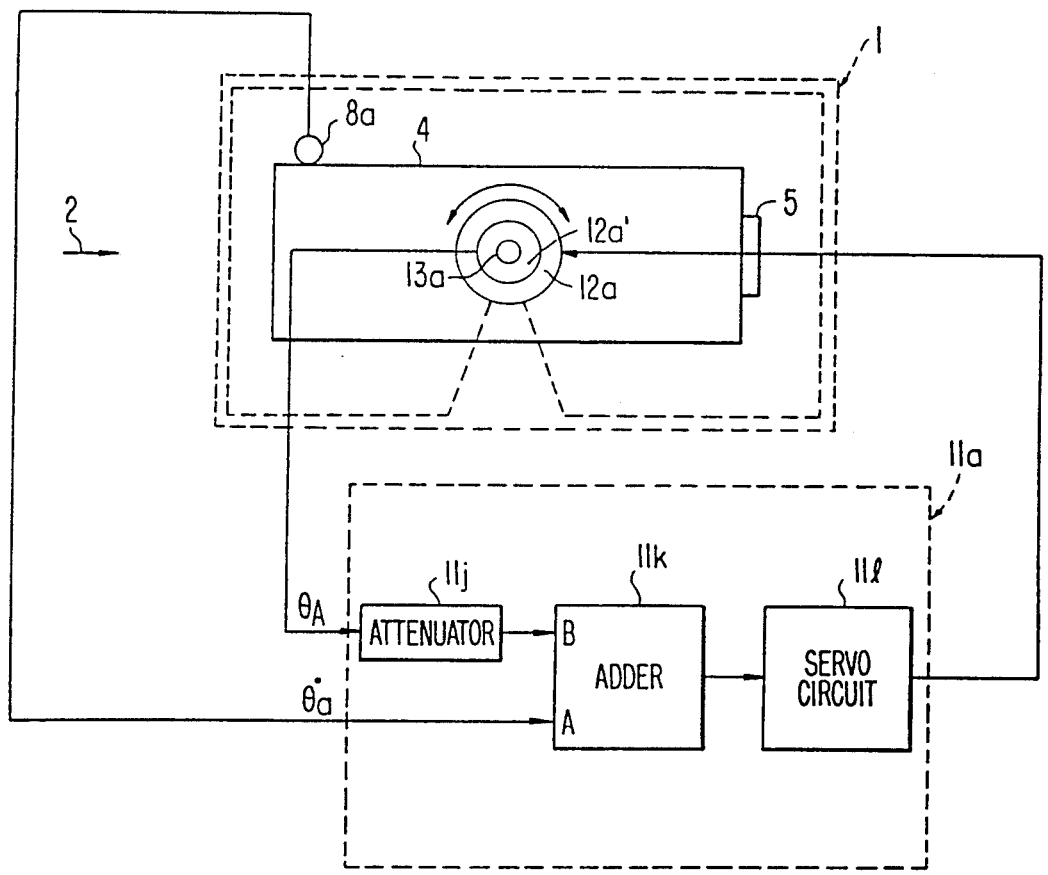
FIG. 19(b) is a left side view of the camera shown in FIG. 19(a)

Operation of the control circuits 11a, 11b and 11c will be described in greater detail with reference to FIG. 19(b). FIG. 19(b) is a left side view of the video camera 1 shown in FIG. 19(a) and represents the pitch control circuit 11a only. The operation of this pitch control circuit will hereinafter be described. The incident light 2 from the subject focuses on the image of the image pick up element 5 by means of the focusing unit 4. The movable portion which includes the focusing unit 4 and the image pick up element 5 is rotated, centering on the pitch rotation shaft 13a, by the pitch driver 12a with respect to the body of the video camera 1 to thereby suppress image fluctuation caused by the fluctuation of the body.

The pitch rotating angle detector 12a' detects the angle between the movable portion which includes the focusing unit 4 and the stationary portion which includes the body of the video camera 1.

Firstly, an example of the arrangement of this pitch rotating angle detector 12a' is given. A non-contact type low-cost detector 12a' can be constructed by employing a magnet on the movable portion of the motor and magnetic sensors such as hall elements provided on the stationary portion of the pitch driver 12a.

Secondly, a detailed example of the arrangement of the pitch driver 12a will be given. On the movable portion of the above are alternately arranged magnets having N poles and S poles, and driving coils opposed thereto are provided on the stationary portion including the body of the video camera 1 thereby materializing a non-contact type pitch driver 12a.

The non-contacting pitch driver suffers very little friction loss, consumes low electric power, and yet has higher suppressing effect of the image fluctuation.

Operation of the pitch control circuit 11a will hereunder be described. Two systems, i.e., the image fluctuation suppressing control system and the optical axis centering control system, are added to the pitch control circuit 11a.

Firstly, the image fluctuation suppressing control system is described. The rotation in the pitch direction with respect to the absolute coordinate system of the movable portion including the focusing unit 4 is detected by the fluctuation detector 8a such as a gyro and the angular velocity detecting signal $\theta a$ is sent to an input A of the adder 11k of the pitch control circuit 11a. By this signal, the servo circuit 11l and the pitch driver 12a drive the focusing unit 4 in the direction of the pitch.

This control is the closed loop control called the zero method.

In this case, when a displacement is produced of the absolute space coordinate system and the movable portion which includes the focusing unit 4, such displacement is controlled in a direction in which the displacement is made to be nil.

Therefore, when the focusing unit 4 is to be moved by the camera-induced fluctuation of the video camera 1, the focusing unit 4 is controlled by the image fluctuation suppressing control system in accordance with the detected displacement signal whereby the fluctuation of the image is suppressed.

In the case of the zero method, since the linearity of the gain of the fluctuation detector 8a is not necessary, the use of low-cost sensors is possible.

Secondly, the second control system is described.

The displacement of the rotating angle with respect to the center determined on the body of the video camera 1 of the movable portion including the focusing unit 4 is detected by the pitch rotating angle detector 12a' as an angular signal $\theta A$.

This signal is made to be an appropriate value by the attenuator 11j to be input into the input B of the adder 11k of the pitch control circuit 11a to thereby cause the focusing unit 4 to be driven in the pitch direction by the servo circuit 11l and the pitch driver 12a. The second control system also constitutes a closed loop control of zero method.

In this case, when a displacement is produced with respect to the center established between the body of the video camera 1 and the movable portion including the focusing unit 4, such displacement is controlled in a direction in which it is made to be zero.

Therefore, if the direction of the optical axis of the focusing unit 4 which is in a movable condition is displaced from the center established with respect to the body of the video camera 1 by the fluctuation of said camera and since the direction of the optical axis will be controlled to return to the established center by the second control system, the direction of the optical axis of the focusing unit 4 in the movable condition will always agree with the direction of the body of the video camera 1 even if the video camera 1 is turned in any direction.

In other words, since the first control system has a function to suppress the image fluctuation, it is called the image fluctuation suppressing control system. Whereas the second control system can be called the optical axis centering control system, which has a function to disturb the image fluctuation suppressing function of the first control system but is necessary in view of the operability of the video camera.

These two conflicting control systems require optimization of their characteristics.

As shown in FIG. 19(b), the present invention solves this conflicting problem by means of a simple circuit arrangement in which the adder 11k is employed to add the first control system and the second control system.

Figure 19C:
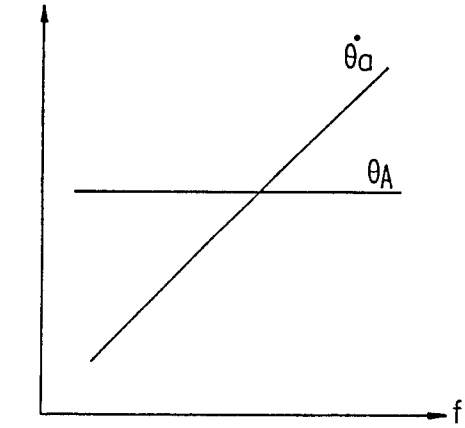
FIG. 19(c) is a diagram of detected outputs versus frequency.

With this circuit arrangement, the controlling characteristics of these systems can be obtained without decreasing the image fluctuation suppressing effect when imaging with a hand-held video camera not affecting the operability during the camera work such as panning. The reason is explained as follows; if an angular velocity sensor such as a gyro is used with the fluctuation detector 8a, the detected output will be the angular velocity $\theta a$ and its output will increase with respect to the same fluctuation angle as the frequency f increases, as shown in FIG. 19(c).

On the other hand, the output of the pitch rotating angle detector 12a' is $\theta A$. Therefore, as shown in FIG. 19(c), if the fluctuation angle is the same, the output is constant irrespective of the increase in the frequency f, i.e., $\theta a$ becomes greater at higher frequency while $\theta A$ becomes greater at lower frequency. With this principle employed in the present invention, the two detected outputs of $\theta a$ and $\theta A$ of the above are added at an appropriate ratio of addition to construct the control circuit of closed loop as shown in FIG. 19(b).

In this case, with respect to the vibration in a high frequency range, said image fluctuation suppressing control system becomes dominant over the optical axis centering control system to thereby suppress the fluctuation of the image.

As described above, in imaging with a hand-held video camera, the fluctuation of the image occurs at high frequency of over 0.5 Hz. For this reason, the suppressing effect of the image fluctuation is obtained by setting $\theta a$ and $\theta A$ to an appropriate adding ratio in the first place with respect to this circuit arrangement.

Then, for the vibration occurring in a low frequency range, said optical axis centering control system becomes dominant over the image fluctuation suppressing control system. The image fluctuation occurring in a low frequency range from 0.2 to 0.5 Hz. is not irritating to the eye of the viewer and there is lesser effect caused by such image fluctuation even if the suppressing effect of the image fluctuation is restricted.

Since the optical axis of the focusing unit 4 is controlled to direct toward the set center of the video camera 1 in conjunction with the vibration in the low frequency range, the direction of the optical axis of the video camera will follow in connection with the camera work such as panning.

More particularly, as shown in FIG. 1(c), the component of an angle of the camera movement occurring against the will of the user during imaging with a hand-held video camera spreads in the high frequency range of over 0.5 Hz. On the other hand, the change in the shooting direction according to the will of the user, i.e., the change in the speed of the angle such as during panning is in the very low frequency range of several degrees/second.

Based on this fact, the component of the angle generated by the image fluctuation and the camera work can be separated because the frequency distributions in high and low ranges are different.

On the other hand, the frequency characteristic of the control circuit 11a of the embodiment 4 can also be changed by changing the adding ratio of θa and θA. Therefore, by selecting an optimum adding ratio, it is possible to obtain a video camera which is of very simple and low-cost construction, suppresses the component of image fluctuation in the high frequency range, and yet has a stable function to cause the direction of the optical axis to follow the panning.

The quality of the operability of a video camera can be found only after having each individual user actually operate the video camera. We have manufactured test video cameras, had a plurality of users operate them actually, and obtained the optimum set values successfully.

In this connection, our test data are shown as follows.

In case θa is standardized with V/degree/sec. and θA with V/degree, the adding ratio Ka for θa and θA in the pitch direction is expressed as $Ka = \theta a/\theta A$. A range $7 \leq Ka \leq 10$ was obtained after the test as the range in which the hand-held camera can be easily operated in the actual shooting. The yaw direction can also be constructed with the same control circuit. In this case, if the adding ratio in the yaw direction can also be constructed with the same control circuit. In this case, if the adding ratio in the yaw direction is expressed as Kb, a range $2 \leq Ka/Kb \leq 20$ was also obtained after the test as the range in which the operability of the video camera is not affected during panning while the preventive effect of the image fluctuation is obtained.

Two contradicting functions of the image fluctuation suppressing effect and the operability of the camera work can be made compatible by selecting Ka and Kb in the manner as described above. Since individual requirements of the users for these functions extensively vary however, it is not a good policy to completely fix Ka and Kb. As described in the embodiment 1 for example, the adjusting switch of the attenuator 11j may be provided on the exterior of the video camera 1 to thereby change the controlling characteristic dependent on the user.

Figure 19D:
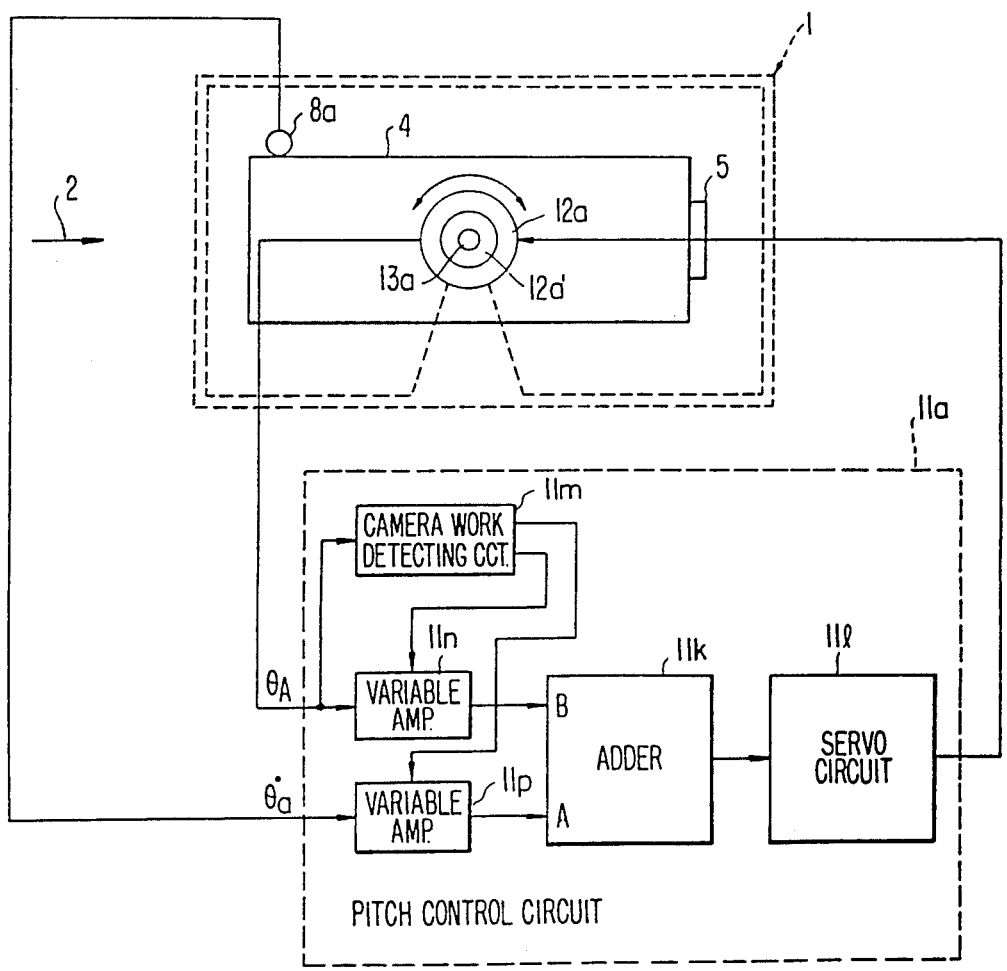
FIG. 19(d) shows a modification of the arrangement shown in FIG. 19(b)

Furthermore, in order to demonstrate similar functions without providing the adjusting switch to change the controlling characteristic on the exterior of the video camera 1, the arrangement as shown in FIG. 19(d) is effective. This arrangement includes the camera work detecting circuit 11m and the variable amplifiers 11n and 11p in addition to the block diagram shown in FIG. 19(b).

Operation will be described as follows. The camera work detecting circuit 11m detects the conditions of the camera work of the video camera such as tilting (panning) by processing the detected signal θA (θB) of the pitch rotating angle detector 12a'.

When this camera work detecting circuit 11m detects the conditions of the camera work such as tilting (panning), the control signals are sent to variable amplifiers (VCAs) 11n and 11p to thereby change the adding ratio Ka and the characteristic of the control frequency in the tilting direction (panning direction).

When the tilting (panning) of the camera work is detected, the camera work detecting circuit 11m generates a control signal which lowers the gain of the variable amplifier 11n and raises the gain of the variable amplifier 11p.

Then, as described above, the gain of the image fluctuation suppressing control signal is lowered and the gain of the optical axis centering control system is raised in connection with the pitch control circuit 11a. In this case, the image fluctuation suppressing effect in the direction of tilting becomes less while the optical axis of the video camera can be easily changed by the user. Panning and tilting are rarely used simultaneously during the normal shooting but either of the two is used more frequently. Therefore, in the case of tilting, the image fluctuation suppressing effect in the vertical direction becomes less but is not noticeable because the image is changing substantially in the vertical direction during the actual tilting. Since the change in horizontal direction does not occur while tilting the video camera, the camera work detecting circuit inside the yaw control circuit 11b in the yaw direction does not detect the camera work and the gain of the image fluctuation suppressing control system in the yaw direction remains at a high level. Therefore, the stable image of less image fluctuation in the yaw direction is obtained.

Although the image fluctuation suppressing effect in the pitch direction is somewhat weakened, the operability of the video camera is improved. As described above, it is possible to provide both the image fluctuation suppressing effect and the video camera operability of employing the arrangement shown in FIG. 19(d). When panning is used during shooting, the image fluctuation suppressing effect in the yaw direction becomes less while the camera operability is improved, and the image fluctuation suppressing effect in the pitch direction remains substantially available.

Since the camera work detecting circuit judges as the normal condition when shooting normally with a hand-held camera, the effect of suppressing the image fluctuation becomes high.

The same applies to the shooting on a vehicle.

Operation of the camera work detecting circuit will be described hereinafter with particular focus placed thereon.

When a user is shooting with the camera apparatus described in the embodiment 4 in his hand, the distributing condition of the angle formed by the direction of the camera body in the yaw direction and the shooting direction can be classified, after observation, as shown in FIGS. 19(e), (f), (g) and (h). Firstly, under the normal shooting condition in which panning and tilting are not used, the angle distribution will be as shown in FIG. 19(e) and the time-dependent mean values at right and left are zero.

Secondly, when the panning is used, since the camera body turns toward the left but the focusing unit 4 tries to hold the original position by the electronic control, the optical axis in the shooting direction starts turning to the left after a little delay. Therefore, the focusing unit 4 will have greater angular distribution to the right with respect to the camera body as shown in FIG. 19(f). The distribution when panned to the right will be as shown in FIG. 19(g). When the camera is swayed to the right and left with an equal angle, the distribution will be as shown in FIG. 19(h).

To detect the conditions of the camera work, the information of the pitch rotating angle detector 12a' is most useful and simple. To detect such conditions as described above, it is necessary to obtain the time-dependent average of the signal from the pitch rotating angle detector 12a' and 12b' in the pitch and yaw directions.

It is possible to obtain the time-dependent average of the rotating angle in the simplest way by using an integration circuit having the resistor and condensor as an arrangement of the camera work detecting circuit which is shown in FIG. 19(i). It is also possible to obtain the time-dependent average by sampling the rotating angle by using a microcomputer as another means. Image fluctuation suppressing function which provides good operability for more users of video cameras was obtained by installing the camera work detecting circuit 11m in the pitch and yaw directions.

As described with reference to FIG. 19(f), the camera work detecting circuit 11m is capable of discriminating the directions of the camera work, i.e., the panning in the right direction and the panning in the left direction.

The camera work detecting circuit 11m is used as follows. When the panning in the right direction is detected for example, it is possible to perform smoother panning by changing the fluctuation suppressing control characteristic in clockwise and counterclockwise directions of the yaw control circuit 11b according to this detected signal, more specifically, by lowering further the clockwise gain as compared with the counterclockwise gain. In this case, the yaw control circuit 11b will respond normally with respect to the counterclockwise fluctuation of the yaw direction whereby the fluctuation is suppressed. Therefore, the counterclockwise fluctuation which causes uneasiness during the clockwise panning is suppressed.

Embodiment 5

Figure 20:
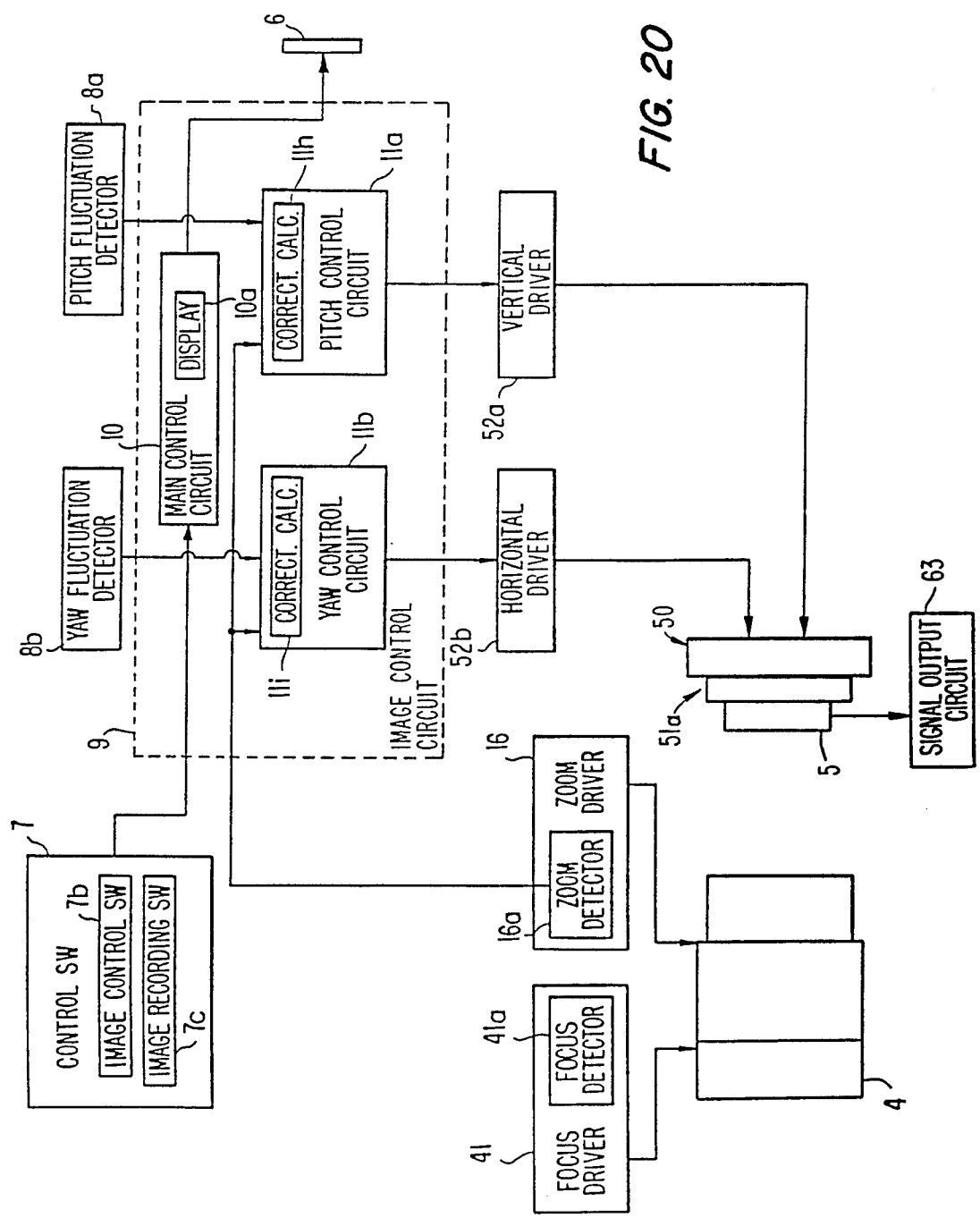
FIG. 20 is a block diagram of a camera apparatus according to a fifth embodiment.
Figure 21:
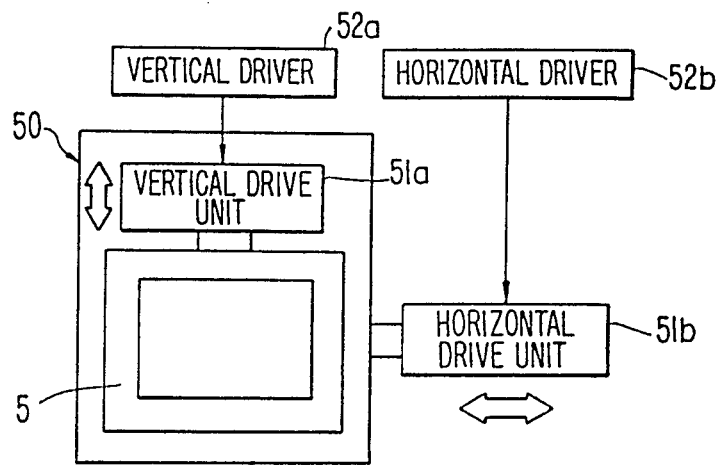
FIG. 21 is a block diagram of a horizontal and vertical drive system.

According to the fifth embodiment, as shown in FIG. 20, the basic arrangement is substantially the same as that of FIG. 2(a) according to the first embodiment. Only the difference of the fifth embodiment with respect to the other embodiments will be described. In an arrangement of the fifth embodiment, the optical axis of the optical system including the focusing unit 4 is not changed as with the first through fourth embodiments, but the optical axis remains unchanged, and the small-size and lightweight imaging unit 5 such as a CCD imager panel is mounted on a horizontal and vertical driver unit 50 as shown in FIG. 21. A vertical driver 51a is driven by a vertical driver circuit 52a in response to a pitch fluctuation, and a horizontal driver 51b is driven by a horizontal driver circuit 52b in response to a yaw fluctuation. Now, a corrective interval which the imaging panel 5 of FIG. 21 should be moved for keeping an image stationary will be computed at the time the camera body is tilted $\theta$ with respect to the absolute coordinate system. It is assumed that the pitch direction is expressed by La, the yaw direction by Lb, the fluctuation angle in the pitch direction by $\theta a$, the fluctuation angle in the yaw direction by $\theta b$, the distance from the camera to the object by A, and the equivalent focal length of the lens by F.

$$La = \frac{FA \sin \theta a}{A \cos \theta b - F} \quad (11)$$

$$Lb = \frac{FA \sin \theta b}{A \cos \theta b - F} \quad (12)$$

In the case of home-use video cameras, F is small, and F/A may be regarded as zero under image-taking conditions in which the distance A is normal. Therefore, the following approximate equations are obtained:

$$La \simeq F \tan \theta a \ldots \quad (13)$$

$$Lb \simeq F \tan \theta b \ldots \quad (14)$$

Almost all hand held home-use video cameras are equipped with zoom lenses. Therefore, the distance A up to the object is detected by the focus detector 41a and the focal length F of the focusing unit 4 is detected by the zoom detector 16a, and the fluctuation angles $\theta a$, $\theta b$ are determined from the fluctuation angular velocities from the pitch and yaw fluctuation detectors 8a, 8b. The arithmetic operations of (11), (12) are effected by pitch and yaw corrective-interval calculating units 11h, 11i on the detected quantities to find the corrective intervals La, Lb in the pitch and yaw directions. The information items La, Lb are fed to the vertical and horizontal driver circuits 52a, 52b to cause the vertical and horizontal drivers 51a, 51b in FIG. 21 to move the imaging panel 5 in the vertical direction for the interval La for correcting the fluctuation in the pitch direction. Therefore, no pitch fluctuation appears in the image as long as the pitch fluctuation is in the correctable range of the vertical driver 51a. The same corrective operation is effected in the yaw direction.

Under normal conditions, no suppression of fluctuations is needed when an object is imaged by the camera close thereto, and the arithmetic operations according to the equations (13), (14) will suffice. Therefore, video cameras for general consumers may be of an arrangement in which the calculating units 11h, 11i effects the arithmetic operations (13), (14) on the information on the focal length from the zoom detector 16a and the information $\theta a$, $\theta b$ from the fluctuation detectors 8a, 8b. This arrangement is highly resistant to shocks and consumes a reduced amount of electric power since it is not necessary to drive the precision optical system such as the focusing unit 4 comprising the lens and the like. Furthermore, the video camera can be designed with greater freedom and is lightweight as with ordinary cameras.

With the rapid advance of recent semiconductor technology, an image pickup panel of the size 4.4×5.7 mm manufactured on a trial basis has been reported. The drivers may be small in size if this image pickup panel is employed. Further miniaturization in the future will make the invention more advantageous in reduction to practice.

However, the correcting range would be limited due to the problem of hand-induced blurring or fluctuations of the lens. This drawback is eliminated by the fluctuation display circuit 10a described with reference to FIGS. 4, 5, and 6. Since the fluctuation display circuit 10a displays indications to allow the user to control the direction of the camera toward the center of the control range at all times, images can sufficiently be stabilized even in the narrow control range.

Embodiment 6

Figure 22:
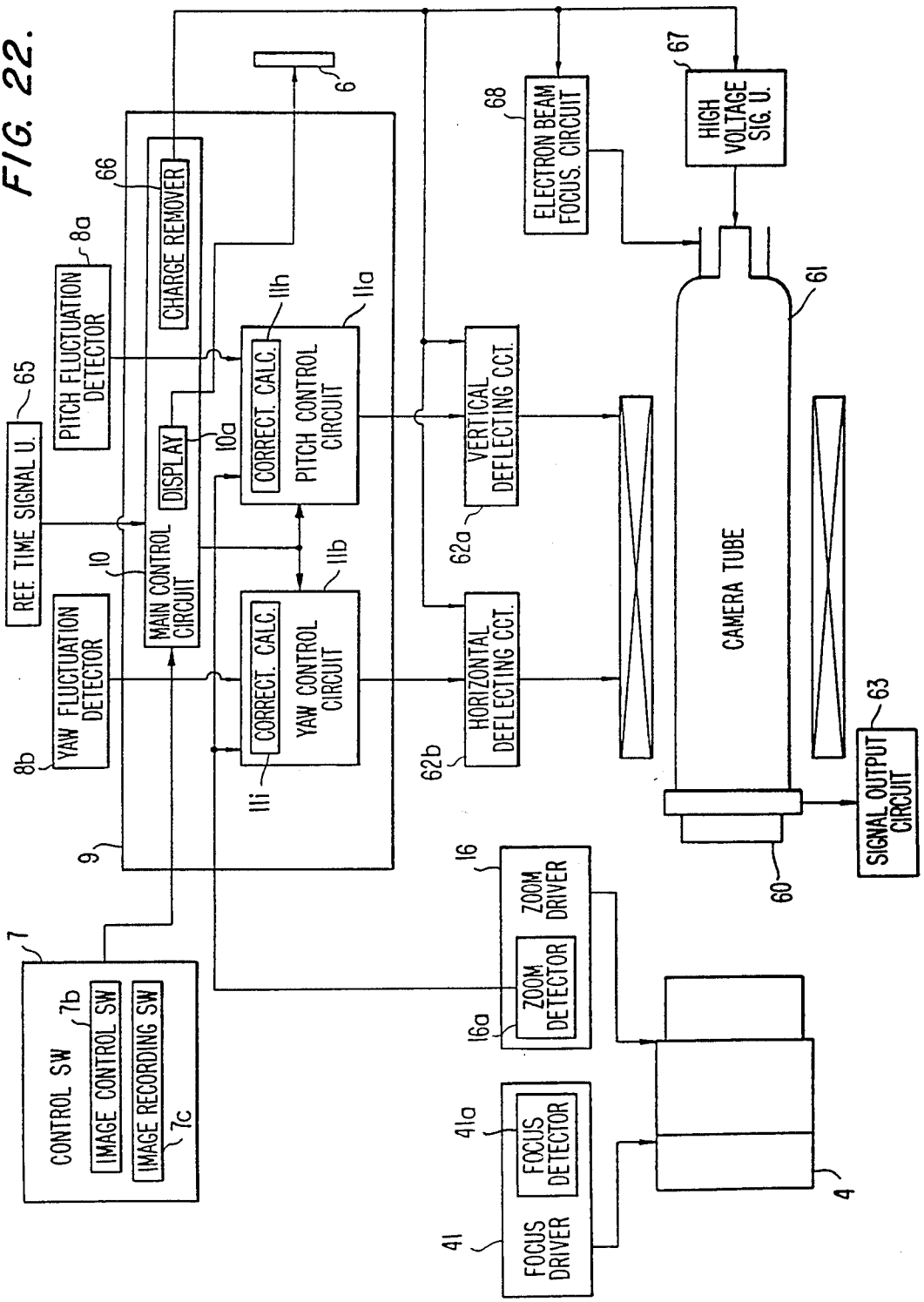
FIG. 22 is a block diagram of a camera apparatus according to a sixth embodiment.

According to the sixth embodiment, as shown in FIG. 22, an image focused by the focusing unit 4 is photoelectrically converted by a photoelectric transducer 60 into electric image information in the form of an electric beam introduced in an image pickup tube 61 having electric readout means for the electron beam. Corrective intervals are calculated by the correction calculating units 11h, 11i dependent on detected information from the fluctuation detectors 8a, 8b for deflecting the electron beam in the image pickup tube 61 with a vertical deflecting circuit 62a and a horizontal deflecting circuit 62b. The image pickup tube 61 finally produces an image-dependent electric signal with suppressed fluctuations through a signal output circuit 63.

Figure 23A:
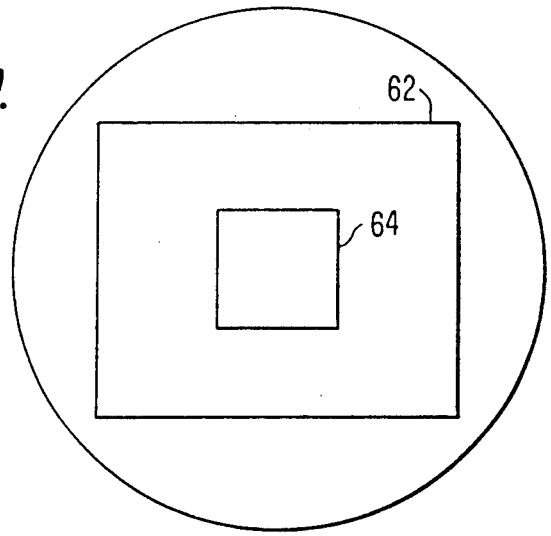
FIGS. 23(a) and (b) are diagrams showing image correction in an image pickup section according to the sixth embodiment.
Figure 23B:
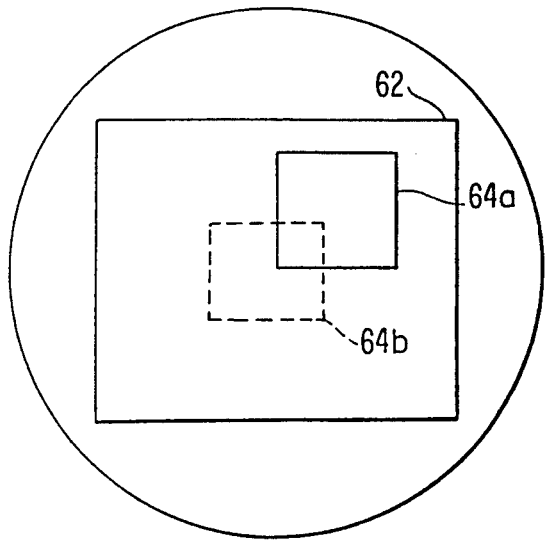

In the sixth embodiment, as shown in FIG. 23(a), there is provided a photoelectric transducer 62 having a margin with respect to an actual image readout unit 64. Dependent on the fluctuation, the image readout unit 64 moves as indicated by the solid or dotted line as shown in FIG. 23(b). Movement of the image readout unit from a position 64a to a position 64b, unless effected in the blanking period in each field or each frame, will cause a color shift in relation to the stripe filter in a single color image pickup tube in a home-use video camera. Therefore, the image control circuit 9 locks its image correcting control based on and during a vertical synchronizing signal from a reference time signal unit 65. As with the fifth embodiment, the corrective interval for an image to move on the focusing surface during a control mode is determined by enabling the corrective-interval calculating units to effect the arithmetic operations (11), (12) or (13), (14) based on the information from the zoom detector 16a and the information from the fluctuation detectors 8a, 8b for correcting the output image. It is necessary at this time to compensate for non-linearity components of the beam deflection.

Where this system for controlling the electric readout means for the two-dimensional converted electric image signal, rather than controlling the optical image on the focusing unit, is incorporated in the home-use video camera, any residual electric charge should be removed from the moved image readout unit 64b for making a beautiful image; otherwise, the accumulated charge is read out and so is any after image. The residual charge is removed by an unwanted-charge remover circuit 66 in the main control circuit. The circuit 66 serves to remove unwanted charges around the image readout unit 64 as shown in FIG. 23(a), and may be of various arrangements. According to this embodiment, the circuit 66 controls the deflection of the electron beam and radiating the electron beam to reset the electric charge around the image readout unit 64 during horizontal and vertical blanking periods.

Figure 24A:
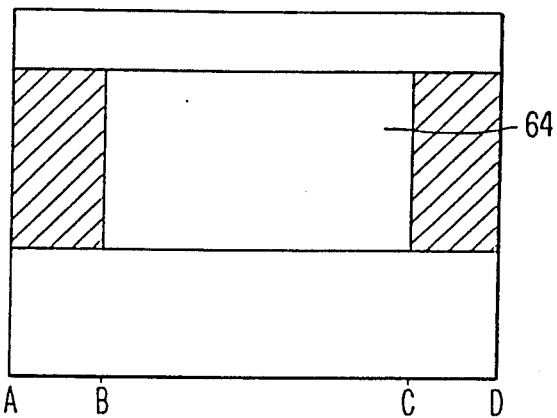
FIGS. 24(a) through (d) are diagrams illustrative of the principle of controlling the scanning of an electron beam.
Figure 24B:
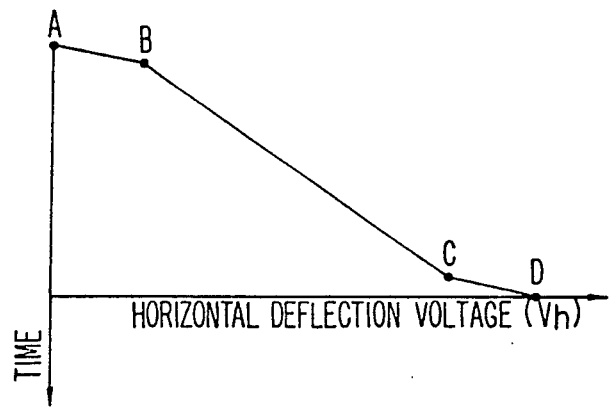

The unwanted charge in the horizontal direction in the image readout unit 64 is accumulated in shaded areas between A, B and C, D in FIG. 24(a). To remove the unwanted charge, the scanning speed at a horizontal deflecting voltage Vh should be increased in the intervals A, B and C, d. If the charge removal is insufficient due to the high scanning speed, then an increased current should be passed by a high-voltage signal unit 67 in FIG. 22 during the scanning intervals A, B and C, D. Where the electron beam is thin and the charge cannot be completely removed, the electron beam should be thickened by an electron beam focusing circuit 68 during the scanning intervals A, B and C, D. The unwanted charge adjacent to the image readout unit 64 in the horizontal direction can thus be removed.

Figure 24C:
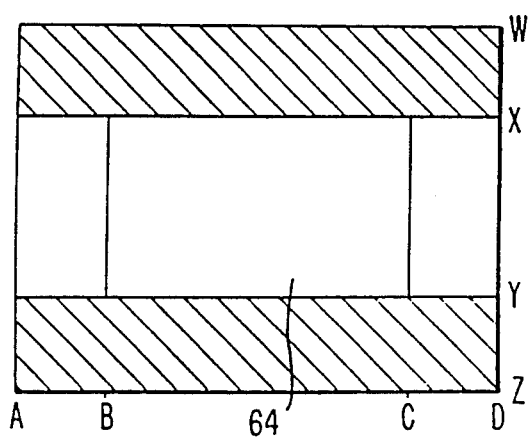
Figure 24D:
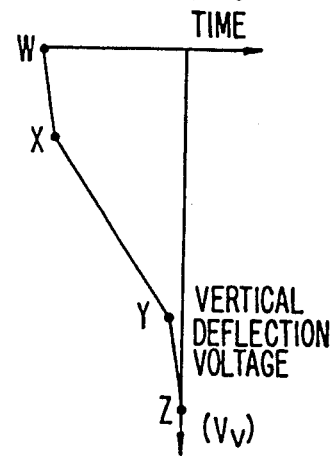

Unwanted charges in the vertical direction are present in shaded areas between W, X and Y, Z in FIG. 24(c). The unwanted charge can be removed by giving a command from the unwanted-charge remover circuit 66 to the vertical deflecting circuit 62a during the vertical blanking period to control a vertical deflecting voltage Vv as shown in FIG. 24(d) for increasing the vertical scanning speed in the intervals W, X and Y, Z and also increasing the horizontal scanning speed. Where the horizontal scanning speed reaches its limit and all unwanted charges cannot be removed with the beam of the same thickness, the thickness of the electron beam should be increased by the electron beam focusing circuit 68, or the charge removal capability should be increased by the high-voltage signal unit 67.

The arrangement of the sixth embodiment is advantageous in reducing the invention to practice since the unwanted charge around the image readout unit 64 can be removed and there is no influence of residual charges even when image control is effected.

Embodiment 7

Figure 25:
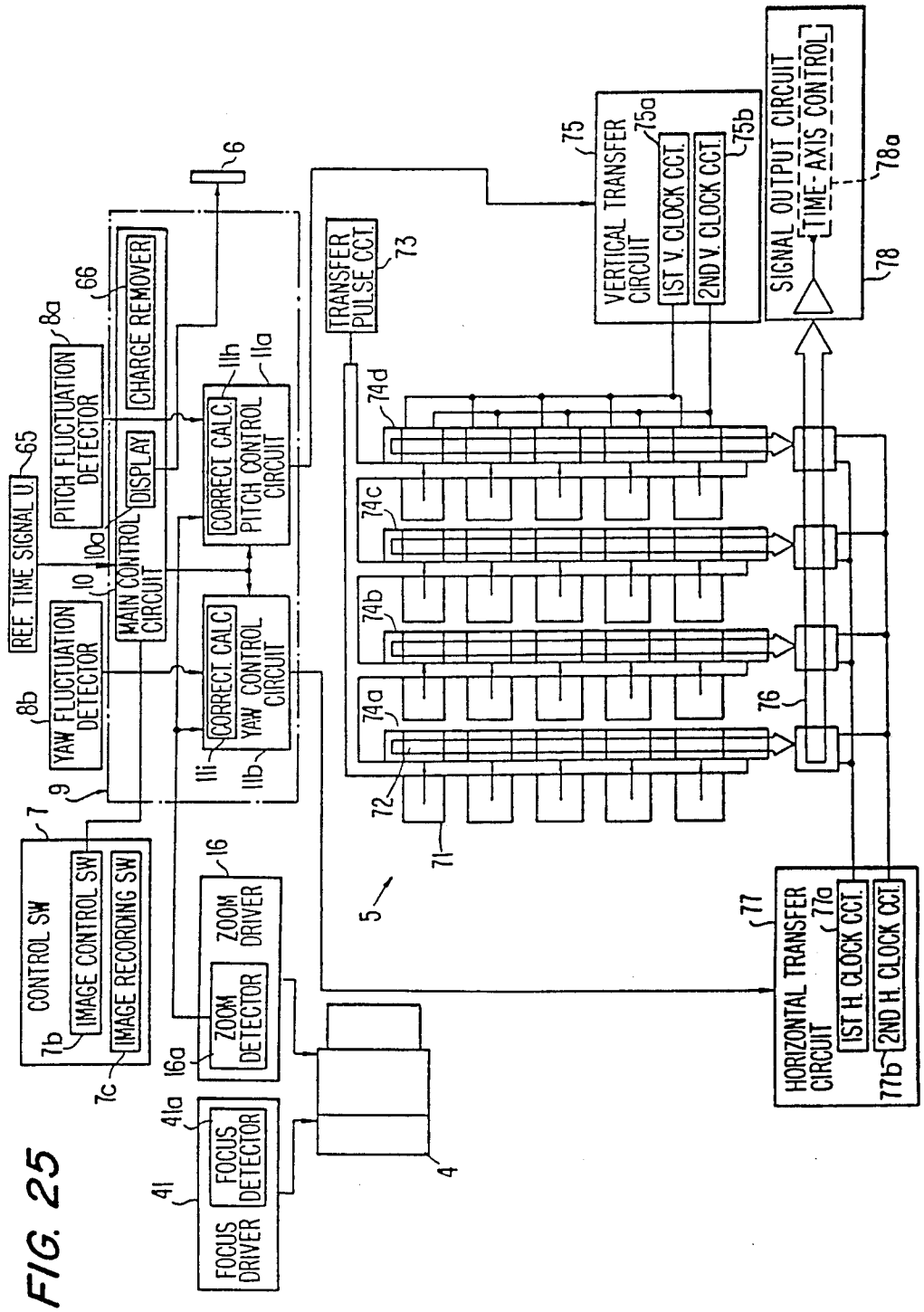
FIG. 25 is a block diagram of a camera apparatus according to a seventh embodiment, which incorporates a charge-transfer solid-state image pickup element.

According to the seventh embodiment, a solid-state image pickup panel such as CCD, MOS or the like is used in place of the image pickup tube 60 in the sixth embodiment, and charge transfer in the vertical and horizontal directions is controlled dependent on the detected fluctuation signals in the pitch and yaw directions for stabilizing successive images. The arrangement of the seventh embodiment is shown in block form in FIG. 25. Since the arrangement of FIG. 25 is similar to that of FIG. 22 for the sixth embodiment, only differences will be described. In FIG. 25, the image pickup unit 5 is composed of an interline-CCD solid-state image pickup panel comprising a matrix of light-detecting pixels 71 such as photodiodes and charge-transfer pixels 72 for transferring information. Although an actual image pickup panel in a home-use color video camera has 400 to 500 horizontal pixels and 250 to 300 vertical pixels, a matrix of 4 horizontal pixels and 5 vertical pixels is illustrated for the sake of clarity. The principle of operation of the image pickup panel will hereinafter be described.

Image information which has been photoelectrically converted by the light-detecting pixels 71 is transferred to the charge-transfer pixels 72 as indicated by the arrows in response to pulses applied from a transfer pulse circuit 73 in each field or each frame. The transferred charges are then transferred vertically through the transfer pixels 72.

The electric pixel information is transferred downwardly through vertical transfer units 74a, 74b, 74c, 74d in response to vertical transfer clock signals from a first vertical clock circuit 75a and a second vertical clock circuit 75b in a vertical transfer circuit 75. The electric information of each pixel thus transferred downwardly is then transferred rightward through a horizontal transfer unit 76 in response to horizontal transfer clock signals from a first horizontal clock circuit 77a and a second horizontal clock circuit 77b in a horizontal transfer circuit 77. The electric information then reaches a signal output circuit 78 which then produces an image signal.

The foregoing is the basic principle of operation. When image control according to the present invention is turned on, control in the pitch, yaw, and roll directions is carried out. Since the image pickup panel has a matrix of pixels and charges are transferred only horizontally and vertically, no control can be effected purely electronically in the roll direction. The roll control is effected dependent on the fluctuating roll angle by attaching the image pickup unit 5 to the roll driver 12 as shown in FIG. 1(a). Since such an arrangement is described in other embodiments, only the principle of operation for pitch and yaw control will be described hereinbelow.

Any fluctuation of the camera body in the pitch direction is detected by the pitch fluctuation detector 8a, and a corrective interval of $f \times \tan \theta$ is determined by the corrective-interval calculating unit 11h from a focal length detected by the zoom detector 16a and a pitch fluctuation angle θa detected by means for integrating a detected signal from the pitch fluctuation detector 8a. The vertical transfer clock signal from the vertical transfer circuit 75 is modulated by the pitch control circuit 11a for equivalent correction shown in FIGS. 23(a), (b) in order to control the time, during the vertical blanking period, in which the desired pixel information reaches the horizontal transfer unit 76 on the focusing surface of the image pickup unit 5, dependent on the corrective interval. This results in the detected pixel signal having been moved in the vertical direction or the pitch direction, and a n image output circuit 78 produces an image signal with suppressed pitch fluctuations.

Any fluctuation of the camera body in the yaw direction is detected by the yaw fluctuation detector, and a corrective interval is calculated by the corrective-interval calculating unit 11i. The horizontal transfer signal from the horizontal transfer circuit 77 is modulated by the yaw control circuit 11b. There is pixel information desired to be obtained through correction and unwanted pixel information around the desired information on the horizontal transfer unit 76. Such unwanted pixel information should be skipped and only the required pixel information should be accessed. Various arrangements are available for such a process.

If no compression and expansion is necessary on the time basis, then unwanted pixel information should be transferred rapidly during the horizontal blanking period, and the desired pixel information should be read out horizontally starting with the head thereof. This process is effective in the instance where the correcting range in the horizontal or yaw direction may be relatively small. The limit of this correcting range is represented by the number of pixels that can be transferred during the horizontal blanking period. Although the horizontal blanking period varies dependent on standards, while the horizontal scanning time is 63.5 μs, the horizontal blanking period is on the order of 11.4 μs, for example, and the transfer time for one pixel in the horizontal direction is required to range from 50 to 100 μs generally. Therefore, the transfer clock signals for the image pickup panel has a frequency of 7.2 MHz or 10.7 MHz, for example. Accordingly, 100 to 200 pixels can be transferred in the horizontal blanking period, and the controlling process can be effected on the image pickup panel in the above range irrespectively of compression and expansion on the time basis. The pixel information can equivalently be moved in the horizontal or yaw direction. With respect to the vertical control range, the vertical blanking period is about 600 μs which is about 60 times the horizontal blanking period. Since there are 5000 to 1000 sufficient pixels that can theoretically be transferred during the vertical blanking period, the control range in the vertical or pitch direction is restricted only by the area of the chip of the image pickup unit 5 and the focusing range on the focusing unit 4.

The horizontal control range must be subjected to compression and expansion on the time basis, or the control range is limited to a small range due to the limit on the horizontal transfer speed. Generally, home-video cameras suffer from more pitch fluctuations than yaw fluctuations. Thus, the above system is effective in providing a low-cost video camera having no additional circuit such as a circuit for effecting compression and expansion on the time basis, in which video camera pitch control is effected in a wide range while yaw control is effected in 10 to 20%, for example, of the image area. For increasing the yaw control range, a time base control circuit 78a for effecting expansion or delay on the time basis may be provided as indicated by the dotted line in the signal output circuit 78.

A specific example will be given. When 500 pixels are finally required in the horizontal direction, 1000 horizontal pixels are provided in the image pickup unit 5 and will all be read in a horizontal scanning time of 63.5 μs. Since the 1000 pixels include 500 pixels required for correction in 31.75 μs and 500 pixels not required for correction in 31.75 μs prior and subsequent to the above 500 pixels, control should be suspended until the head of the 500 pixels required for correction is reached. When the head of the 500 pixels is reached, it is delayed to a demodulation synchronizing signal set in the latest time zone in the control range, and the 500 pixels required for correction start to be read out in synchronism with the demodulation synchronizing signal. By effecting expansion from 31.75 μs to 63.5 μs which is a standard and successively delivering the pixel information, the signal output circuit 78 can produce an image signal which is corrected with respect to yaw fluctuations.

The transfer speed in the horizontal transfer unit 76 can be made constant by providing the time-base control circuit 78a, so that images will be prevented from being adversely affected by different residual charges in high-and low-speed transfer modes in the CCD for increasing the image quality, and the yaw control range can be increased.

Figure 26A:
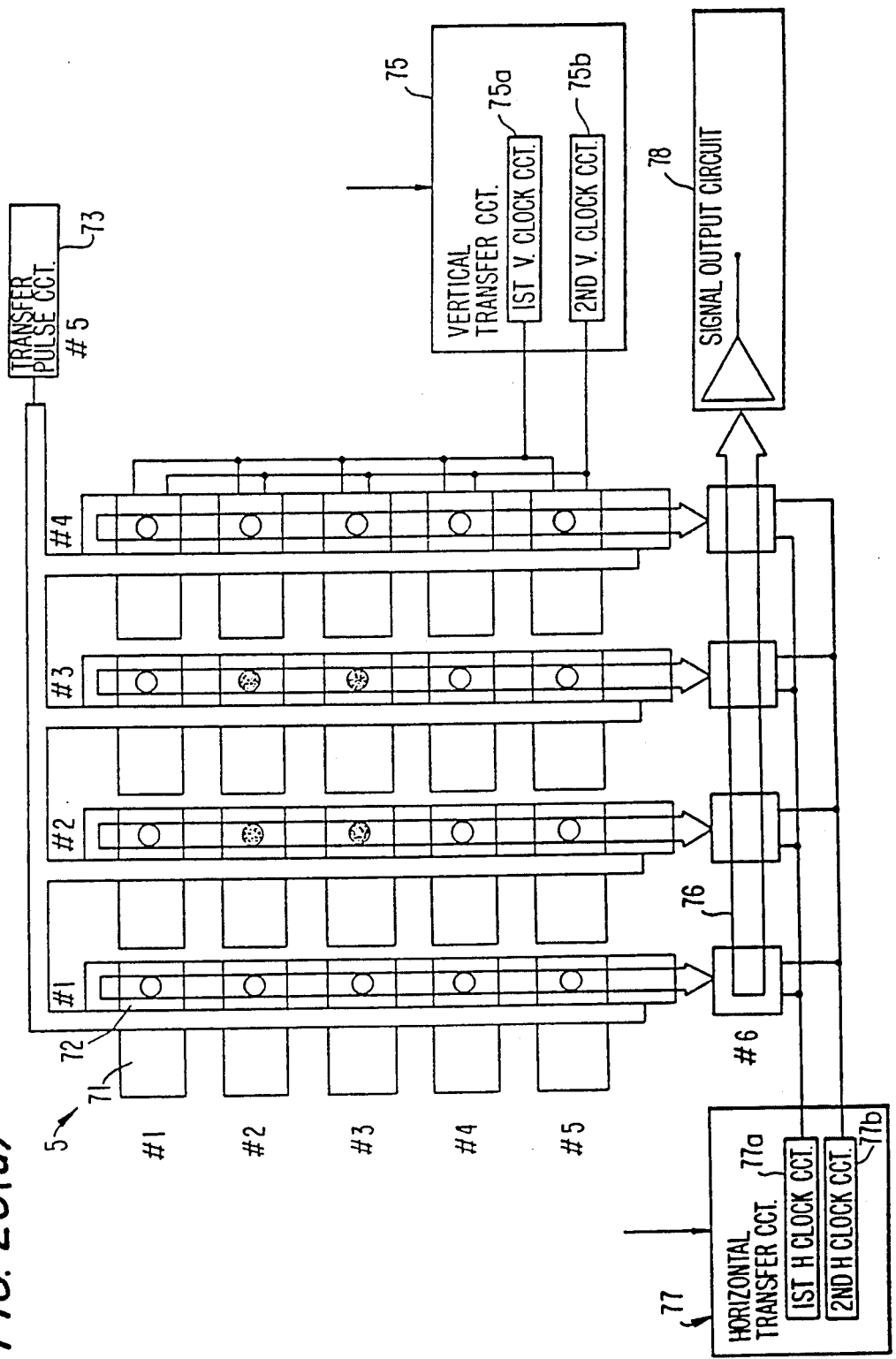
FIGS. 26(a) through (e) are diagrams explanatory of the operation of a first charge-transfer control system.

The manner in which an image is corrected actually will be described with reference to FIGS. 26(a) through (d) in which the image pickup unit 5 as seen in the direction of the incident line has 1/100 of the actual number of pixels in the horizontal and vertical directions. As illustrated in FIG. 26(a), the image pickup unit 5 has a matrix of four vertical columns of pixels and five horizontal rows of pixels. With the horizontal transfer unit 76 and the signal output circuit 78 being regarded as one row, there are five vertical columns and six horizontal rows which are numbered, and any pixel can be expressed by coordinates such as (1, 1) or horizontal and vertical numbers.

Optical information focused on each pixel is shown as having been photoelectrically converted and transferred to the transfer pixels 72 by the pulse signals from the transfer pulse circuit 73. The information of each pixel is indicated by a circle, the pixel information required after correction being indicated by a black circle and the unwanted pixel information by a white circle. The pixels are present in all transfer pixels 72 ranging from (1, 1) to (4, 5), and it is assumed that those pixels to be picked up are four pixels (2, 2), (2, 3), (3, 2), (3, 3) indicated by the black circles.

Figure 26B:
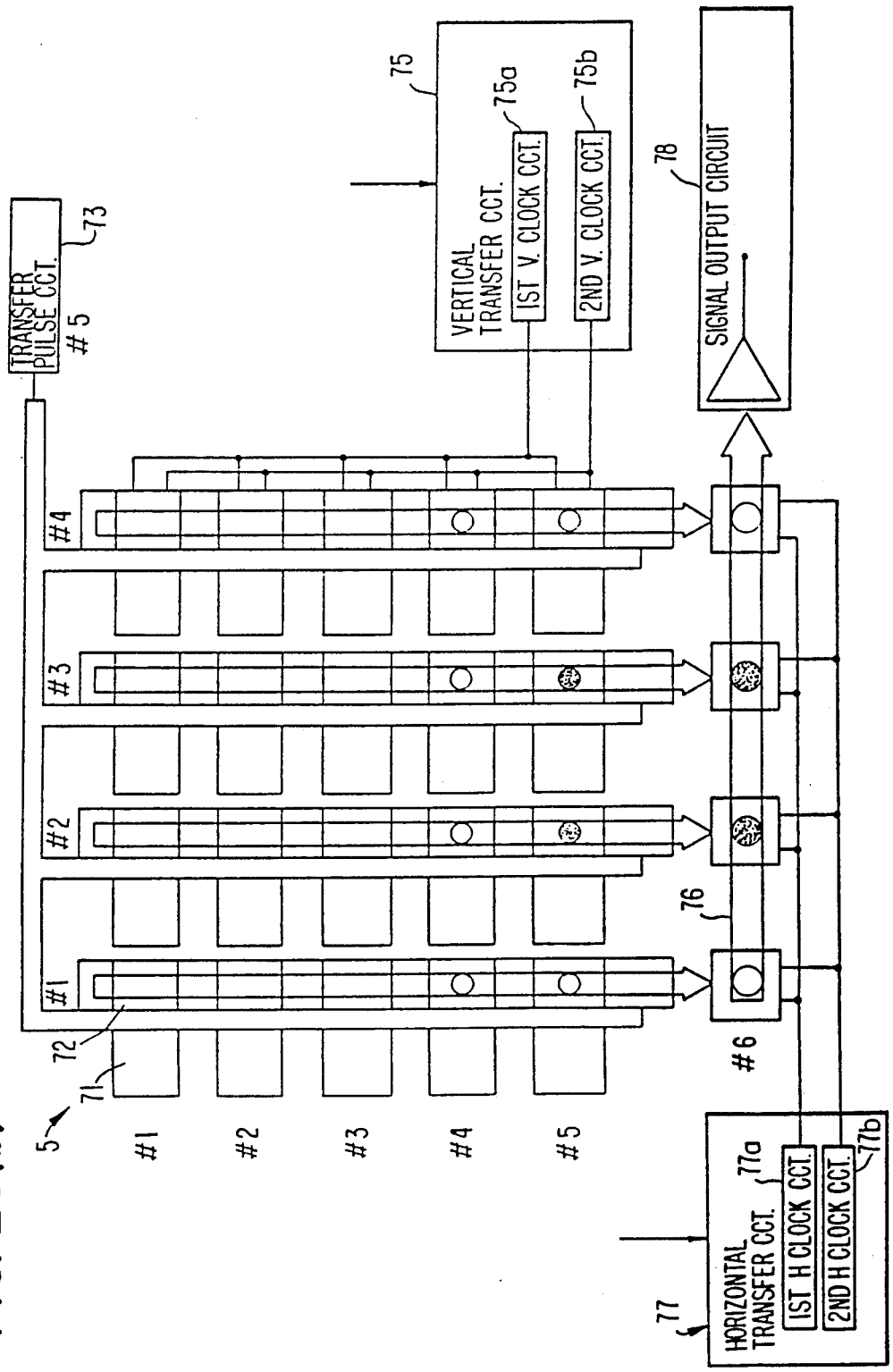

First, correction in the pitch or vertical direction is effected in each field or frame. To this end, the rate of a vertical transfer clock signal from the vertical transfer circuit 75 is controlled by the pitch control circuit 11a during the vertical blanking period, or the number of clock pulses is controlled by the pitch control circuit 11a during the vertical blanking period while keeping the clock rate constant. As shown in FIG. 26(b), the pixel information necessary after correction enters the portions of the horizontal transfer unit 76 having the coordinates (2, 6), (3, 6) as shown in FIG. 26(b). The corrective control in the pitch direction in this field or frame is now completed.

Then, control in the yaw or horizontal direction is effected during the horizontal blanking period or by the time-base control circuit 78a. A system in which the time-base control circuit 78a is not used will be described.

As described above, the horizontal transfer signal of the horizontal transfer circuit 77 is controlled by the yaw control circuit 11b. After the vertical blanking period, each pixel in the horizontal transfer unit 76 is controlled to be transferred to the right by changing the transfer clock rate or the number of clock pulses, so that corrected pixel information will be issued in synchronism with the time for starting horizontal scanning, as indicated by (5, 6) in FIG. 26(c).

Figure 26C:
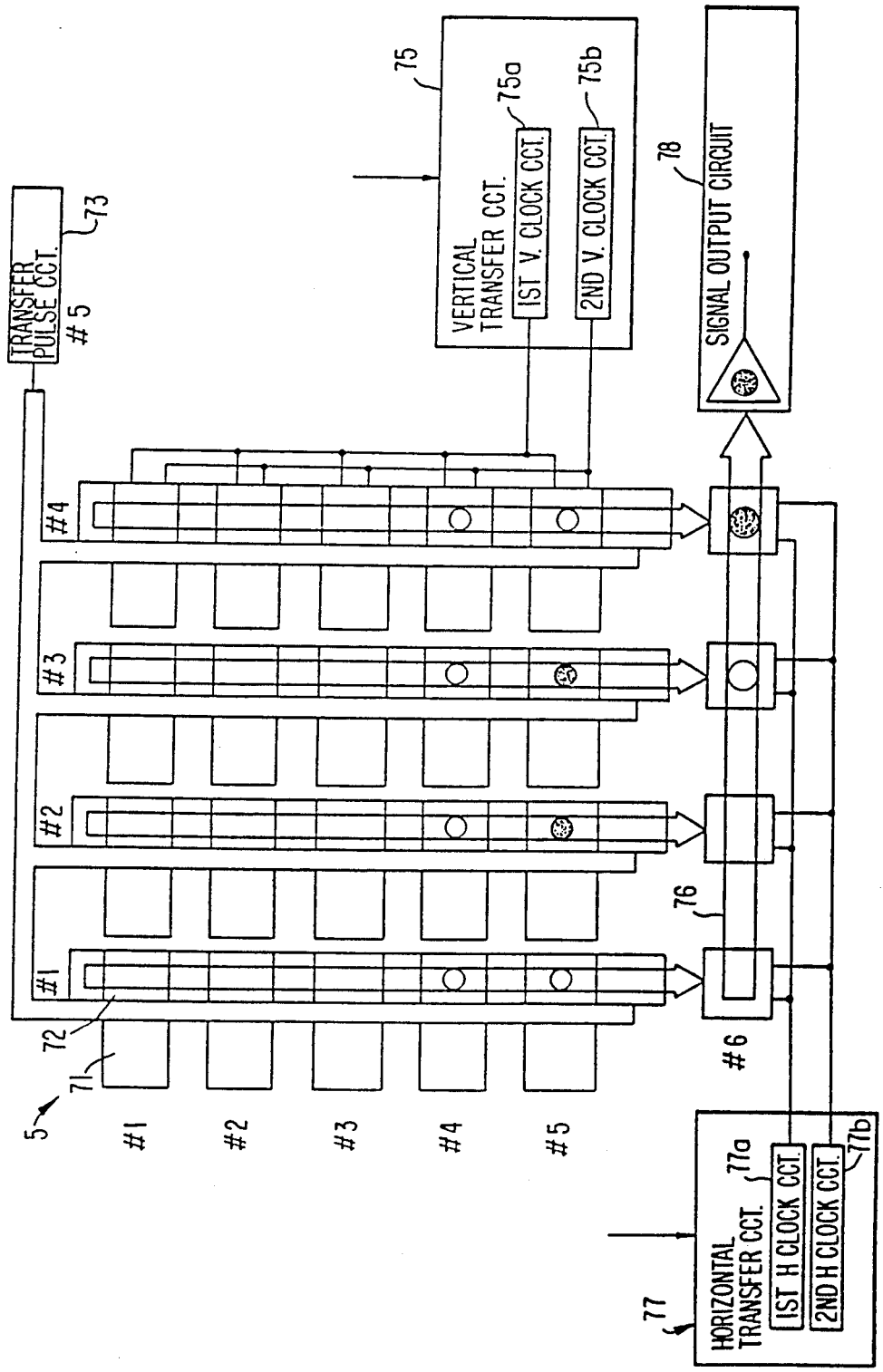
Figure 26D:
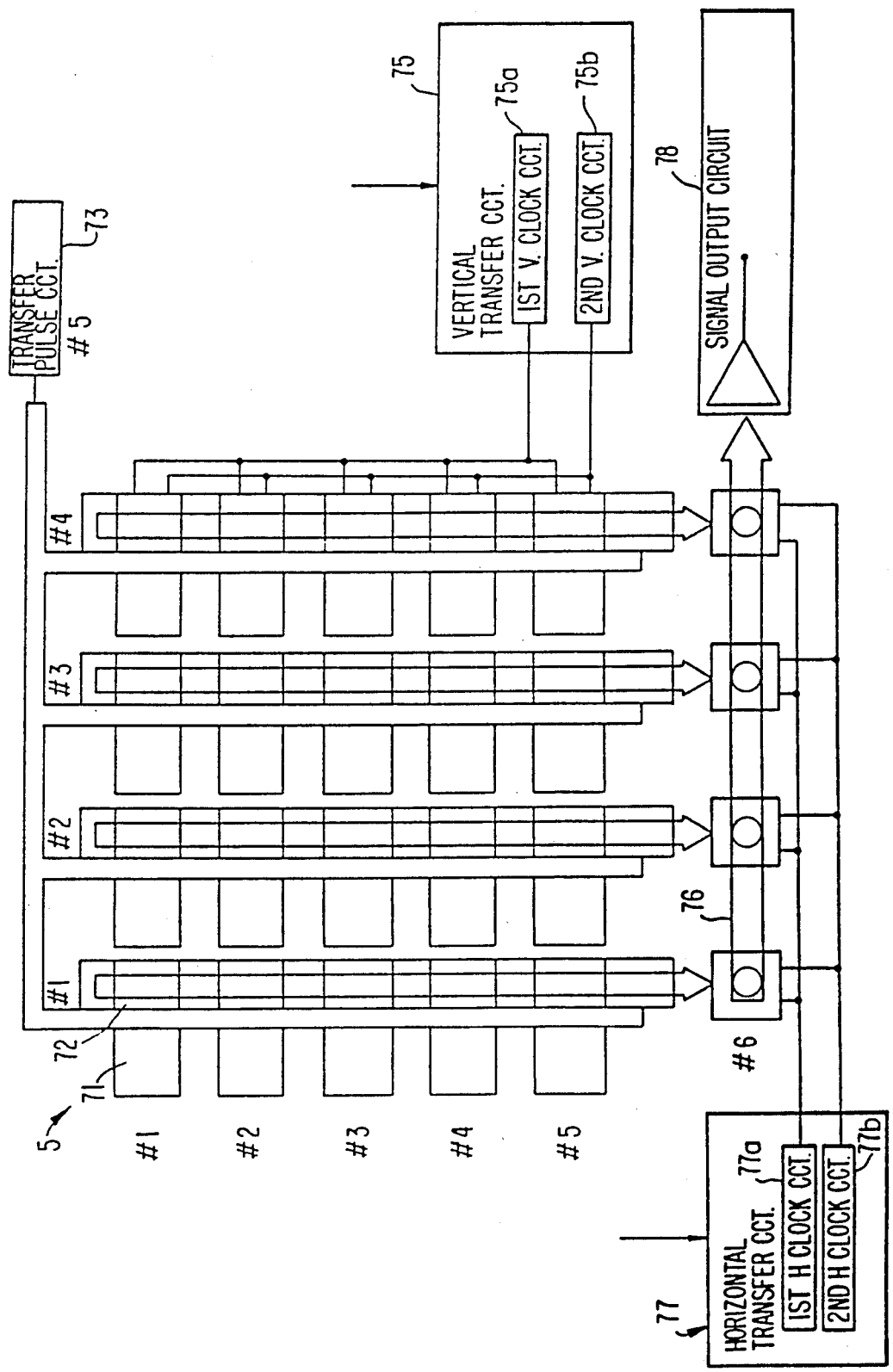

FIG. 26(d) shows the condition after horizontal transfer has been effected as many times as there are required scanning lines. The corrected pixel electric signals have all been issued, and only pixel information not required for correction is left on the horizontal transfer unit 76. Charges have been removed from all of the transfer pixels 72. At this time, a switch element may be provided for each pixel for discharging any residual charges in the conventional manner, so that charges will reliably be removed from the transfer pixels 72.

During the time of one cycle for reading out an image signal in each field or frame, the light-detecting pixels comprising photodiodes store electric quantities converted from the optical information of the focused optical image. During the vertical blanking period, the pixel information is transferred from the light-detecting pixels 72 to the transfer pixels 72 by the transfer pulse circuit 73, whereupon the operation returns to an initial stage of the image readout cycle.

Where there is no fluctuation to which the camera body is subjected during this cycle, the operation returns to the condition of FIG. 26(a) and will repeat the above process. If the camera body suffers fluctuations in the pitch and yaw direction, for example, in this cycle, the fluctuation detectors 8a, 8b detect such fluctuations for quickly calculating optimum corrective intervals.

Figure 26E:
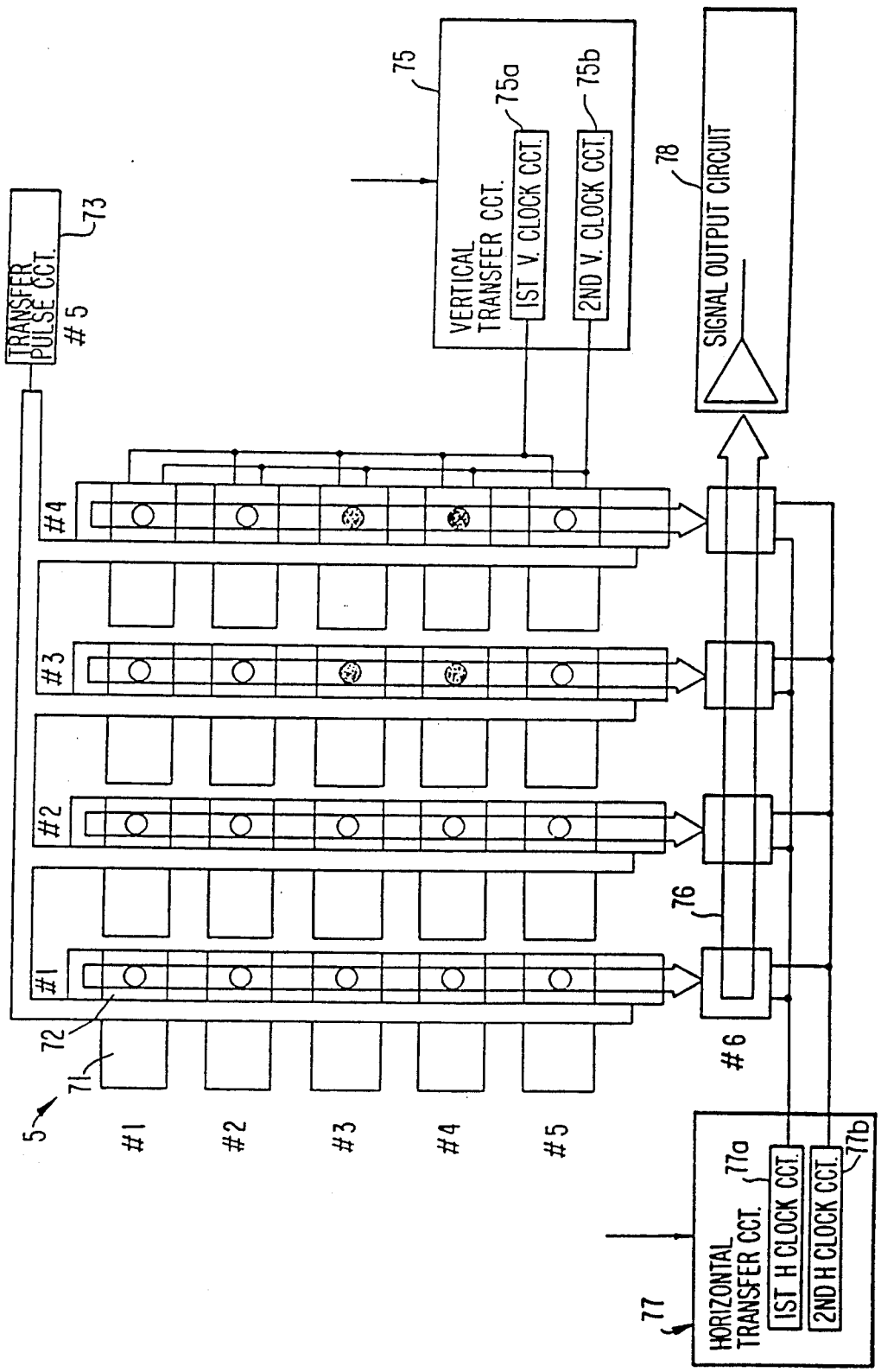

It is assumed here that pixel information on an object to be imaged is present in different pixels as shown in FIG. 26(e). More specifically, information to be present in (2, 2) is entered in (3, 3), information to be present in (2, 3) is entered in (3, 4), information to be present in (3, 2) is entered in (4, 3), and information to be present in (3, 3) is entered in (4, 4). It is therefore necessary to determine such variations or errors, and correct them. The vertical and horizontal variations or errors can be determined by effecting the arithmetic operations (11), (12) or (13), (14) on the pitch and yaw fluctuation angles $\theta a$, $\theta b$ detected by the pitch and yaw fluctuation detectors 8a, 8b, the lens focal length F determined by the zoom detector 16a, and the distance A up to the object determined by the focus detector 41a in the event that the object is imaged at a close range. The variations are determined by the corrective-interval calculating units 11h, 11i, and the pixel information is corrected for those variations by the vertical and horizontal transfer circuits 75, 77 in a next image readout cycle. Therefore, the pitch and yaw fluctuations of the camera body, if within the control range, can be corrected to provide stable successive images which are beautiful and can be seen with ease. Since only the vertical and horizontal transfer is controlled due to the matrix formation of the pixels, roll fluctuations cannot be corrected. To solve this problem, the image pickup unit 5 is attached to the roll driver 12a and rotated as shown in FIG. 1(a). For home-use video cameras, however, successive images can well be stabilized only through control in the pitch and yaw directions, and the roll control may be omitted. Accordingly, the image pickup device can control images purely electronically. Images can further be stabilized by adding roll control.

Since this embodiment has no mechanical parts, it is highly advantageous in that there can be provided in the future a small-size video camera which is rugged in construction and low in cost, and is capable of improving successive images, as the semiconductor technology advances.

Figure 26F:
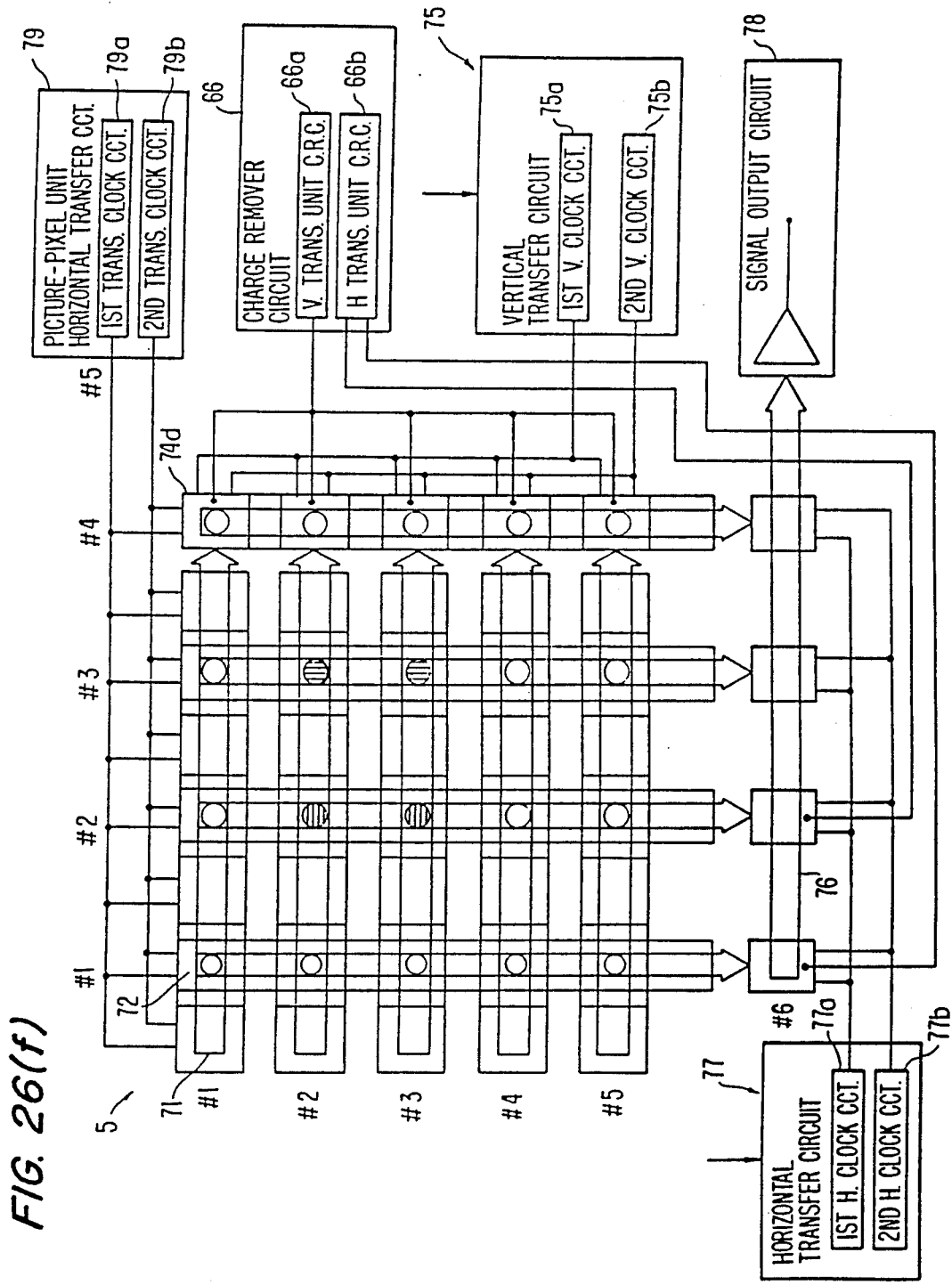
FIGS. 26(f) through (n) are diagrams explanatory of the operation of a second charge-transfer control system.

In the system shown in FIG. 25, many pieces of pixel information are required to be transferred by the horizontal transfer circuit 76 in a short period of time within the horizontal blanking period unless there is no time-base control circuit for effecting compression and expansion on the time basis, and the image correction range in the horizontal or yaw direction is limited to a narrow range due to the limitation on the transfer speed. However, this problem can be overcome by horizontally transferring the pixels during the relatively long blanking period. An arrangement for solving this problem is shown in FIG. 26(f) in which a vertical transfer electrode is disposed on the light-detecting pixels 71 and the transfer pixels 72, and a horizontal pixel transfer circuit 79 for transferring pixel information to the right with a first transfer clock circuit 79a and a second transfer clock circuit 79b. With this arrangement, all pixel information is transferred to the right by the horizontal pixel transfer circuit 79 during the vertical blanking period which is relatively long for image control in the horizontal or yaw direction.

An unwanted-charge remover circuit 66 is also added which comprises a vertical-transfer-unit charge remover circuit 66a for removing charges from the vertical transfer unit 74d through terminals connected thereto. The horizontal pixel transfer circuit 79 is effective in removing charges of unwanted pixel information transferred to the right and in preventing charges from overflowing from a potential well of each transfer cell. The circuit 66 also includes a horizontal-transfer-unit charge remover circuit 66b for quickly removing charges of unwanted pixel information through removal electrodes from certain cells of the horizontal transfer unit 76 to prevent the unwanted charges from being mixed with charges of pixel information required for correction.

The horizontal pixel transfer circuit 79 and the unwanted-charge remover circuit 66 are capable of correcting images in the yaw or horizontal direction during the relatively long vertical blanking period so that a sufficient horizontal correction range can be maintained.

Such operation will be described with reference to FIGS. 26(f) through (n). FIG. 26(f) shows the condition in which pixel information has just been transferred from the light-detecting pixels 71 to the transfer pixels 72 by the horizontal pixel transfer circuit 79 during the vertical blanking period. As with FIG. 26(a), pixels in four vertical columns and five horizontal rows are indicated by circles. Pixel information indicated by white circles is not required after correction, and pixel information indicated by horizontally and vertically hatched circles, or four pixels (2, 2), (2, 3), (3, 2), (3, 3) are representative of pixel information required after correction. Since the vertical blanking period is relatively long as compared with the pixel transfer time, the pixel information is transferred to the right as shown from each transfer pixel 72 to each light-detecting pixel 71 by the horizontal pixel transfer circuit 79 as illustrated in FIG. 26(g). At this time, charges of image information not required for correction which have been transferred to the vertical transfer unit 74d are removed by the vertical-transfer-unit charge remover circuit 66a. In a next horizontal transfer clock cycle, the righthand pixels of information necessary for correction which are indicated by the vertically hatched circles are moved to the coordinates (4, 2), (4, 3) in the vertical transfer unit 73d. Thus, pixel correction in the yaw or horizontal direction is completed mainly during the vertical blanking period. Where an interline-CCD is employed, the light-detecting pixels are of a light-transmissive construction, and the transfer pixels 72 are of a light-blocking construction. This arrangement is employed in the present embodiment. Therefore, charges due to received light are added as noise while the pixel information is transferred horizontally through the light-detecting pixels 71. However, such noise is substantially negligible and causes substantially no image degradation since the time in which one piece of image information is received is about 1/60 second or 16.7 ms, while the time in which noise is received during transfer is 50 μs provided there are 1000 horizontal pixels in a row and the time for transferring one pixel is 50 ms. For reducing such noise, a charge remover terminal or transistor is provided on each light-detecting pixel 71 for removing charges accumulated in each horizontal pixel transfer cycle.

Figure 26H:
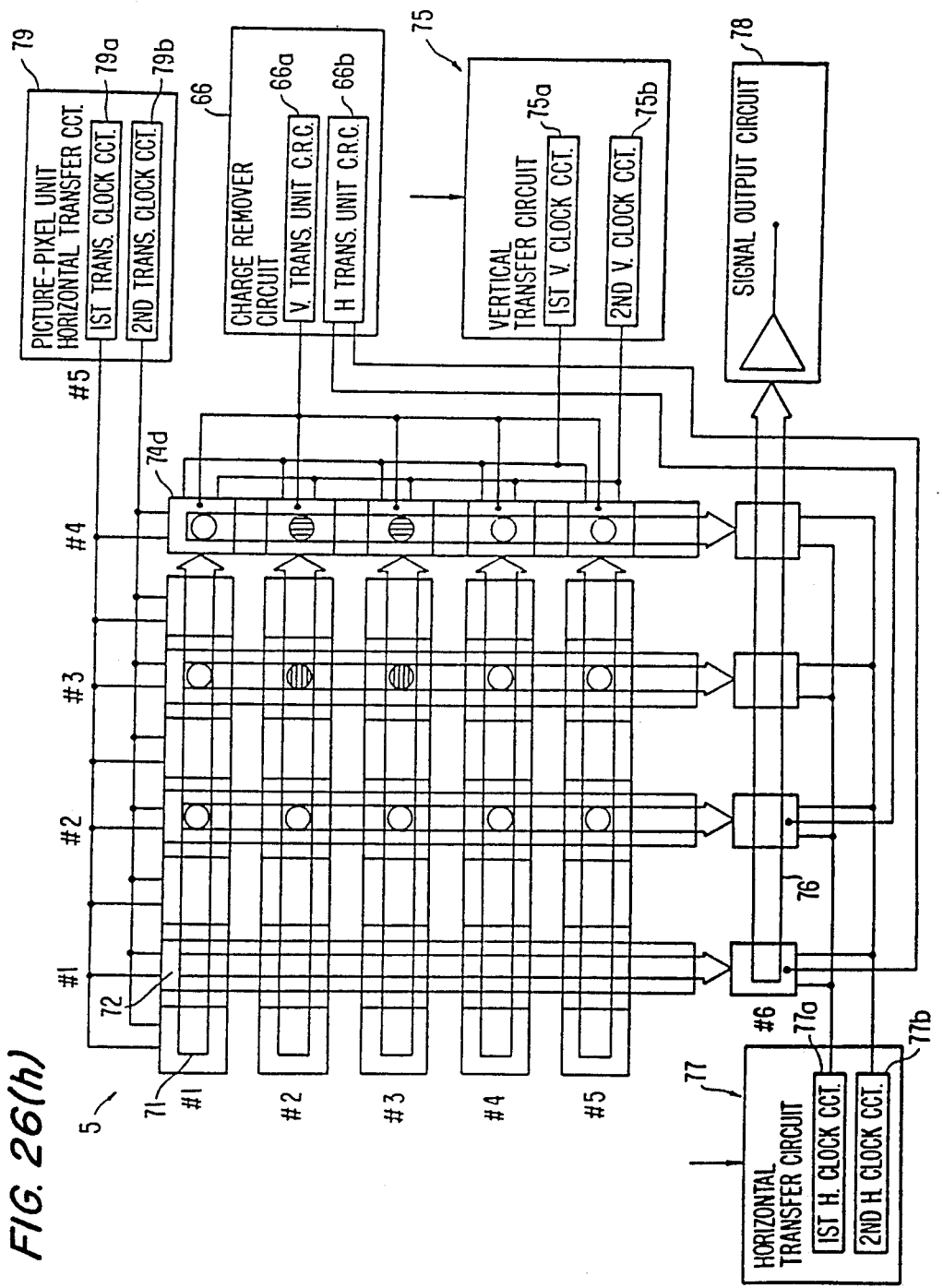
Figure 26I:
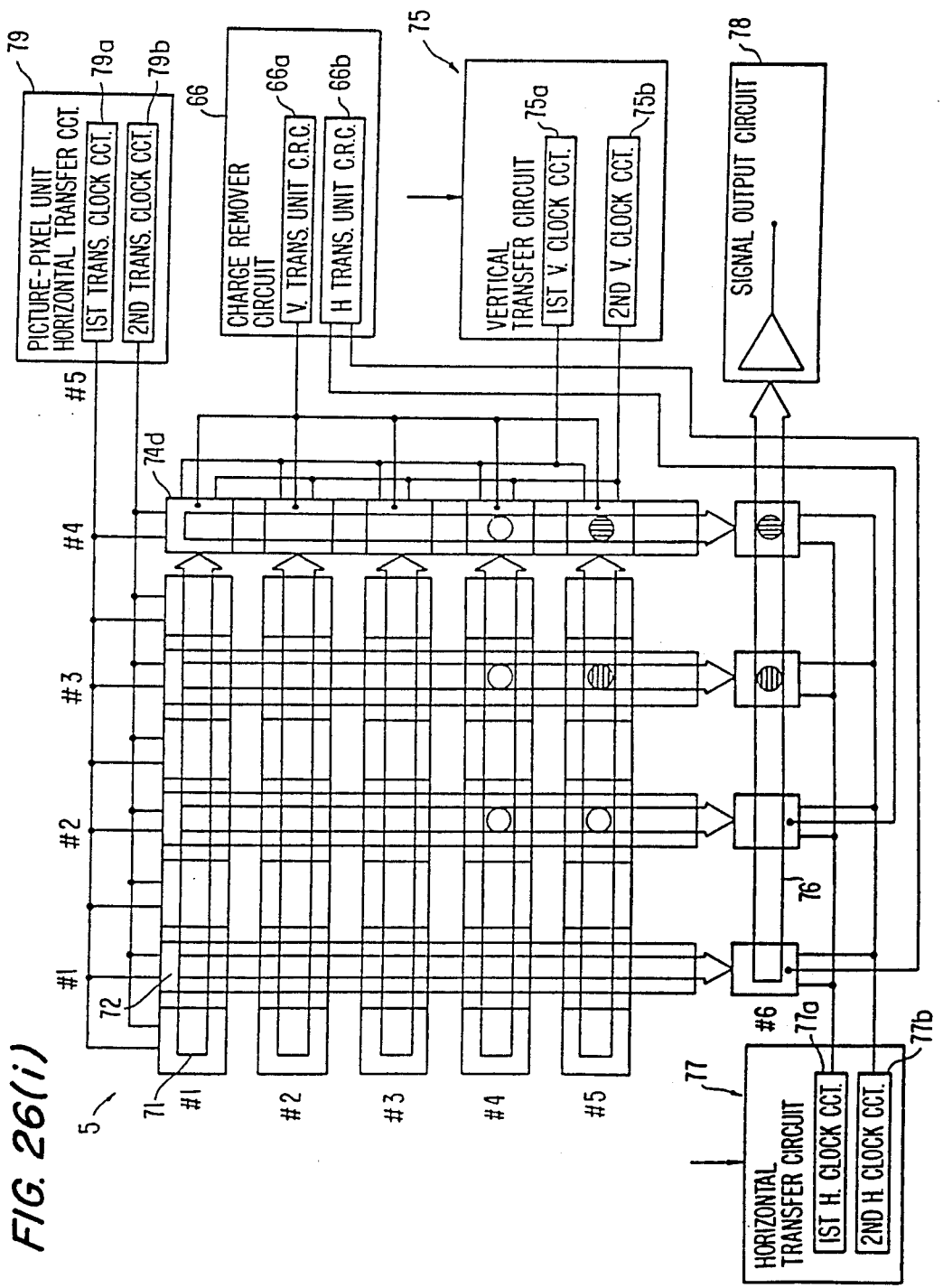
Figure 26K:
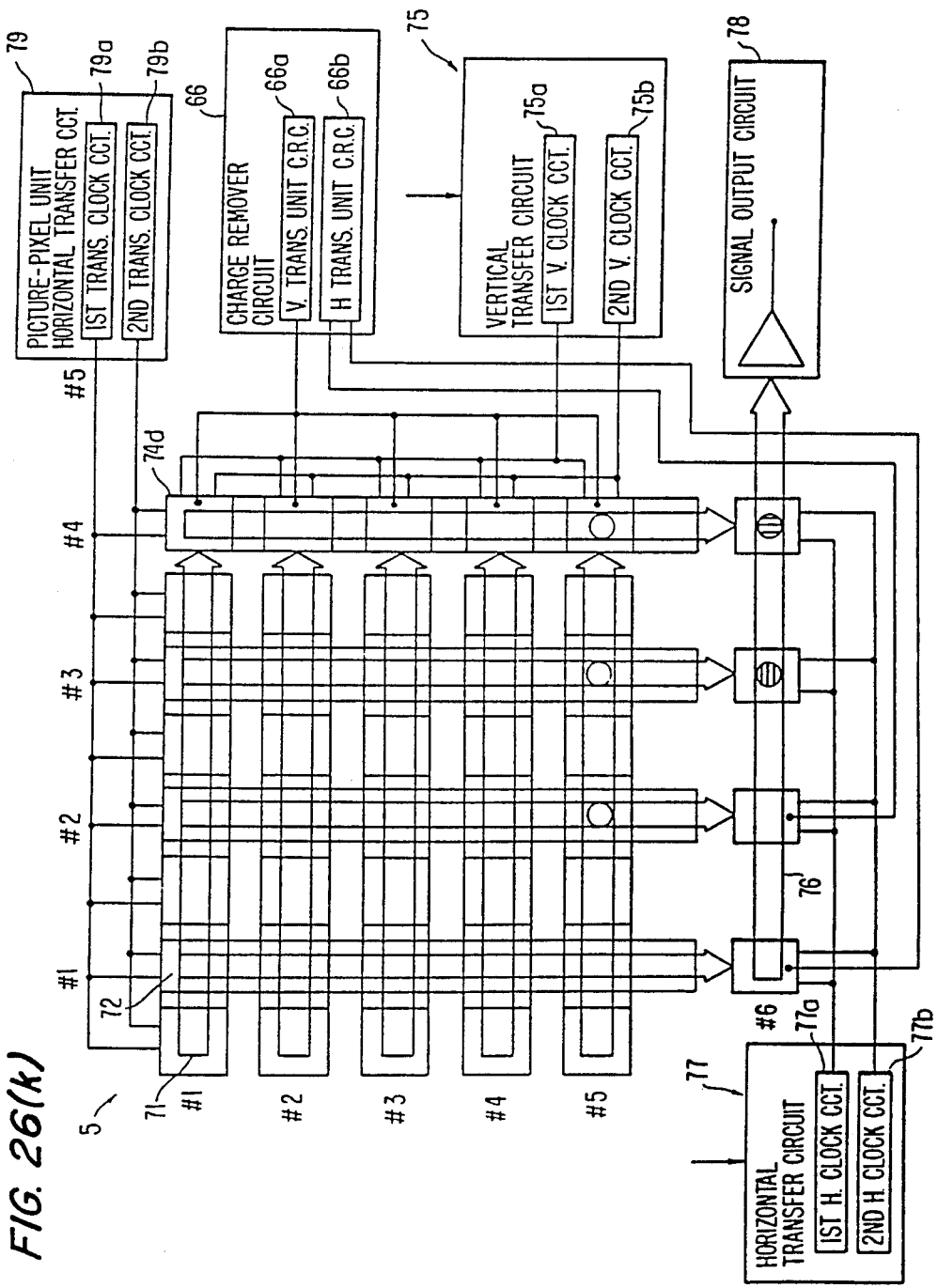
Figure 26:
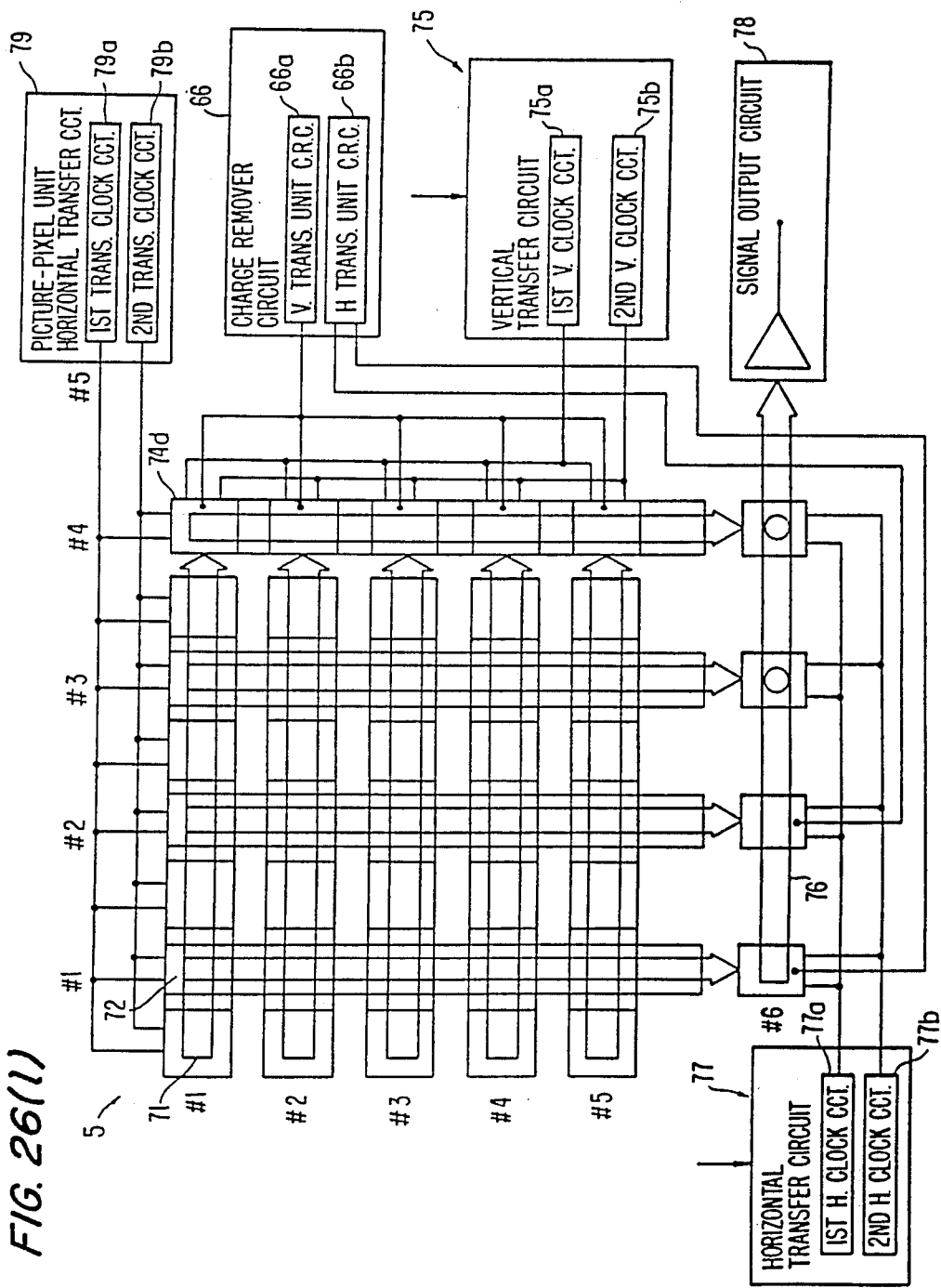
FIGS. 26(o) through (u) are diagrams explanatory of the operation of a third charge-transfer control system.
Figure 26M:
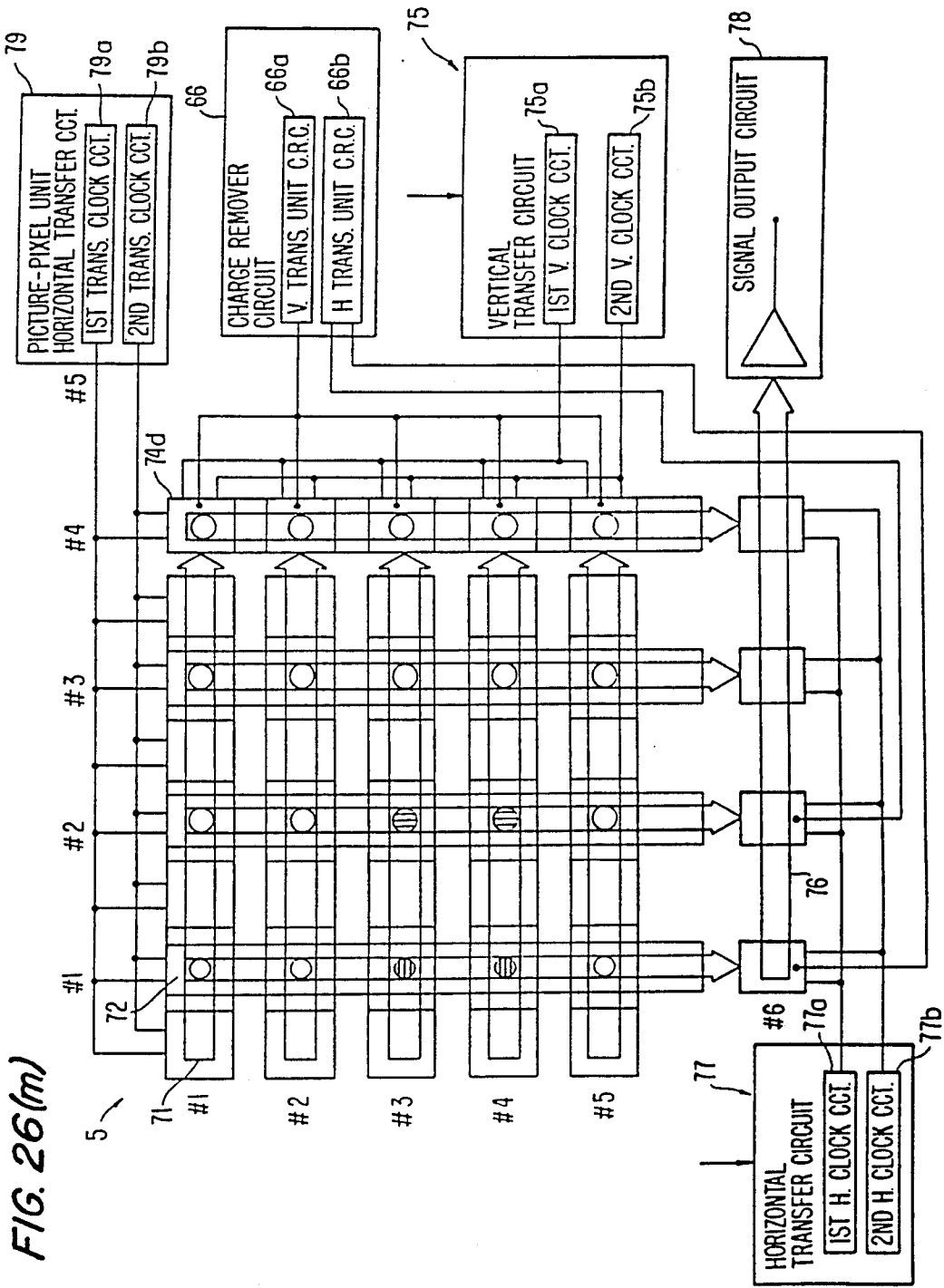

In this manner, image correcting control in the horizontal or yaw direction is completed in the vertical blanking period as shown in FIG. 26(h). Image correcting control in the vertical or pitch direction is effected during the remaining vertical blanking period in the same manner as described with reference to FIGS. 26(a) through 26(e). By transferring the pixel information downwardly for the corrective interval on the vertical transfer unit 74 with the vertical transfer circuit 75, the pixel information required after correction is transferred to the coordinates (3, 6), (4, 6) on the horizontal transfer unit 76 as shown in FIG. 26(c). Because the pixel information not required after correction which has been transferred to the coordinates (2, 6) on the horizontal transfer unit 76 has been removed by the horizontal-transfer-unit charge remover circuit 66b in the unwanted-charge remover circuit 66, no charge is present at the coordinates (2, 6) in the horizontal transfer unit 76. Thereafter, the pixel information required for correction is successively issued out as an image signal by the signal output circuit 78 as shown in FIG. 26(j). Although not shown, there are provided color filters in a pattern of mosaic on the light-detecting pixels 71. By processing pixel signals through the color filters, a color image signal such as an NTSC signal or a PAL or SECAM signal can be produced. As illustrated in FIG. 26(j), the pixel information not required for correction is removed from the horizontal transfer unit 76 by the horizontal-transfer-unit remover circuit 66b, so that no charge remains on the horizontal transfer unit 76, and next pixel information can immediately be transferred to the horizontal transfer unit 76 during the horizontal blanking period. As shown in FIG. 26(k), the pixel information required for correction is entered into the horizontal transfer unit 76, and the charge of unwanted pixel information is removed by the horizontal-transfer-unit charge remover circuit 66b as indicated at the coordinates (2, 6). When the pixel information required for correction is issued from the horizontal transfer unit 76 by the signal output circuit 78, the output of an image for one field is completed, and then any remaining pixel information not required for correction is discharged out during the vertical blanking period as shown in FIG. 26(l). As illustrated in FIG. 26(m), charges accumulated in the light-detecting pixels 71 in one field or one frame are transferred from the light-detecting pixels 71 to the respective transfer pixels 72 in response to a transfer signal from the horizontal pixel transfer circuit 79 during the vertical blanking period. Where the camera body fluctuates during scanning periods of previous and next fields, the operation is effected as shown in FIG. 26(m), such that the fluctuations can be corrected for an interval different from that in FIG. 26(f) in the yaw direction by the horizontal pixel transfer circuit 79 and in the pitch direction by the vertical transfer circuit 75 during the relatively long vertical blanking period. Although the system of FIG. 25 does not have a wide control range, the system of FIG. 26(f) has a sufficiently wide horizontal control range.

Figure 26N:
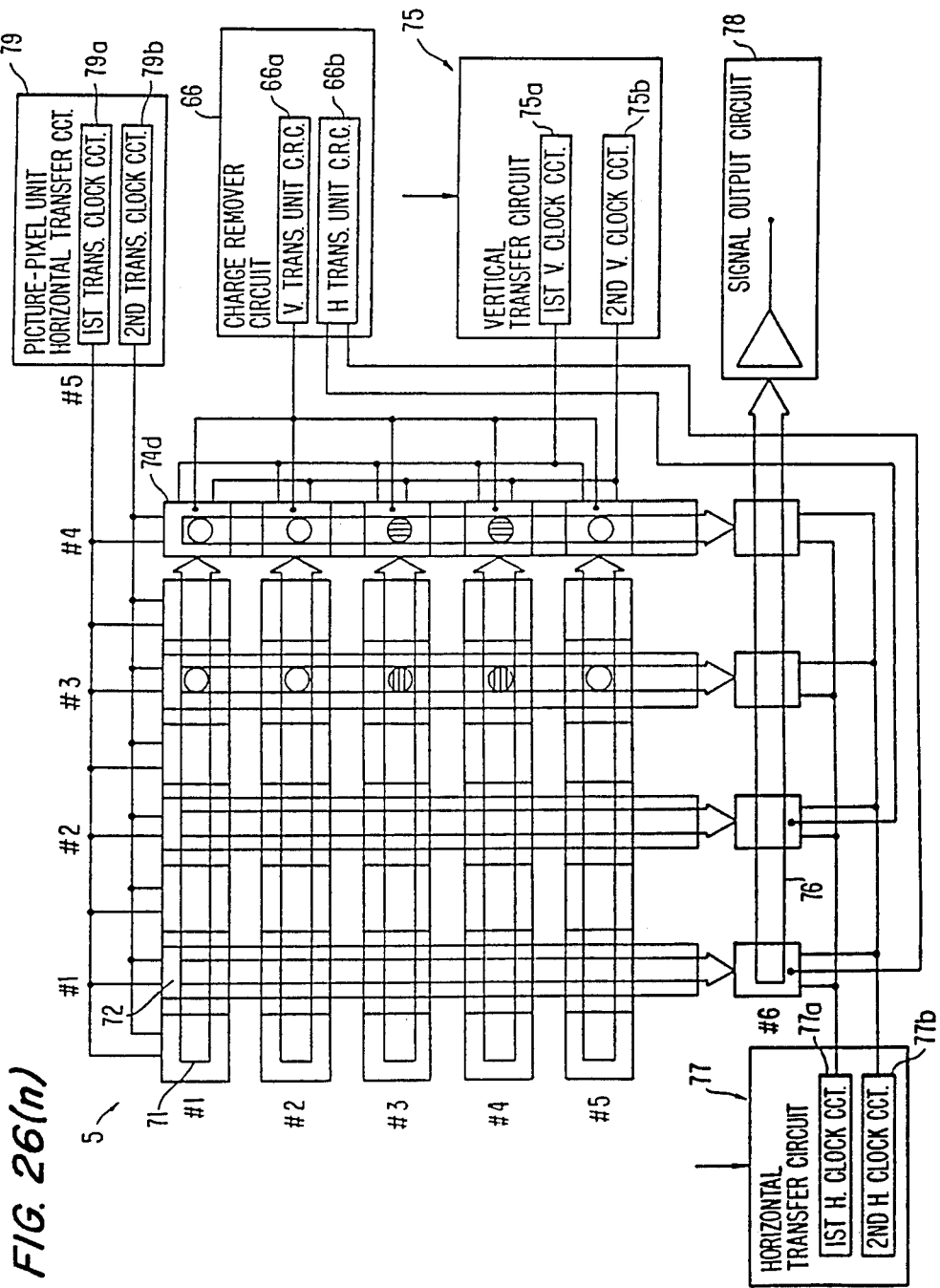
Figure 26A:
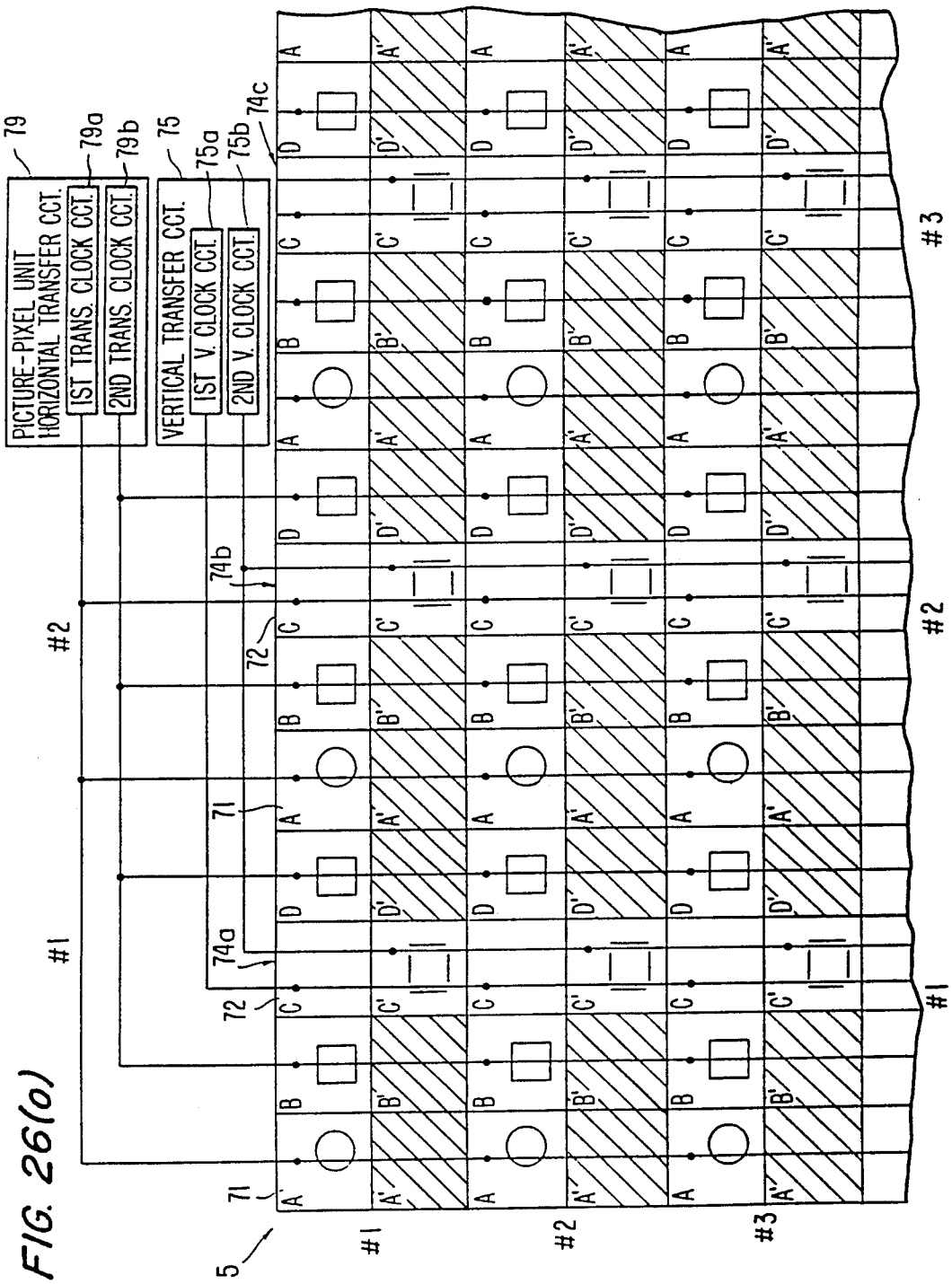

FIG. 26(n) illustrates the condition in which wide control is thereafter effected in the yaw or horizontal direction by the horizontal pixel transfer circuit 79 during the same vertical blanking period.

FIG. 26(o) shows on an enlarged scale an upper lefthand portion of the image pickup panel 5 composed of a CCD image pickup panel of FIG. 26(f), the view showing the horizontal pixel transfer circuit 79 and the vertical transfer circuit 75 only. Eight cells A, B, C, D, A', B', C', D' on an upper lefthand portion constitute one pixel. In reality, there are several hundred thousand pixels, but only three vertical columns and three horizontal rows of pixels are illustrated. The pixels are of the same construction, and charge-transfer electrodes are provided on the cells A, B, C, D, C' of each pixel with thin insulating layers interposed. Hatched cells A', B', D' are channel stoppers provided by diffusing impurities for preventing a charge transfer. Designated at A is the light-detecting pixel 71 with the electrode thereon connected to the first transfer clock circuit 79a for horizontal transfer. Designated at B is a horizontal transfer cell with the electrode thereon connected to the second transfer clock circuit 79b. Designated at C is the transfer pixel 72 with the electrode thereon connected to the first vertical clock circuit 75a in the vertical transfer unit 74. Denoted at D is a horizontal transfer cell with the electrode thereon connected to the second transfer clock circuit 79b for horizontal transfer. Denoted at C' is a vertical transfer cell constituting part of the vertical transfer unit 74 with the electrode thereon connected to the second vertical clock circuit 75b. As described above, the hatched cells A', B', C' are channel stoppers for preventing a charge transfer.

Figure 26P:
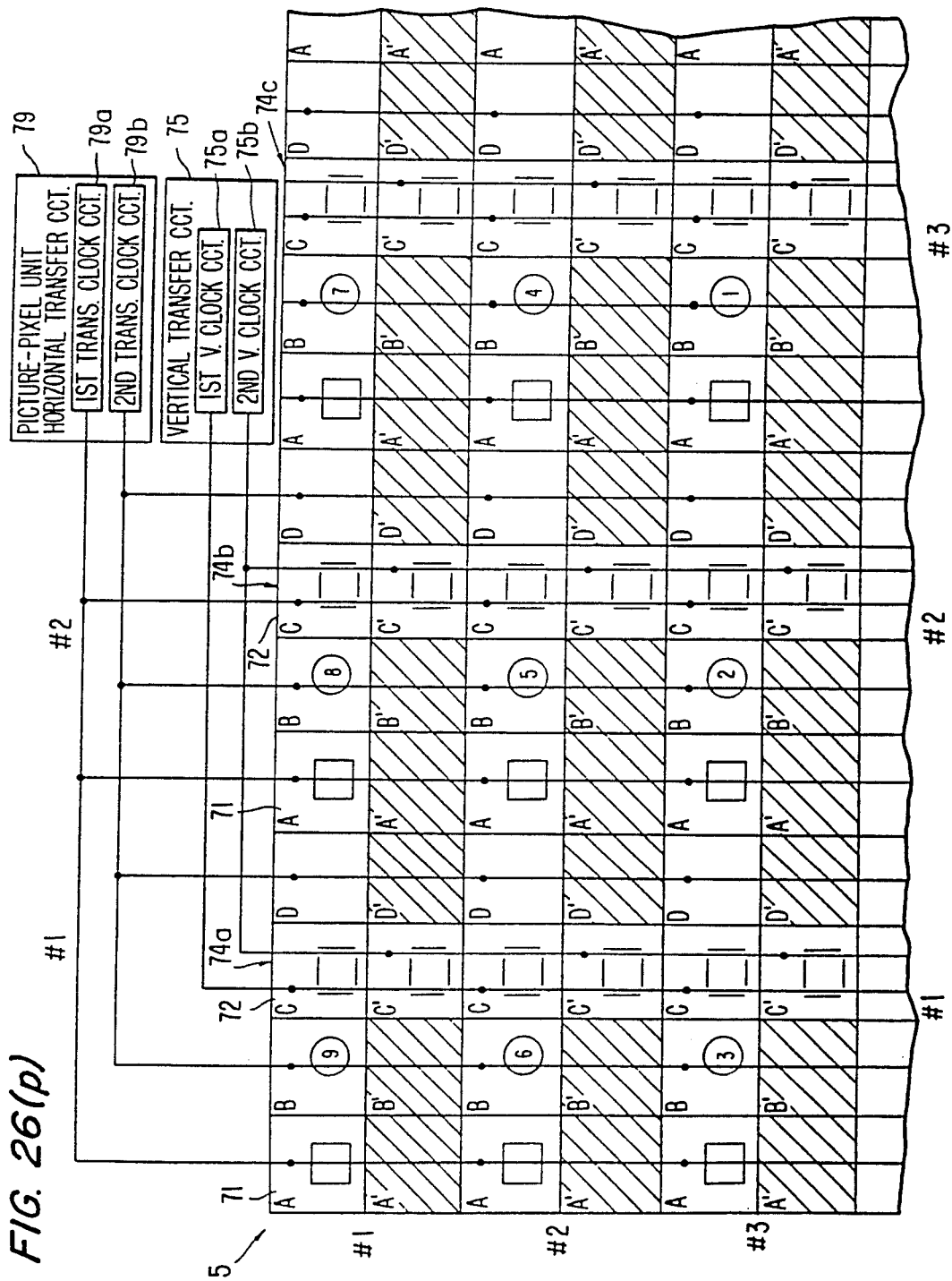
Figure 26R:
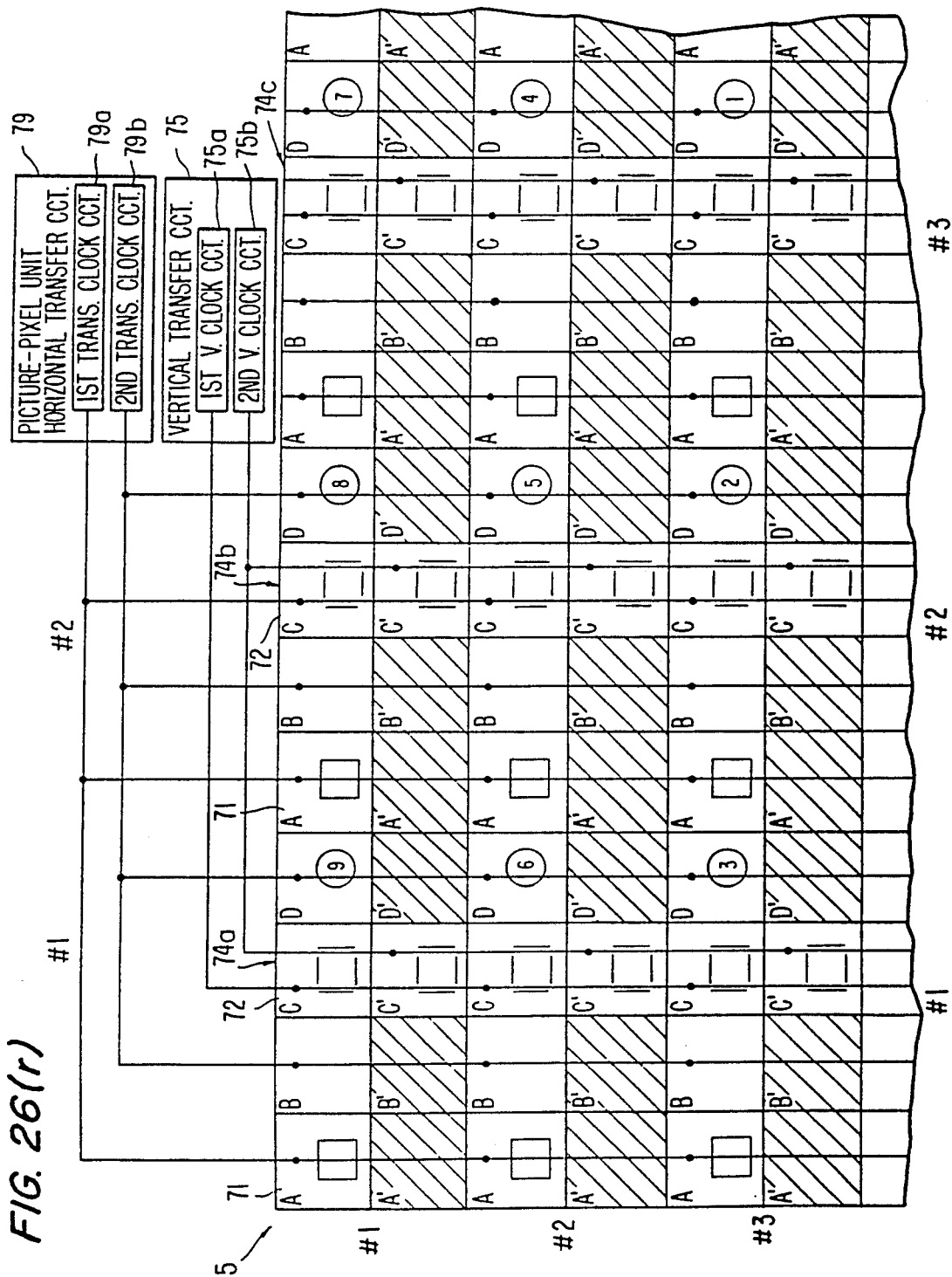
Figure 26S:
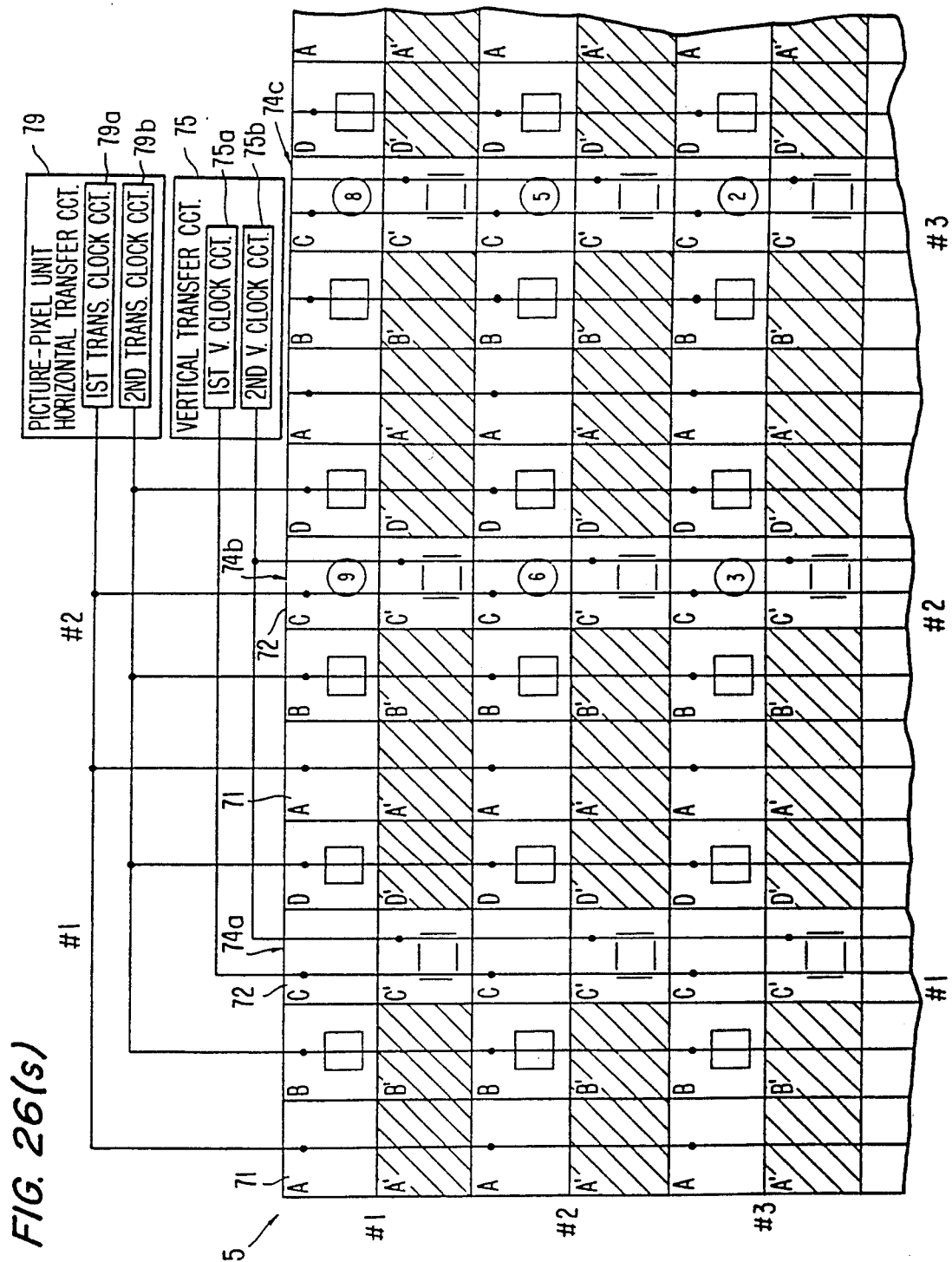
Figure 26U:
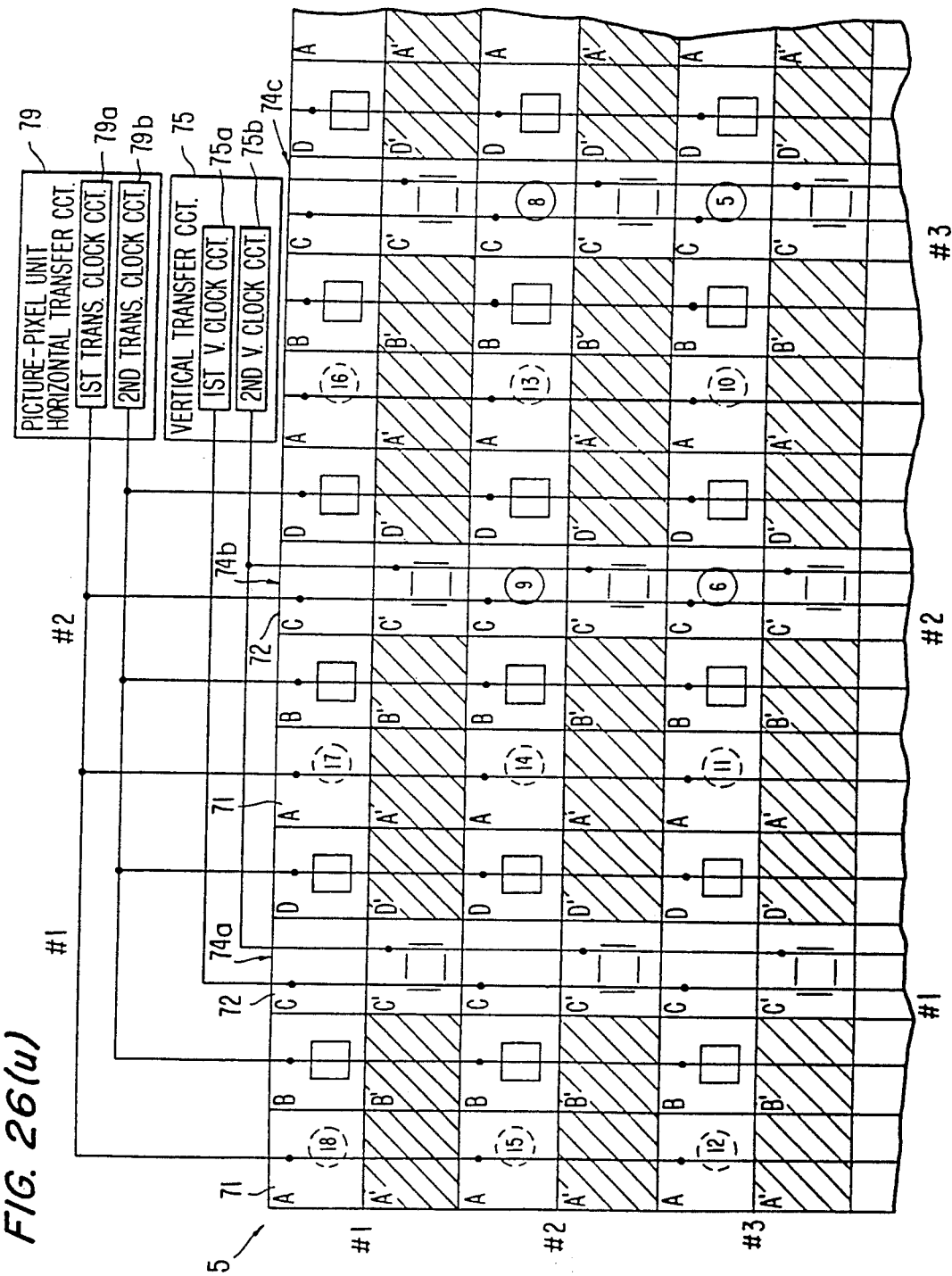

FIG. 26(o) illustrates the condition in which an optical image focused on each light-detecting pixel 71 has just been photoelectrically converted. Nine pixels are provided with pixel information indicated by circles numbered from 1 through 9.

Where a CCD image pickup panel of a P-channel substrate is employed, electrons are transferred, and the well below a transfer electrode is rendered shallow by application of a negative or low voltage to remove a charge from the electrode of the low potential. The electrode portion of the low potential is indicated by a square. Therefore, in FIG. 26(o), the cells B, D, C' in each pixel are set to the low potential by the clock circuits. Under this condition, the pixel information numbered 1 through 9 is not transferred, and photoelectric conversion of image information is continued for the period of one field or one frame to store electric information. Upon elapse of the time of one field or one frame, the image information starts to be transferred horizontally in response to a horizontal clock signal from the horizontal pixel transfer circuit 79. Since the cells A, C go low in potential and the portion B go high in potential as shown in FIG. 26(p), the pixel information is transferred to the right in the horizontal direction. In a next cycle, the cells B, D, C' go low in potential and the cells A, C go high in potential as illustrated in FIG. 26(q), so that the pixel information stays in the cell C. Since the downward transfer in the vertical transfer unit 74 is prevented by the cell C' which is of a low potential, the pixel information is continuously transferred horizontally. Then, the condition of FIG. 26(r) is reached. Therefore, image correction in the horizontal or yaw direction is made possible by the CCD image pickup panel of the above construction. The corrective interval in the yaw direction is determined by the calculating unit 11i of FIG. 25 according to the arithmetic operations (11), (12) or (13), (14) based on the fluctuation in the yaw direction, the zoom ratio, and other data. The pixels are horizontally transferred by the determined corrective interval. This correction is completed in a short initial time in the relatively long vertical blanking period. As the limit on the transfer speed may not be considered, a wider control range in the yaw direction is possible. Although the pixels other than the light-detecting pixels 71 are of a light-blocking construction, the pixel information is transferred through the light-detecting pixels 71 that are not of the light-blocking construction dependent on the fluctuation in the yaw direction, with the result that the pixel information is subjected to greater noise as the corrective interval in the horizontal direction is larger. This problem can be obviated by providing a charge remover switch for each light-detecting pixel for removing charges based on unwanted image information in synchronism with the horizontal transfer clock. Where NTSC is concerned, the horizontal transfer time is on the order of 100 μs for yaw correction as compared with the vertical scanning period of 16.7 ms, and the above function is not necessarily required for general consumers. FIG. 26(s) shows the condition in which correction in the yaw or horizontal direction has been completed, the condition being the same as that of FIG. 26(h). Thereafter, the image information is transferred vertically downwardly for an interval corresponding to a pitch fluctuation for correcting the same. As shown in FIGS. 26(s), (t), and (u), no horizontal transfer is effected, and photoelectrically converted charges are stored in the cells A on the horizontal pixel transfer unit as the cells A are of a high potential and the cells B, C are of a low potential. Since the cells B, C are kept at the low potential by the second transfer clock circuit during the vertical transfer, the charges are prevented from horizontally leaking from the horizontal transfer unit 74. The pixel information starts being transferred downwardly by the transfer clock signal from the vertical transfer circuit 75. With the well in each cell on the vertical transfer unit 74 having a transfer directivity, each cell in the vertical direction repeatedly switches between the high and low potentials in two phases for moving the pixel information for an interval to correct the pitch fluctuation during the vertical blanking period. When the condition of FIG. 26(i) is reached, the pitch fluctuation correction is finished. At the same time, pixel information in a next field or frame starts being stored in pixels indicated by dotted-line circles numbered 10 through 18 in the light-detecting pixels 71 in FIG. 26(u). Upon completion the scanning of one field or one frame, as shown in FIG. 26(l), the pixel information is transferred from the light-detecting pixels 71 to the transfer pixels 72 by the pixel transfer circuit 79 to repeat the cycle of correcting the pitch and yaw fluctuations in one field or one frame. The system of FIGS. 26(f), (o) can have a wide horizontal control range and can be manufactured by a conventional process for transfer speed, and hence is additionally advantageous in that the system can easily be mass-produced less expensively on the prior manufacturing installation. Although in FIG. 26(o) the openings of the light-detecting pixels 71 have a small area, they can be enlarged. While each cell is composed of 8 cells, it may actually be composed of 6 cells including 5 cells A, B, C, D, C', a combination of A', B', D', and a channel stopper.

Embodiment 8

Figure 27:
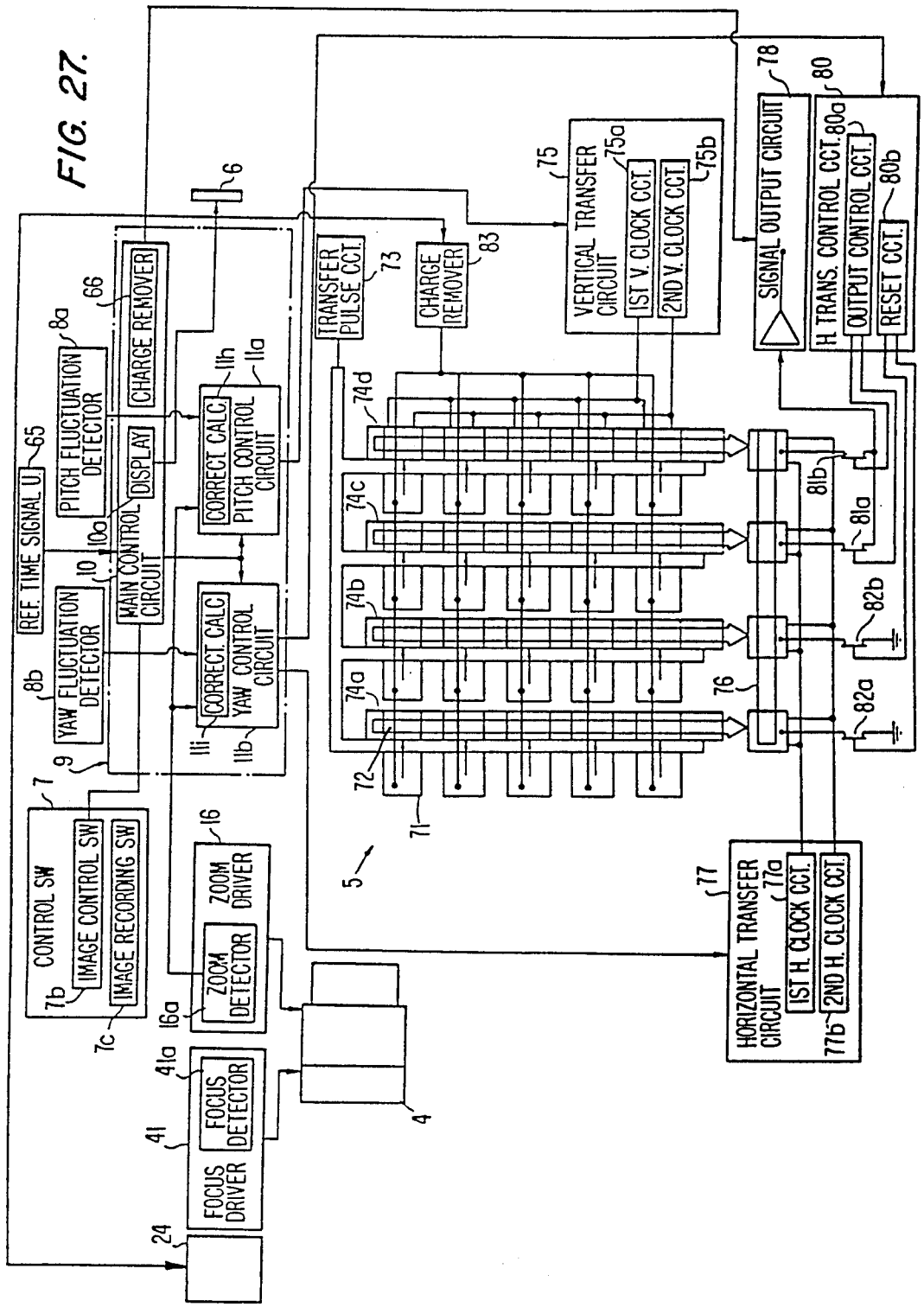
FIG. 27 is a block diagram of a camera apparatus according to an eighty embodiment.

In the seventh embodiment, the control range in the horizontal or yaw direction cannot be increased unless the time base is controlled or all pieces of pixel information are horizontally transferred at one time. Although the embodiment has been described in which the time-base control circuit 78a is added, the addition of the time-base control circuit 78a results in a cost increase due to an increase in the device size, an increased number of parts used, and adversely affects images because of control of the time base. According to the eighth embodiment, as shown in FIG. 27, a horizontal transfer-control circuit 80 is added to the arrangement of the seventh embodiment and includes a transfer-output-unit control circuit 80a for controlling output control switches 81a, 81b which control transfer output units of the horizontal transfer unit 76 dependent on the yaw-fluctuation information from the yaw control circuit 11b, this being a major difference from the seventh embodiment. Since the output units are changed by the output control switches 81a, 81b, and unwanted transfer unit sections are skipped, it is not necessary to increase the horizontal transfer speed dependent on the fluctuation. This can widen the yaw or horizontal control range equal to or greater than the pitch control range irrespectively of the limitation on the transfer speed.

By adding a reset circuit 80b, only unwanted pixel information can be selectively drained to ground by reset switches 82a, 82b dependent on the yaw control signal from the yaw control circuit 11b to thereby prevent the images from being degraded due to residual charges in the horizontal transfer unit 76. By providing an unwanted-charge remover circuit 66 in the main control circuit 10, providing a charge remover terminal for each light-detecting pixel 71, and resetting photoelectrically converted information in each light-detecting pixel 71 with a charge remover circuit 83, any residual or after image can be eliminated. For removing fluctuation-dependent residual charges during the vertical blanking period or in each 1/60 second, where the fluctuation is large, the image fluctuates 20% for example, at 5 Hz. Assuming that there are 600 horizontal pixels, 10 pixels of optical information pass through light-detecting pixels 71 in one field, with the result that information indicative of mixed pixels is stored. Therefore, images are deteriorated even if they are corrected at the time of reading out pixel information. In this embodiment, since the 10 pixels can be detected by the fluctuation detectors 8a, 8b, charges are removed in the period of a field by the unwanted-charge remover circuit 66 in the main control circuit 10 dependent on the magnitude of the fluctuation. By controlling the charge remover circuit 83 for a 1/10 exposure time, the information of a desired one of the passing 10 pixels is picked up by the light-detecting pixels 71. When the fluctuation is small, the above system does not operate. As the fluctuation is greater, the frequency or time of removal by the charge remover circuit is increased to reduce any influence by the after image, thus preventing image degradation. This system is based on the same principle as that in which a shutter speed in a still camera is increased. Therefore, while after images are reduced, the sensitivity is lowered. To eliminate the shortcoming, the unwanted-charge remover circuit 66 can drive a diaphragm driver to increase the amount of light received, or increase the amplification degree of the signal output circuit when the fluctuation rapidly increases, thereby preventing any reduction in the brightness of the images.

Figure 28B:
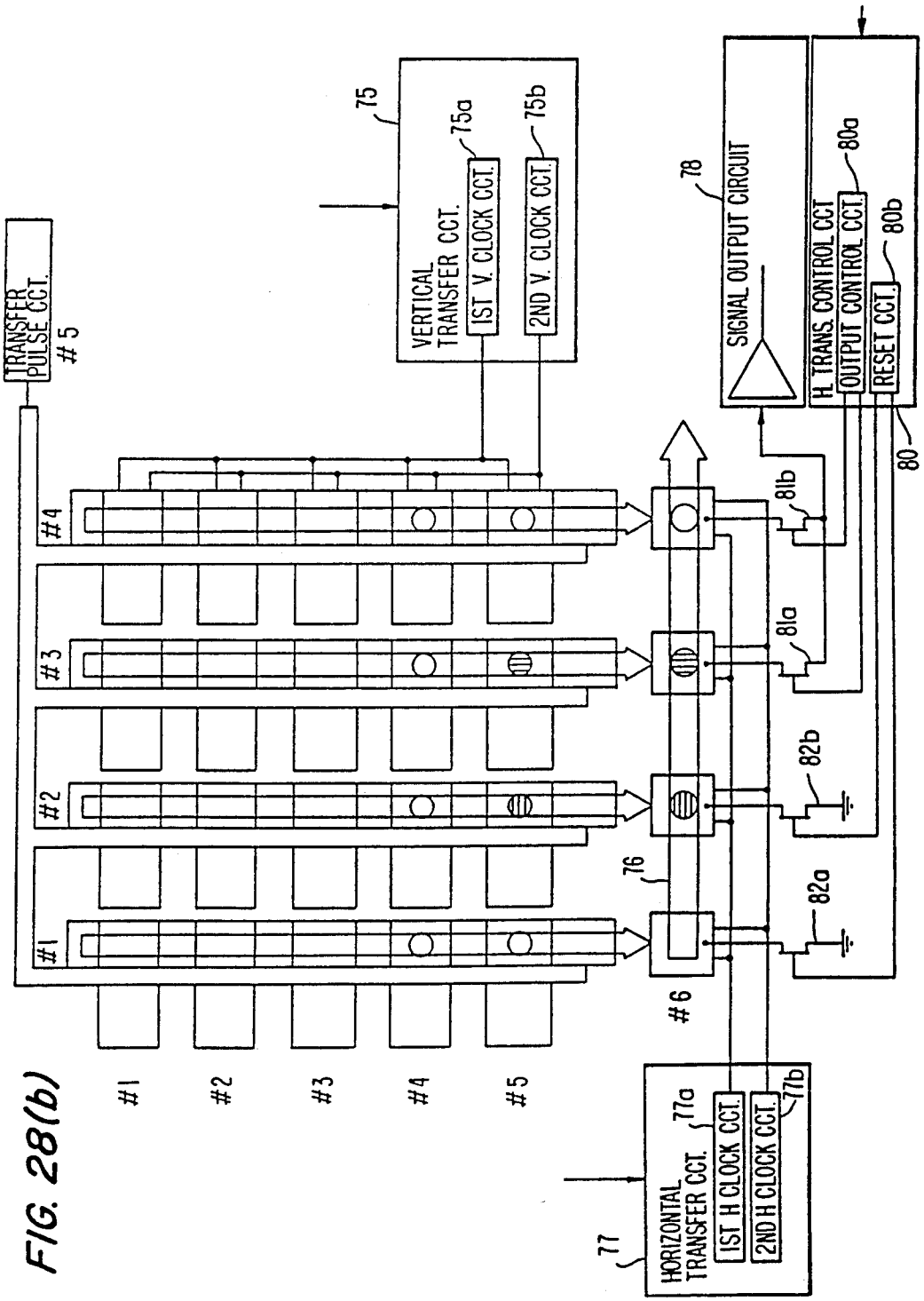
Figure 28C:
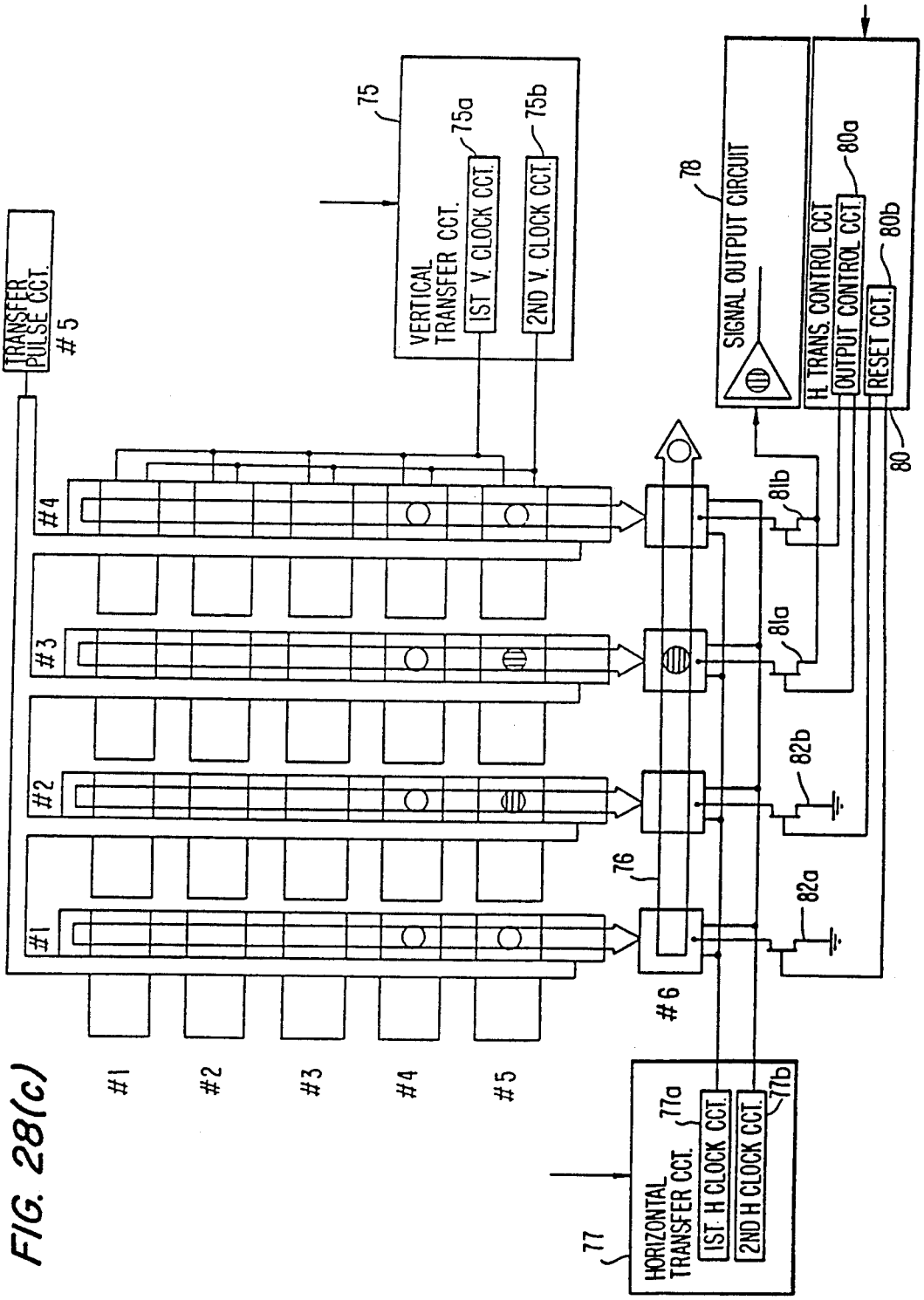

FIGS. 28(a) through (d) illustrate operation of the horizontal register control circuit 80. In FIGS. 28(a) through (d), image information desired to be obtained after correction is indicated by a black circle as with FIG. 26(a) according to the seventh embodiment. FIG. 28(b) shows the condition in which the information has been transferred for correction in the vertical or pitch direction. After charges for required pixels have been transferred to the horizontal transfer unit 76, the output control switch 81a is turned on to issue the desired pixel information, the coordinates (3, 6) to the signal output circuit 78 as shown in FIG. 28(c). If control is effected for high-speed transfer in each transfer unit section as in the seventh embodiment, the control range in the horizontal direction is restricted by the limitation on the transfer speed. Since the output ports of the horizontal transfer unit are variable in this embodiment to skip certain horizontal transfer unit sections, the horizontal control range can be widened irrespectively of the limit on the transfer speed.

Figure 28D:
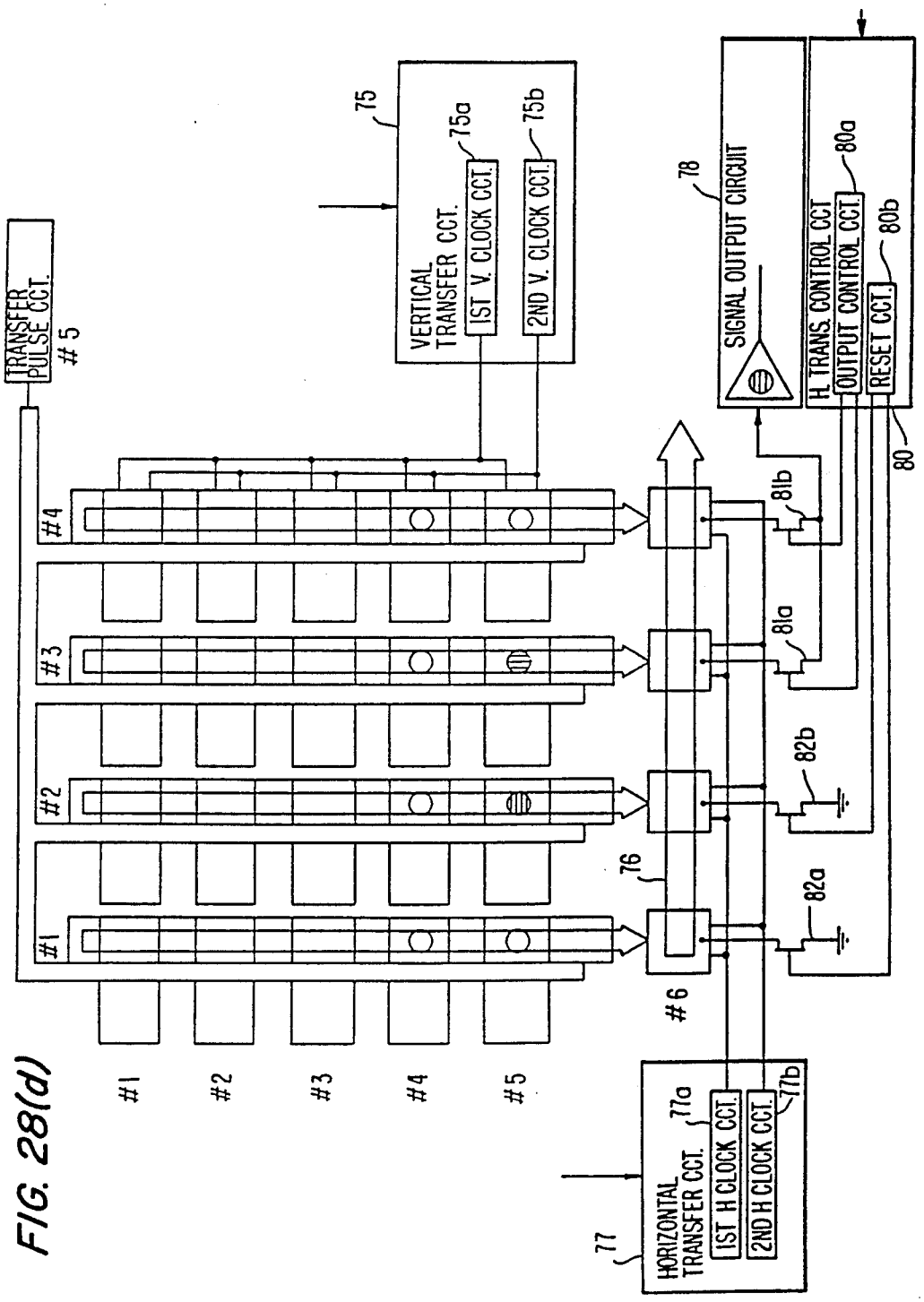

Although not necessarily required, the reset switch 82a may be turned on the reset circuit 80b to remove unwanted pixel information from the horizontal transfer unit as indicated by the coordinates (1, 6) in FIG. 28(b) and the coordinates (1, 6), (2, 6) in FIG. 28(c). At the time the readout of necessary pixel information has been completed, no charge remains on the horizontal transfer unit 76 as illustrated in FIG. 28(d), so that a vertical transfer of pixel information on a next scanning line is possible.

With the eighth embodiment, as described above, horizontal transfer unit sections are skipped to allow a wide control range in the horizontal or yaw direction to be provided in the image pickup unit itself without increasing the horizontal transfer speed. Therefore, there can be achieved an image pickup device which is small in size, low in cost, and has a wide control range in the horizontal and vertical directions.

Embodiment 9

In the eighth embodiment, the light-detecting pixels 71 have charge discharging means having a discharging time which is increased as the speed of change of fluctuations is increased. Stated otherwise, the charge storage time upon photoelectric conversion by the light-detecting pixels 71 is shortened, that is, the exposure time is reduced. This is based on the same principle as that in which the shutter speed of a still camera is increased when there is a large fluctuation to which the still camera is subjected. Although a clear image can be produced with such a system, the sensitivity is lowered as the exposure time is shortened. This will not present any trouble when taking images outdoors in daylight, but will cause a problem when taking images indoors during night. To put it in a different way, the charge-transfer imager panel transfers charges in wells by moving the charge wells in a substrate through varying the voltage applied to electrodes disposed on the wells. This charge-transfer system is normally explained to ordinary people by referring to buckets for successively transferring charges. For an easier understanding of the principle, this manner of explanation will be utilized. In conventional CCD imagers, the positions of the buckets are not moved during an exposure time, and charges generated upon photoelectric conversion are stored in the fixed buckets during one frame or one field. In the interline system, the stored charges in the buckets or the light-detecting pixels 71 are all transferred to the adjacent adjacent buckets or the transfer pixels 72. In the frame transfer system, the buckets for all pixels for one frame are transferred at once to another frame storage unit. According to the seventh and eighth embodiments, the pixel information in the buckets of the light-detecting pixels 71 are fixed during one field or one frame.

In the foregoing systems of the invention, where the fluctuation is 1/30 or 1/60 second of the scanning time for one frame or one field, which is a normal exposure time, the exposure time is varied dependent on the fluctuation speed. That is, if the fluctuation is fast, then unwanted charges stored in the buckets of the light-detecting pixels are discarded, and the discarded charges result in a reduction of the sensitivity. According to the system of the ninth embodiment, the sensitivity reduction is prevented by transferring charges of pixel information stored in the buckets of the light-detecting pixels 71 on a real-time basis dependent on the fluctuation during the scanning time of one field or one frame, upwardly or downwardly in the vertical direction and rightward or leftward in the horizontal direction, that is, by transferring charges in four directions, rather than in one direction in the conventional image pickup unit as if through a bucket relay, under the control of a control circuit. The bucket charges are moved on a real-time basis in a correcting direction during the period of one field or one frame in following relation to the movement of the focused image as it fluctuates on the focusing surface of the image pickup unit 5. Therefore, since the charges follow the movement of the optical image regardless of how fast the latter moves provided the speed of movement of the optical image is in the range of charge transfer speeds, the charges of pixel information generated upon photoelectric conversion in one field or one frame are not discarded, but stored efficiently during one frame or one field. Any reduction in the sensitivity resulting from fluctuation correction can thus be prevented.

FIGS. 29(a) through (g) shows in block form the image pickup unit 5, the vertical and horizontal transfer circuits, the pitch and yaw control circuits 11a, 11b, and others. Since the image control circuit and the like are of the same construction as those shown in FIG. 25, they are omitted from the illustration on FIGS. 23(a)

through (g). The image pickup unit 5 is composed of a CCD image pickup device similar to the frame transfer type. As illustrated in FIGS. 29(a) through (g), an upper half of the image pickup unit 5 comprises a light-detecting section 90 composed of a matrix of the light-detecting pixels 71. Where a final output pixel matrix is composed of 500×500 pixels, there are actually 1000×1000 pixels at least. However, for the sake of clarity, a matrix of six horizontal rows of pixels and seven vertical columns of pixels is illustrated. The light-detecting section 90 is connected to a light-detecting-section vertical and horizontal transfer circuit 91 for vertically and horizontally transferring pixels in four directions. The transfer circuit 91 is connected to the pitch control circuit 11a and the yaw control circuit 11b, as described in the previous embodiment, which have corrective-interval calculating of FIGS. 29(a) through (g) also has the image pickup control circuit 9, the control switch 7, the zoom detector 16a and the like as shown in FIG. 25 according to the seventh embodiment, the construction and operation of these elements are the same as those according to the previous embodiment and will not be described.

Figure 29A:
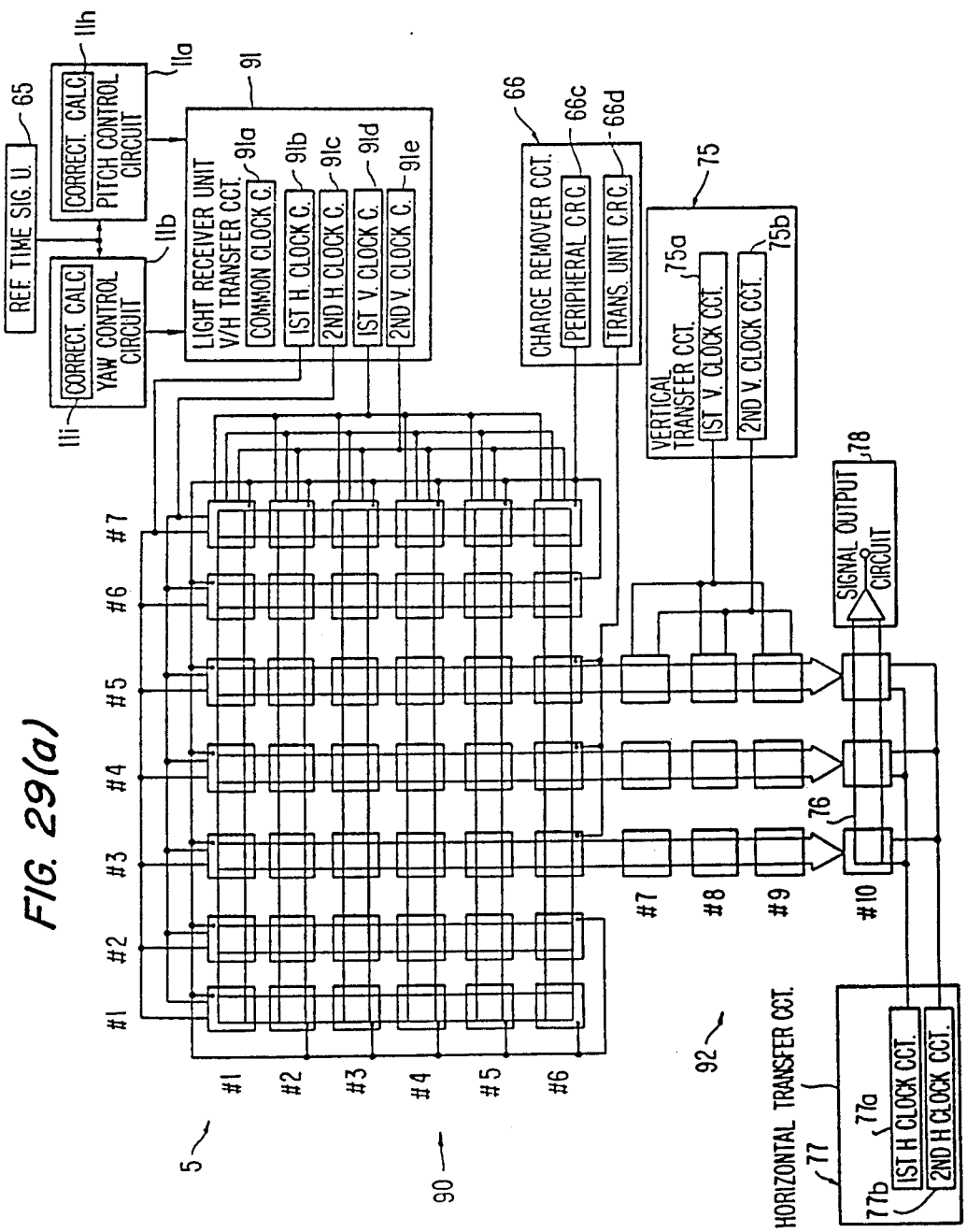
FIG. 29(a) is a block diagram of a camera apparatus according to a ninth embodiment.
Figure 29B:
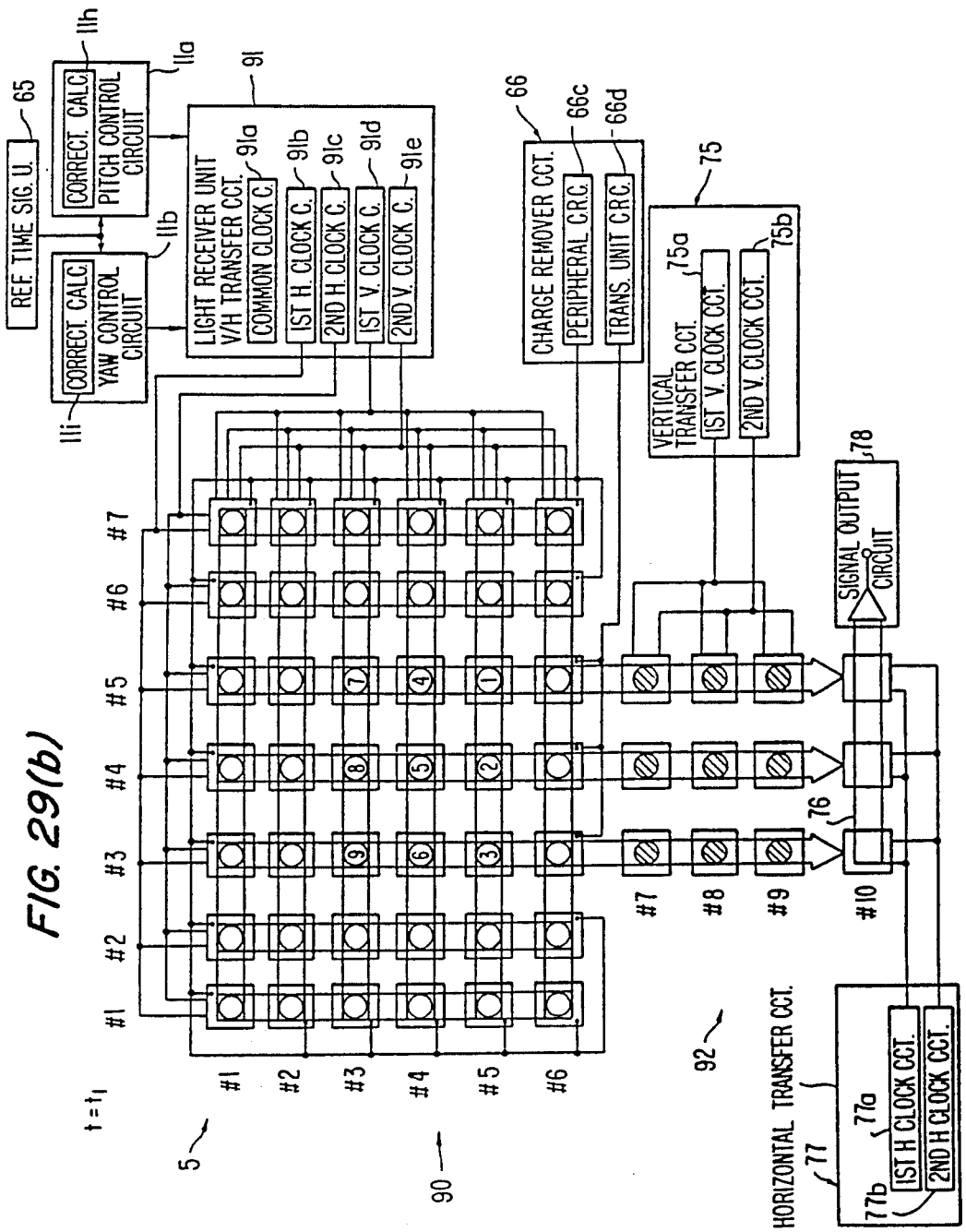

The image pickup unit 5 includes a storage section 92 in a lower half portion. Pixel information required for correction out of pixel information from the light-detecting section 90 is transferred vertically downwardly at once in a short time from the horizontal and vertical transfer circuit 91 and the vertical transfer circuit 75 during the vertical blanking period, and such transferred pixel information is stored in the storage section 92 for one frame or one field. In the illustrated embodiment, the storage section 92 is composed of a matrix of three horizontal rows of pixels and three vertical columns of pixels. FIG. 29(b) illustrates the condition in which the pixel information has been transferred for one frame or one field at $t=t_1$, the hatched circle indicating stored pixel information.

Upon completion of an information transfer, the charges from the light-detecting section 90 are prevented by the transfer-unit charge remover circuit 66d from being mixed into the storage section 92. Until the readout for four fields or one frame is completed, the transfer of pixel information within the storage section 92 is effected by the vertical transfer circuit 75 and the horizontal transfer circuit 77, and the transferred information is issued by the output circuit 78 as a video signal which is demodulated into a color signal.

At $t=t_2$, the pixel information is transferred by the vertical transfer circuit 75 vertically downwardly to the horizontal transfer circuit 76, after which the pixel information is transferred to the right by the horizontal transfer circuit 77 whereupon the output circuit 78 starts issuing the video signal.

Figure 29D:
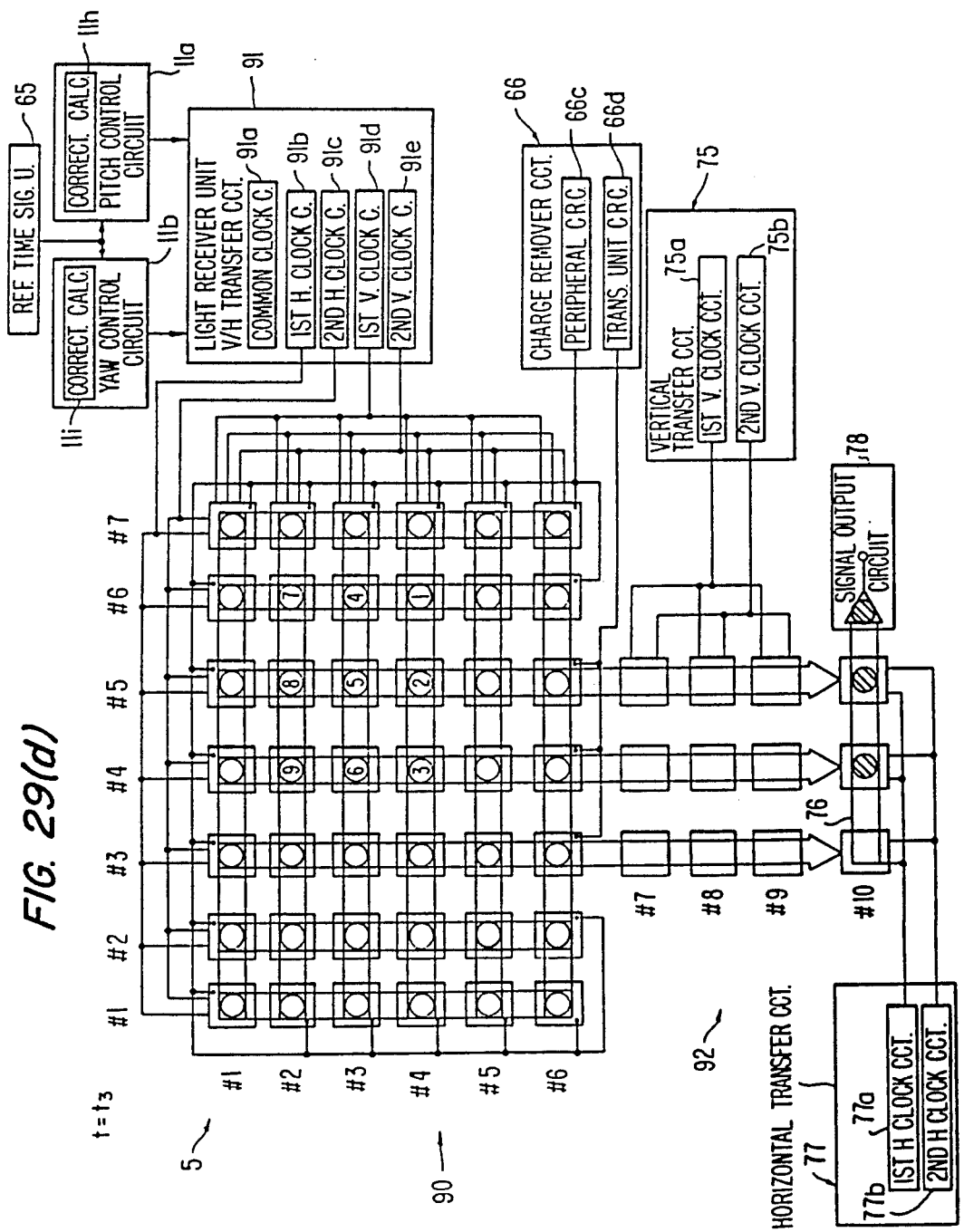
Figure 29G:
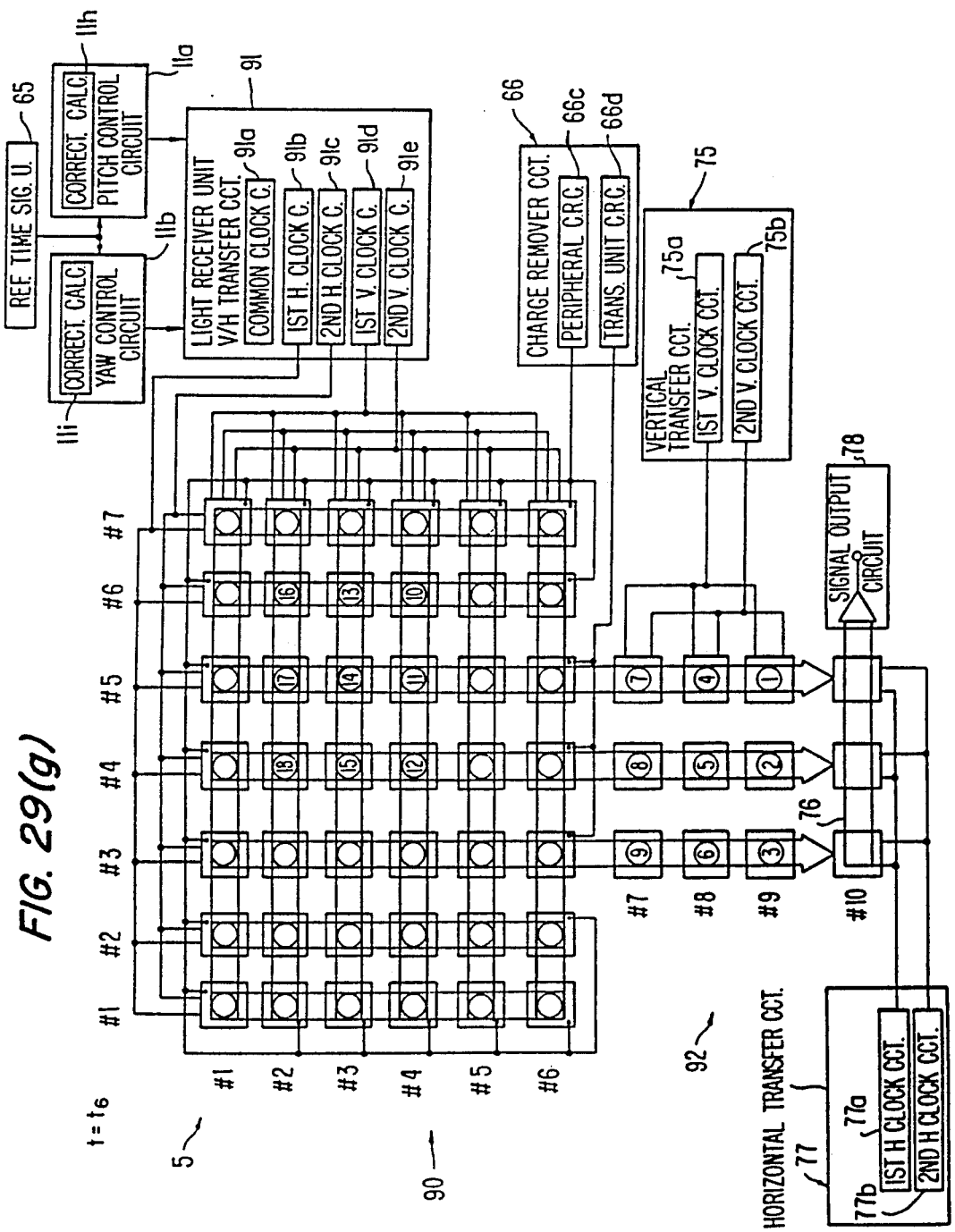

At $t=t_3$, the final scanning line is scanned as shown in FIG. 29(d), and at $t=t_4$, the readout of all pixel information is completed as shown in FIG. 29(e), whereupon the operation enters a vertical blanking period. Thereafter, the charge remover circuit 66d is disabled to allow the charges to be transferred from the light-detecting section 90 to the storage section 92. At $t=t_5$, the pixel information from the light-detecting section 90 is transferred vertically downwardly by the vertical transfer circuit 91 and the vertical transfer circuit 75 as illustrated in FIG. 29(f). At $t=t_6$, the necessary pixel information (designated by the circles numbered 1 through 9) out of the pixel information from the light-detecting section 90 is completely transferred to the storage section 92 as illustrated in FIG. 29(g). Then, the charge remover circuit 66d is enabled to remove charges from the cells at the coordinates (3, 6), (4, 6), (5, 6) to prevent the charges from flowing from the light-detecting section 90 into the storage section 92. The operation now returns to the initial condition at $t=t_1$ in the field or frame scanning cycle as shown in FIG. 29(b). Subsequently, the light-detecting section 90 and the storage section 92 transfer charges independently until a next vertical blanking period. With the arrangement of the ninth embodiment, therefore, the vertical transfer circuit 75 and the horizontal transfer circuit 77 in the storage section 92 have no ability to control fluctuating image correction by themselves. The control of fluctuating image correction is instead carried out by the vertical and horizontal transfer circuit 91 during the period of light detection in one field or one frame.

The image correction control in the light-detection section 90 will be described.

When pitch and yaw fluctuations are detected by the fluctuation detectors 8a, 8b, electric signals corresponding to optimum fluctuation correcting control intervals on the focusing surface of the image pickup unit 5 are delivered from the pitch and yaw control circuits 11a, 11b, to the vertical and horizontal transfer circuit 91.

The ninth embodiment is quite different from the seventh and eighth embodiments in that according to the seventh and eighth embodiments, no charge of pixel information is transferred for image correction in the vertical and horizontal directions during one-field or one-frame scanning period, but images are corrected by transferring charges for correcting pitch and yaw fluctuations primarily during the vertical blanking period. According to the ninth embodiment, potential wells in the CCD substrate are transferred on a real-time basis in four directions, i.e., vertically upward and downward directions and horizontal rightward and leftward directions, in response to pitch and yaw fluctuation detecting signals dependent on pitch and yaw fluctuations, as shown in FIGS. 31(a) through (e) (described later), during the period in which pixel information for one field or one frame is received. As illustrated in FIG. 29(b), there are seven vertical columns of light-detecting pixels 71 and six horizontal rows of light-detecting pixels 71 in the light-detecting section 90. At $t=t_1$, pixel information indicated by 7×6=42 circles is generated, and desired pixel information of the object is focused in a rectangular area indicated by the dotted line and containing 9 pixels marked with circles numbered 1 through 9. Photoelectric conversion is effected in the light-detecting pixels 71 numbered 1 through 9, and charges commensurate with the pixels of object information are stored in the potential wells in those pixels during the exposure time as shown in FIG. 31(b) described later).

It is assumed that during the period before one-field or one-frame time is completed, a fluctuation in the yaw direction is generated until $t=t_2$ is reached, and a focused optical image of the object is moved to an area indicated by the dotted line having the horizontal coordinates (4 through 6) and the vertical coordinates (3 through 5) as shown in FIG. 29(c). If no control were effected, then information from a plurality of pixels having passed during a light-detecting period would be mixed with one pixel, resulting in a blurred image. According to the present invention, the horizontal corrective interval for the yaw fluctuation is issued from the yaw control circuit 11b, and the vertical and horizontal transfer circuit 91 is responsive to this information on the horizontal corrective interval for transferring charges in the respective pixels horizontally by the corrective interval. As a consequence, the charges numbered 1 through 9 which have been in the horizontal coordinates (3 through 5) and the vertical coordinates (3 through 5) at $t=t_1$ as shown in FIG. 29(b), are horizontally transferred, rather than being discarded, whereupon as shown in FIG. 29(c) the charges follow the movement of the object and are shifted successively through the adjacent cells. Therefore, when the camera body is subjected to a large yaw fluctuation, it is not necessary to interrupt storage of photoelectrically converged charges dependent on light from the object provided such a fluctuation is within the range of transfer speed. On the condition that the transfer speed per pixel is 100 ns, one side of a finally generated image is composed of 500 pixels, and the amplitude of a fluctuation is 100% of an image of a worst value, since $10^7$ pixels can be transferred in one second, they can follow a yaw fluctuation at a high speed of 2000 Hz at the amplitude of 100% of the image. Consequently, the frequency characteristics of fluctuation control are highly improved as compared with the conventional arrangement without involving any sensitivity reduction. Since the frequency characteristics in the pitch direction are also improved, the frequency characteristics in both the pitch and yaw directions can be improved to a high degree, and the system is only limited by the frequency characteristics of the fluctuation detecting means. Fluctuation correction in an oblique direction can be effected at a high speed by a combination of horizontal correction and vertical correction. The high-speed response allows the system for effecting control with the fluctuation detecting means to be employed in various applications other than home-use video cameras.

For example, in electronic cameras which are now being standardized, image blurs or fluctuations due to camera body fluctuations are a problem because of one-field scanning time or a shutter speed of 1/60 second. It would be possible to shorten the exposure time using the process as described in the previous embodiment, but the problem of a reduced sensitivity would take place. With the image pickup unit employed according to the last-mentioned embodiment, a camera fluctuation at the time of taking a picture of a stationary object is equivalent to a shutter speed of $10^7$ sec. at maximum. Therefore, there is provided an electronic camera which is entirely free from substantial camera fluctuations.

Where one-field exposure system is employed, the shutter speed for a moving object is 1/60 second. To keep the moving object at rest, it is necessary to shorten the exposure time or provide means for detecting a moving object. However, most of camera fluctuations are induced by hand fluctuations, and image blurs in still cameras are caused by more hand fluctuations than object movements. When a telephone lens is used and the camera is held by hand, almost all image blurs are caused by camera body fluctuations. Therefore, such fluctuations can be suppressed by the system for detecting camera body fluctuations. The image pickup unit and the image pickup device of the invention have high-speed fluctuation suppressing characteristics capable of achieving an electronic camera which can be held by hand for imaging a stationary object with a super-telephoto lens. The system of the invention is also applicable to video cameras for use in broadcasting stations, other than home-use hand-held video cameras. For example, when a professional video camera placed on a rugged tripod sweeps at a fast speed, each image taken thereby is blurred or trails in a slow-motion playback mode as is frequently experienced when watching a baseball night game on TV. This problem can be solved by using the image pickup unit which can correct a background scene such as a baseball ground or other stationary objects to display them clearly without blurs while failing to improve the image of a moving object such as a ball. Therefore, each image of a stationary object taken by a broadcasting-station video camera as it is panned quickly can be corrected without involving a reduction in sensitivity, and hence images played back in a slow-motion mode or still images are prevented from being blurred or trailing. The image pickup unit of the invention as it is employed in an electronic camera or a video camera in a broadcasting station is effective in taking images of stationary images such an outdoor scene, a background, a building, or the like.

In combination with high-speed image recognition means, a moving object can be followed without mechanically moving a camera body or an optical system. If the image recognition means is available more cheaply in the future, then the image of a moving object can be corrected at high speed.

The principles of operation of the invention will further be described. By providing a photoelectric transducer function through transparent electrodes for the transfer cells between the light-detecting cells in the pixels, the storage of charges produced by photoelectric conversion during one field or one frame is not interrupted at all and the charges are successively shifted to the adjacent cells, so that any reduction in the sensitivity due to fluctuation control can be made smaller.

As the charges are transferred as shown in FIGS. 29(b) to 29(c), the charges in the horizontal coordinates 6 and the vertical coordinates 1 through 6 in FIG. 29(b) join those in the horizontal coordinates 7 and the vertical coordinates 1 through 6 in FIG. 29(c), with the result that the image quality is degraded at times by blooming due to an overflow. To avoid this problem, charges in the surrounding pixels are discharged by the charge remover circuit 66 through charge removing terminals as the charges are transferred. This prevents an overflow of charges from the surrounding pixels as they are transferred, so that the image quality is prevented from being lowered. Instead of providing the charge remover circuit 66, the surrounding cells may have dischargers for discharging the charges at all times. However, charges are prevented from being transferred to or removed from the three pixels at (3, 6), (4, 6), (5, 6) by the charge remover circuit 66d so that no charge will flow from the light-detecting section 90 into the storage section 92 while light is being received. The above three pixels are therefore effective in preventing output images from being deteriorated due to charge leakage.

Fluctuations in the pitch direction will be described. When the camera body fluctuates in the pitch direction from $t=t_2$ to $t=t_3$ during the scanning time in one frame or one field so that the optical image of the object is moved vertically upwardly to the area indicated by the dotted line in FIG. 29(d), information on an optimum corrective interval is given by the pitch control circuit 11a to the vertical and horizontal transfer circuit 91 in the same manner as the corrective control in the yaw direction. The pixel information photoelectrically converted from the object and indicated by the circles numbered 1 through 9 is transferred by the vertical and horizontal transfer circuit 91 to the corresponding portion of the object image as shown in FIG. 29(d). The information of each pixel of the object image continues to be photoelectrically converted without interruption during one field or one frame. The vertical and horizontal control is repeated, and at $t=t_4$ when the scanning in one field or one frame is completed, the pixel information indicated by the circles 1 through 9 is horizontally transferred at high speed to the horizontal coordinates 3 through 5 by the vertical and horizontal transfer circuit 91, as shown in FIG. 29(e), irrespectively of the fluctuation of the focused object image indicated by the dotted-line rectangle. Thereafter, the pixels at the coordinates (3, 6), (4, 6), (5, 6) which have prevented the charges from being transferred with the charge remover circuit 66d are now opened to allow the pixel information to be transferred from the light-detecting section 90 to the storage section 92. The vertical and horizontal transfer circuit 91 and the vertical transfer circuit 75 then transfer the pixel information denoted by the circles 1 through 9 vertically downwardly. At $t=t_5$, as shown in FIG. 29(f), the pixel information of the object is transferred from the light detecting section 90 to the storage section 92. At $t=t_6$, as shown in FIG. 29(g), all pixel information of the object is completely transferred to the storage section 92 during the vertical blanking period. Inasmuch as the charges are prevented by the charge remover circuit 66d from being mixed from the light-detecting section 90 into the storage section 92, the charges in the light-detecting section 90 and the storage section 92 are independently transferred. The pixel information (indicated by the circles 1 through 9) in a previous field or frame in the storage section 92 is read by a charge transfer in the vertical and horizontal direction as at $t=t_1$ in FIG. 29(b), and the output circuit 78 produces an image signal. In the light-detecting section, the object image is focused in the area indicated by the dotted-line rectangle as shown in FIG. 29(g), and charges corresponding to the quantities of light in the pixels corresponding to the object start being stored in the light-detecting pixels (indicated by the circles 11 through 18). Dependent on the camera body fluctuation, as described above, the stored charges are transferred under the control of the vertical and horizontal transfer circuit 91 so as to correct the image fluctuation.

Figure 30A:
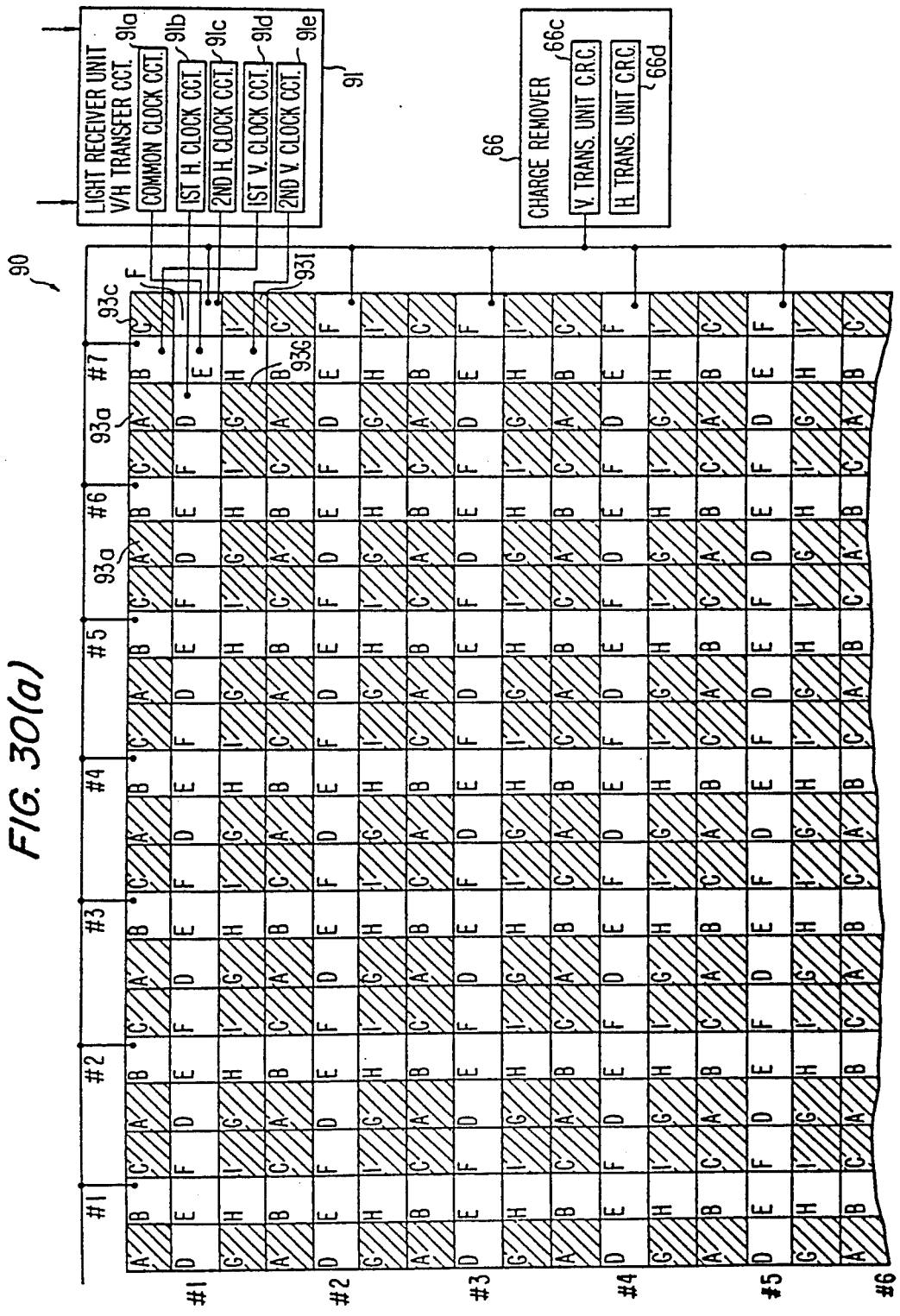
FIG. 30(a) is an enlarged diagram of the image pickup element.

The principles of operation of the vertical and horizontal transfer circuit 91 will be described in greater detail with reference to enlarged diagrams of cells. FIG. 30(a) shows on an enlarged scale a matrix of seven vertical columns of pixels and six horizontal rows of pixels, each pixel being of a symmetrical construction. As indicated at the coordinates (7, 1), each pixel is composed of 9 cells A, B, C, D, E, F, G, H, I. The hatched cells A, C, G, I constitute charge-transfer inhibit areas 93 having channel stoppers formed by diffusing P-type or N-type impurities. The cell E comprises a light-detecting pixel 71. As shown in the horizontal cross section of FIG. 31(a), the cell E is composed of an electrode 96e mounted on a P-type or N-type semiconductor substrate 94 with a thin insulating film 95 as of SiO₂ interposed therebetween, the electrode 96e being connected to a common clock circuit 91a. As illustrated in FIG. 31(a), the cells D, F serve for horizontally transferring charges, and have horizontal transfer electrodes 96d, 96f connected respectively to first and second horizontal clock circuits 91b, 91c. FIGS. 31(b) through (e) (described later) illustrate the conditions of charge cells at interfacial potentials. In FIG. 31(b), charges produced by a focused object image are being stored by photoelectric conversion in the wells of the cells E in the light-detecting section as indicated by the circles. With the P-type substrate, electrons which are a minority carrier are stored by photoelectric conversion. The cells B, H are cells for vertically transferring charges. As shown in the vertical cross section of FIG. 32(a), these cells B, H comprise electrodes 96b, 96h mounted on the substrate 94 with the insulating film 95 interposed therebetween. Charges photoelectrically converted from the optical object image are stored in the wells as illustrated in FIG. 32(b).

Figure 30B:
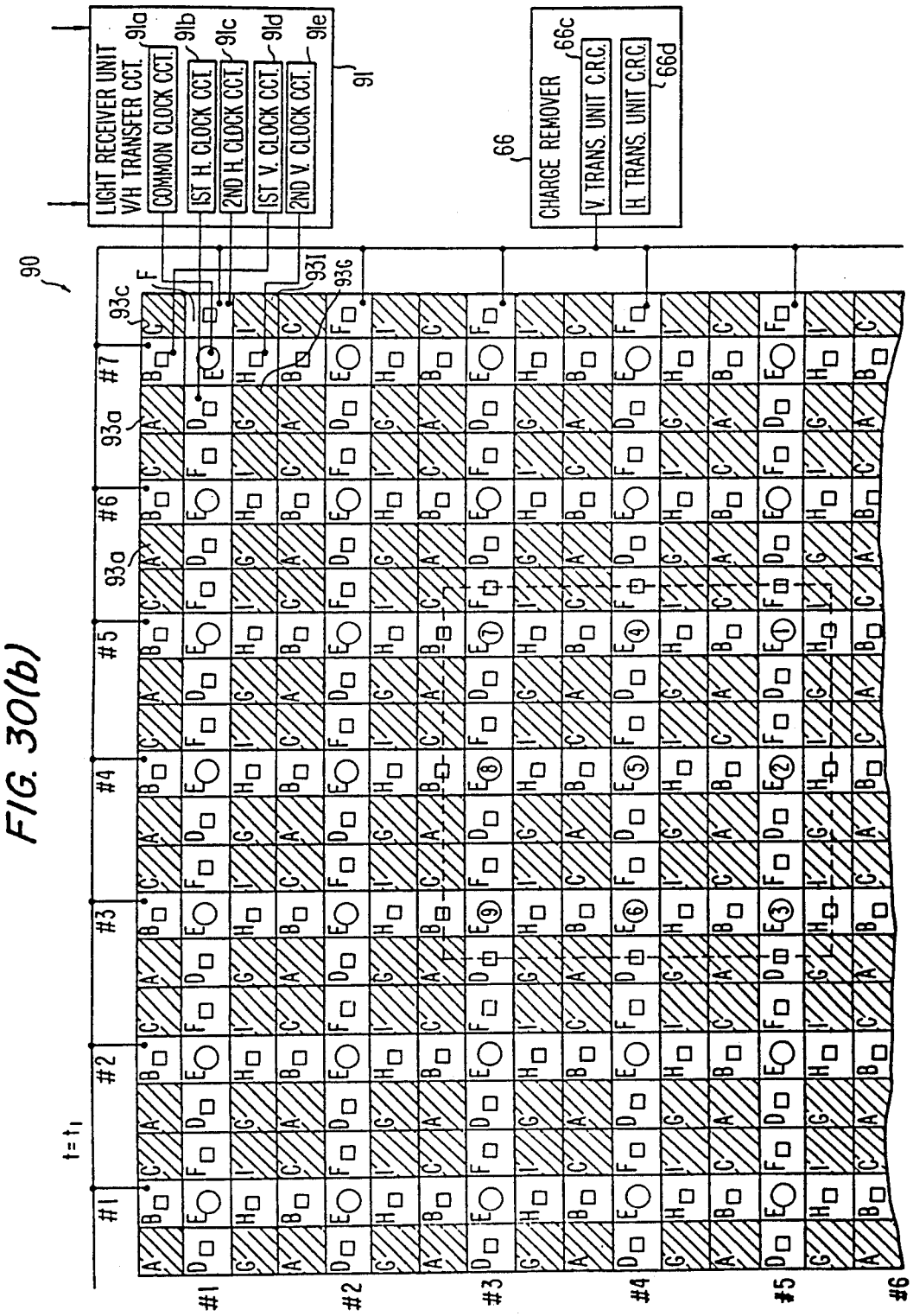
FIGS. 30(b) through (f) are enlarged diagrams showing the principle of charge-transfer operation.

Charge transfer operation in the four vertical and horizontal directions will be described specifically. FIG. 30(b) is illustrated on an enlarged scale of the condition at $t=t_1$ in FIG. 29(b). The dotted-line rectangular area enclosed by the horizontal coordinates 3 through 5 and the vertical coordinates 3 through 5 is indicative of the range in which the object including the background is focused. The information on each pixel of the object is photoelectrically converted by the light-detecting pixel into charges corresponding to the pixels indicated by the circles 1 through 9. FIG. 31(a) shows the image pickup panel in cross section, and FIG. 31(b) shows a potential condition at that time. As described above, electrons are transferred charges in the P-type substrate, and the potential wells are made shallow when a negative or low voltage is applied to the electrodes 96. In FIG. 31(b), the electrodes 96f, 96d are at a low potential, and the electrodes 96e are at a high potential, with the pixel information stored in the cell E and the adjacent cell E as indicated by the circles 4, 5. The conditions of FIG. 31(b) is shown in plan in FIG. 30(b). When the electrodes are at a low potential, the charges are prevented from being transferred. For an easier understanding, the low-potential electrodes are indicated by the symbol of a square. The cells indicated by the squares in FIGS. 30(b) through (f) represent that they prevent charges from being transferred. The pixel information indicated by 1 through 9 in FIG. 30(b) is surrounded by the cells with the low potential electrodes indicated by the squares. FIG. 31(a) shows in horizontal cross section the substrate of the image pickup unit 5 at the pixel marked with the circle 4 at the coordinates (5, 4). FIG. 31(b) shows the potential condition thereof in which charges in each pixel are confined in the wall and cannot be moved horizontally. FIG. 32(a) shows in vertical cross section the substrate of the same pixel, and FIG. 32(b) shows the potential condition thereof in which charges in each pixel are confined in the well and cannot be moved vertically.

From the above description, it is clear that the charges in each pixel at $t=t_1$ are fixed horizontally and vertically.

Figure 30C:
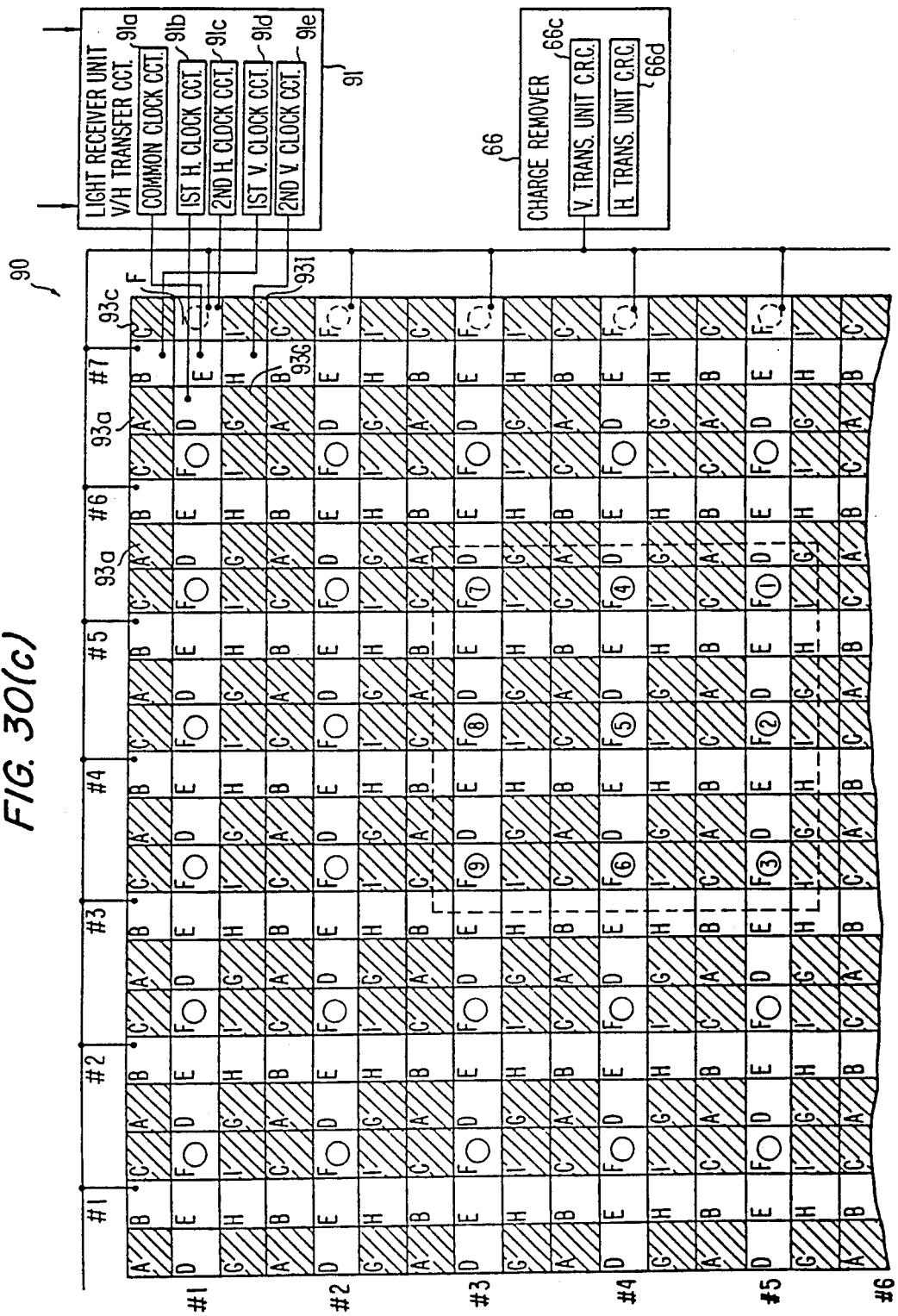
Figure 30D:
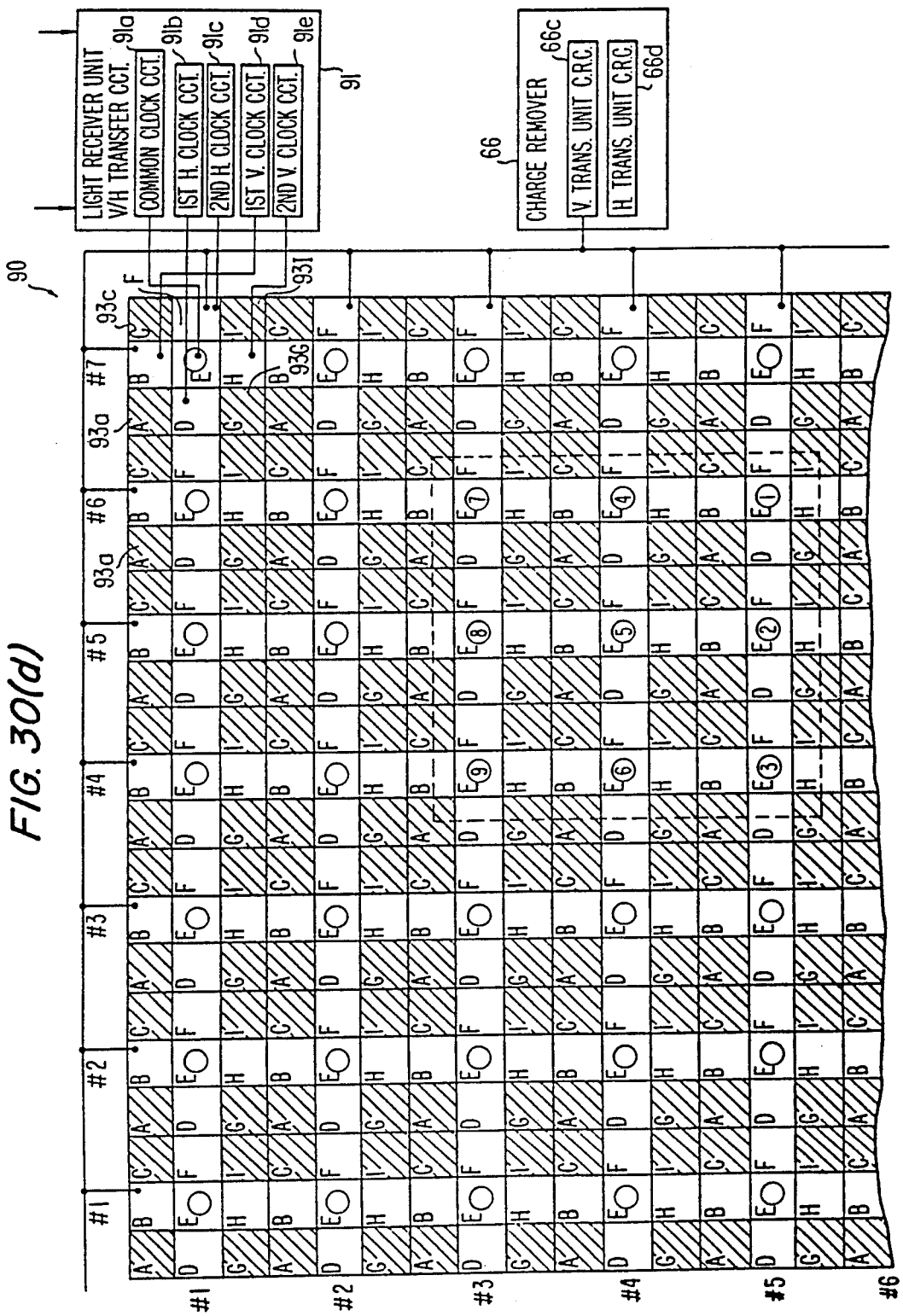
Figure 30E:
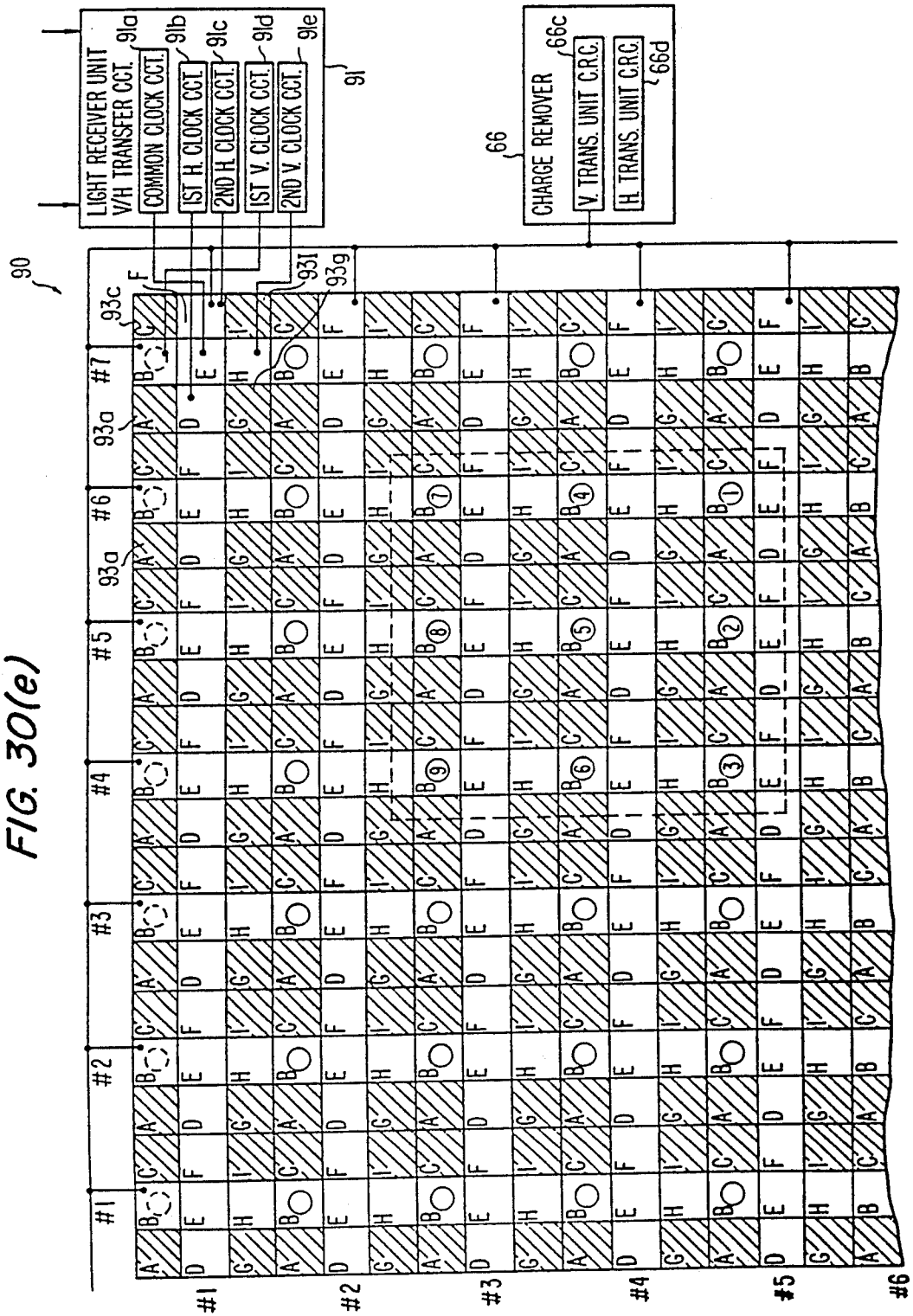
Figure 30F:
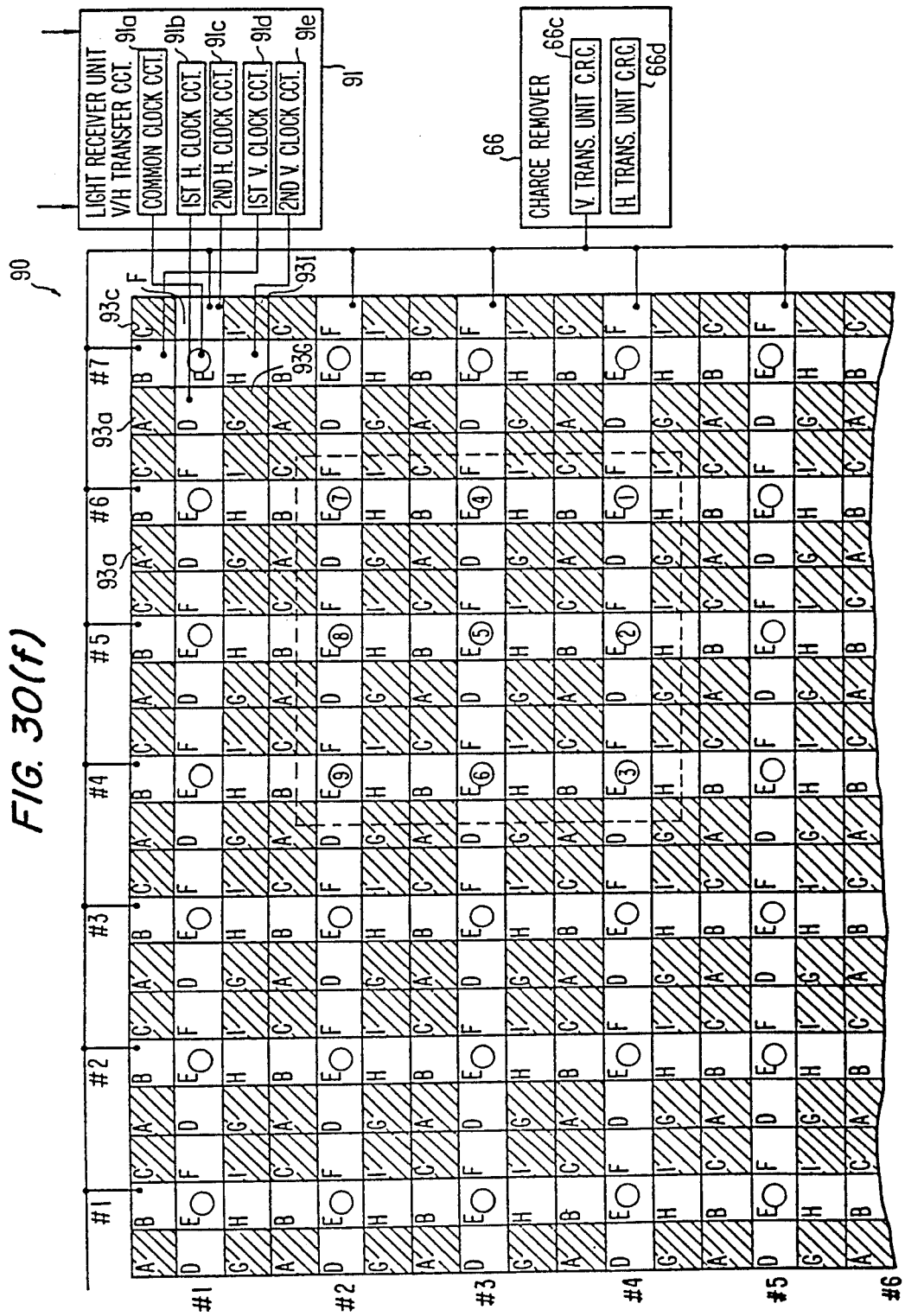

Then, the image of an object being imaged is moved to the right as shown in FIG. 29(c) until $t=t_2$ is reached, based on a fluctuation in the yaw direction of the camera body, such a movement is detected by the yaw fluctuation detecting means 8a, 8b and the charges are transferred to the right in following the rightward movement of the image based on the information from the fluctuation detecting means 8a. The principle of operation for horizontally transferring the charges to the right by varying the voltage applied to the electrodes under the above condition will now be described. The charges are transferred one cell by one cell. From the condition at $t=t_1$ in FIG. 30(b), the charges are moved one cell in FIG. 30(c). To prevent the transferred charges from leaking while they are being transferred horizontally, the first and second vertical clock circuits 91d, 91e produce a low potential, and the first and second vertical transfer electrodes 96b, 96h are held to a low potential as shown in FIG. 32(a). The potential condition is as shown in FIG. 32(b), producing wells in the cells E between the cells D, F, and preventing transferring the charges into the cells B, H. This condition is kept while the charges are being transferred in the horizontal direction. Thus, a horizontal transfer unit composed of the successive cells D, E, F, D, E, F is formed electronically on the image pickup unit. Thereafter, as shown in FIGS. 31(b) through (e), the operating voltages of the first horizontal clock circuit 91b, the common clock circuit 91a, and the second horizontal clock circuit 91c are varied to change the potentials at the electrodes at the cells D, E, F. Since in the initial state the cells D, E, F are of low, high, and low potentials, respectively, as shown in FIG. 31(b), the charges based on the pixel information numbered 4, 5 are fixed in the wells. When the cells D, E, F are of low, high, and high potentials, respectively, the wells are spread to the right as shown in FIG. 31(c), moving the charges to the right. Then, the cells D, E, F are of low, low, and high potentials as shown in FIG. 31(d) to form wells only below the cells F, so that a horizontal transfer cycle in which the charges are transferred one cell from the cells E to the righthand adjacent cells F is completed. Subsequently, the cells D, E, F are of high, low, and high potentials as illustrated in FIG. 31(e) to enlarging the wells to the right to start a horizontal transfer cycle for transferring the charges from the cells F to the righthand adjacent cells D so that the charges will be transferred from the cells F to the righthand adjacent cells D on the same transfer principle. This condition is illustrated in FIG. 30(c) in which the charges follow the optical image of the object as indicated by the dotted-line rectangle. Therefore, the light-detecting construction composed of the light-detecting cells E, the charge transfer cells F, and the cells D, these cells being composed of light-transmissive electrodes, prevents photoelectric conversion from being interrupted while the charges are being transferred, so that any sensitivity reduction is prevented. By incorporating the image pickup unit of the above construction into a video camera, an electronic still camera or the like, there is provided an image pickup device capable of correcting image fluctuations purely electronically even when images are taken in the dark. When the charges are transferred from the cells D to the righthand adjacent cells E in a next horizontal transfer cycle, a horizontal transfer cycle for one-pixel charges is completed. The charges in the cells corresponding to the pixels of the object are horizontally transferred to the right while following the focused optical image indicated by the dotted-line rectangle in FIG. 30(d). For horizontally transferring the charges to the left, the horizontal transfer cycle for transferring the charges to the right should be reversed to transfer the charges to the left. More specifically, a cycle of transferring the charges from the cells F to the lefthand adjacent cells E will be described. The potentials are produced on a signal timing chart for making the cells D, E, F low, low, and high in potential, respectively, so that the condition of FIG. 31(d) is assumed. Then, the condition 31(c) is reached and then the condition 31(b) is assumed to complete a horizontal transfer cycle for transferring the charges from the cells F to the lefthand adjacent cells E. In this manner, the charges can be horizontally transferred to the left in the same way as that in which the charges are horizontally transferred to the right. Therefore, the image pickup unit of the invention can correct images without involving a sensitivity reduction when the camera is subjected to fluctuations in the yaw direction to the right and left. During the period of the horizontal transfer cycle, the cells B, H are of a low voltage as shown by the vertical potential diagram of FIG. 32(b) to prevent charge leakage into the cells B, H in the vertical direction. Therefore, the charges are prevented from vertically leaking while correcting images in the horizontal direction, and the sharpness of images as corrected is not lowered.

The transfer of charges in the vertical direction for correcting fluctuations in the pitch direction will be described. When the optical image of an object is moved vertically upwardly from the condition at $t=t_2$ in FIG. 29(c) to the condition at $t=t_3$ in FIG. 29(d) due to a pitch fluctuation, the charges are transferred vertically upwardly in following relation to the movement of the optical image in a vertical transfer cycle which will be described below. The basic principle of the vertical transfer cycle is the same as that of the horizontal transfer cycle. In the vertical transfer cycle, as shown in the horizontal potential diagram of FIG. 31(b), the cells D, F are kept at a low potential during the vertical transfer cycle to prevent the vertically transferred charges from leaking horizontally. This electronically forms a vertical transfer unit on the image pickup unit for transferring the charges bidirectionally in the vertical direction. FIG. 32(b) is illustrate of potentials of the cells numbered 4, 7 shown in FIG. 30(d). As shown in FIG. 32(a), the cells are given potentials through the electrodes by the first vertical clock circuit 91d, the common clock circuit 91a, and the second vertical clock circuit 91e. At this time, the cells B, E, H are of low, high, and low potentials, and the charges numbered 1, 4, 7 are fixed in the small wells in the cells E. Since the cells D, F are of low potentials, the charges are prevented from leaking in the horizontal direction. Then, the cells B, E, H are of high, high, and low potentials, respectively, as shown in FIG. 32(c), to enlarge the wells in the cells E upwardly to the adjacent cells B, whereupon the charges numbered 1, 4, 7 are moved vertically upwardly. Then, by gradually applying the low voltages to the cells E as in the horizontal transfer cycle, the charges numbered 1, 4, 7 are continuously transferred upwardly until they are completely transferred to the cells B above the original cells E as shown in FIG. 32(d), whereupon the vertical transfer cycle is completed. This condition is illustrated at an enlarged scale in FIG. 30(e). Then, a vertical transfer cycle is started from the cells B to the upwardly adjacent cells H, and finally a vertical transfer cycle for one pixel is completed as shown at an enlarged scale in FIG. 30(f). A downward vertical transfer cycle is effected by varying the timing chart of the transfer clock signal to apply voltages according to the potential diagram of FIG. 32(d), then reaching the potential condition of FIG. 31(c) and then the potential condition of FIG. 31(b). Subsequently, the charges containing the pixel information in the light-detecting section 90 are transferred to the storage section 92 and issued as an image signal primarily during the vertical blanking period, as previously described in detail.

With the image pickup unit and the control circuit of the present embodiment, the fluctuating optical image which is focused can be followed accurately at a speed much higher than the speed of movement due to the fluctuation. Therefore, an image pickup device capable of suppressing high-speed image fluctuations can be achieved without involving any sensitivity reduction. Therefore, as described in each of the above embodiments, an improved frequency response and a desired sensitivity can be maintained purely electronically.

According to the present invention, as described above, there can be provided a camera apparatus having an automatic successive image correcting capability of the invention in addition to existing automatic still image correcting capabilities such as automatic focusing, automatic white balance, and automatic iris, the camera apparatus being low in cost and operable with ease and designed particularly for users such as general beginners who could not take satisfactory successive images due to a low level of technique, known as "camera work" of taking successive images. The images taken by the camera apparatus of the invention approach those taken by professional cameramen, and are more stable and easier to see than those taken by conventional video cameras. Therefore, the present invention produces a new product concept for video cameras being produced, and is very advantageous in the industry in that new video camera users will be created. Although in the illustrated embodiments the CCD image pickup panel has been shown, it is obvious, to those skilled in the art to effect fluctuating image control by controlling horizontal and vertical shift registers composed of MOS image pickup panels employed by a certain maker dependent on yaw and pitch fluctuations.

The fluctuation detecting means has been described chiefly as comprising the vibrating gyroscope. The spinning gyroscope would produce an unwanted reactive force delayed by 90° in phase upon application of an external force, and would be too heavy for small-size and lightweight home-use video cameras. Such problems are less severe if used in video cameras for use in broadcasting stations, so that the spinning gyroscope is highly effective for use as the fluctuation detecting means in such an application. At present and in the near future, however, the vibrating gyroscope is best for use in home-use video cameras in terms of size, weight, cost, reactive force, starting time, and service life. In the future, however, new gyroscopes such as ultra-small-size laser gyroscopes using optical IC or miniaturized optical-fiber gyroscopes will be commercialized, and will be best suited as the fluctuation detecting means of the invention. At such a time as the new gyroscopes are available, they can be combined with the damping mode function of the camera apparatus of the invention and the CCD capable of transferring charges in four directions in generating new functions and advantages.

Although certain preferred embodiments have been shown and described, it should be understood that many changes and modifications may be made therein without departing from the scope of the appended claims.

What is claimed is:

1. A camera apparatus comprising:
   focusing means for optically focusing a light beam from an object;
   imaging means for converting an optical image produced by the focusing means into electric or physiochemical information and issuing or recording the information as an image;
   means for detecting a fluctuation of the camera apparatus and issuing a fluctuation detecting signal;
   means responsive to the fluctuation detecting signal for issuing an image fluctuation control signal;
   means responsive to the image fluctuation control signal for suppressing a fluctuation of the image due to the fluctuation of the apparatus;
   said imaging means comprising means for photoelectrically converting the optical image produced by said focusing means into image information, electric readout means for reading out the image information, and means for issuing an image-dependent electric signal, said electric readout means being controllable by said image fluctuation control signal issuing means dependent on information from said detecting means.

2. The camera apparatus according to claim 1, wherein said electric readout means is controllable by said image fluctuation control signal issuing means dependent on zoom ration of said focusing means.

3. The camera apparatus according to claim 1, wherein said electric readout means is controllable by said image fluctuation control signal issuing means dependent on an angle of the fluctuation of the apparatus so that the image on an optical focusing surface in said imaging means will be equivalently moved substantially $f \times \tan \theta$ when the apparatus fluctuates, where $\theta$ is the angle of the fluctuation of the apparatus detected by said detecting means and f is a focal length of said focusing means.

4. A camera apparatus comprising:
   focusing means optically focusing a light beam from an object;
   imaging means for converting an optical image produced by the focusing means into electric or physiochemical information and issuing or recording the information as an image;
   means for detecting a fluctuation of the camera apparatus and issuing a fluctuation detecting signal;
   means responsive to the fluctuation detecting signal for issuing an image fluctuation control signal;
   means responsive to the image fluctuation control signal for suppressing a fluctuation of the image due to the fluctuation of the apparatus;
   said imaging means having an electron image pickup tube having an electron beam controllable in horizontal and vertical deflections by said image fluctuation control signal issuing means for varying a scanning range of said electron beam dependent on the fluctuation detecting signal from said detecting means; and said image fluctuation control signal issuing means has a horizontal scanning speed increasing means for increasing the horizontal scanning speed by controlling the horizontal deflection of said electron beam during a vertical blanking period, and a vertical scanning amplitude increasing means for increasing a vertical scanning amplitude by controlling the vertical deflection of said electron beam; and
   wherein said imaging means comprises means for photoelectrically converting the optical image produced by said focusing means into image information, and electric readout means for reading out the image information, said electric readout means being controllable by said image fluctuation control signal issuing means dependent on an angle of the fluctuation of the apparatus so that the image on an optical focusing surface in said imaging means will be equivalently moved substantially $f \times \tan \theta$ when the apparatus fluctuates, where $\theta$ is the angle of the fluctuation of the apparatus detected by said detecting means and f is a focal length of said focusing means.

* * * * *